US009967802B2

(12) United States Patent
Malladi et al.

(10) Patent No.: US 9,967,802 B2
(45) Date of Patent: May 8, 2018

(54) WIRELESS COMMUNICATIONS OVER UNLICENSED RADIO FREQUENCY SPECTRUM

(71) Applicant: QUALCOMM Incorporated, San Diego, CA (US)

(72) Inventors: Durga Prasad Malladi, San Diego, CA (US); Yongbin Wei, La Jolla, CA (US); Tao Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 309 days.

(21) Appl. No.: 14/736,867

(22) Filed: Jun. 11, 2015

(65) Prior Publication Data
US 2015/0365880 A1    Dec. 17, 2015

Related U.S. Application Data

(60) Provisional application No. 62/012,231, filed on Jun. 13, 2014.

(51) Int. Cl.
*H04W 4/00*   (2018.01)
*H04W 48/08*  (2009.01)
(Continued)

(52) U.S. Cl.
CPC .......... *H04W 48/08* (2013.01); *H04L 5/0007* (2013.01); *H04L 5/0053* (2013.01); *H04W 16/14* (2013.01); *H04W 48/10* (2013.01); *H04W 74/08* (2013.01)

(58) Field of Classification Search
None
See application file for complete search history.

(56) References Cited

U.S. PATENT DOCUMENTS

2011/0205982 A1*  8/2011  Yoo ................. H04L 1/0038
                                              370/329
2012/0281593 A1  11/2012  Stewart et al.
(Continued)

FOREIGN PATENT DOCUMENTS

WO   WO-2012116489 A1   9/2012
WO   WO-2013086659 A1   6/2013

OTHER PUBLICATIONS

ISA/EPO, International Search Report and Written Opinion of the International Searching Authority, Int'l Appl. No. PCT/US2015/035494, dated Sep. 10, 2015, European Patent Office, Rijswijk, NL, 11 pgs.

*Primary Examiner* — Bob Phunkulh
(74) *Attorney, Agent, or Firm* — Liem T. Do

(57) ABSTRACT

Techniques for transmitting and receiving wireless communications over an unlicensed radio frequency spectrum band are disclosed, including techniques for transmitting and receiving system information blocks over the unlicensed radio frequency spectrum band, techniques for gaining access to the unlicensed radio frequency spectrum band by performing extended clear channel assessments (ECCAs), techniques for transmitting and receiving synchronization signals and reference signals over the unlicensed radio frequency spectrum band, techniques for identifying starting times of downlink transmissions over the unlicensed radio frequency spectrum band, techniques for transmitting and receiving clear channel assessment (CCA)-exempt transmissions over the unlicensed radio frequency spectrum band, techniques for performing random access over the unlicensed radio frequency spectrum band, and techniques for dynamically modifying a transmission mode over the unlicensed radio frequency spectrum band.

28 Claims, 35 Drawing Sheets

(51) Int. Cl.
*H04W 16/14* (2009.01)
*H04W 74/08* (2009.01)
*H04L 5/00* (2006.01)
*H04W 48/10* (2009.01)

(56) References Cited

U.S. PATENT DOCUMENTS

| | | | |
|---|---|---|---|
| 2013/0165134 A1 | 6/2013 | Touag et al. | |
| 2013/0195073 A1* | 8/2013 | Chen | H04L 5/0023 370/331 |
| 2013/0203458 A1* | 8/2013 | Charbit | H04W 52/34 455/522 |
| 2013/0208587 A1* | 8/2013 | Bala | H04W 16/14 370/230 |
| 2013/0322279 A1* | 12/2013 | Chincholi | H04W 24/10 370/252 |
| 2014/0301351 A1* | 10/2014 | Gao | H04W 74/08 370/329 |
| 2014/0342745 A1* | 11/2014 | Bhushan | H04W 28/0289 455/450 |
| 2015/0139207 A1* | 5/2015 | Seok | H04W 48/14 370/338 |
| 2015/0230244 A1* | 8/2015 | Choi | H04L 1/1614 370/329 |
| 2015/0289141 A1* | 10/2015 | Ghasemzadeh | H04W 16/14 370/330 |
| 2016/0337949 A1* | 11/2016 | Parkvall | H04L 5/001 |
| 2017/0055181 A1* | 2/2017 | Tiirola | H04W 28/26 |

\* cited by examiner

WIRELESS COMMUNICATIONS OVER UNLICENSED RADIO FREQUENCY SPECTRUM

CROSS REFERENCES

The present application for patent claims priority to U.S. Provisional Patent Application No. 62/012,231 by Malladi et al., entitled "Wireless Communications Over Unlicensed Radio Frequency Spectrum," filed Jun. 13, 2014, assigned to the assignee hereof, and expressly incorporated by reference herein.

FIELD OF THE DISCLOSURE

The present disclosure generally relates to wireless communication systems, and more particularly to wireless communications using, at least in part, unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from the base station to the UE) and uplink channels (e.g., for transmissions from the UEs to the base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks that use licensed radio frequency spectrum bands, offloading at least some data traffic to an unlicensed radio frequency spectrum band may provide a cellular operator with opportunities for enhanced data transmission capacity. Prior to gaining access to, and communicating over, the unlicensed radio frequency spectrum band, a device, may perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. If it is determined that the channel of the unlicensed radio frequency spectrum band is not available (e.g., because another device is already using the channel of the unlicensed radio frequency spectrum band), a CCA may be performed for the channel again at a later time. If the channel is available, the device may begin to transmit data using the channel.

SUMMARY

The present disclosure, for example, relates to wireless communications over an unlicensed radio frequency spectrum band, including techniques for transmitting and receiving system information blocks over the unlicensed radio frequency spectrum band, techniques for gaining access to the unlicensed radio frequency spectrum band by performing extended clear channel assessments (ECCAs), techniques for transmitting and receiving synchronization signals and reference signals over the unlicensed radio frequency spectrum band, techniques for identifying starting times of downlink transmissions over the unlicensed radio frequency spectrum band, techniques for transmitting and receiving clear channel assessment (CCA)-exempt transmissions over the unlicensed radio frequency spectrum band, techniques for performing random access over the unlicensed radio frequency spectrum band, and techniques for dynamically modifying a transmission mode over the unlicensed radio frequency spectrum band.

A method for wireless communication is described, the method comprising generating a system information block comprising a plurality of parameters related to a base station, wherein the parameters comprise at least one listen before talk (LBT) parameter, at least one cell identifier, and at least one radio frame identifier, and transmitting the system information block over an unlicensed radio frequency spectrum band.

An apparatus for wireless communication is described, the apparatus comprising means for generating a system information block comprising a plurality of parameters related to a base station, wherein the parameters comprise at least one LBT parameter, at least one cell identifier, and at least one radio frame identifier, and means for transmitting the system information block over an unlicensed radio frequency spectrum band.

An apparatus for wireless communication is described, the apparatus comprising a processor and memory coupled with the processor, wherein the processor is configured to generate a system information block comprising a plurality of parameters related to a base station, wherein the parameters comprise at least one LBT parameter, at least one cell identifier, and at least one radio frame identifier, and transmit the system information block over an unlicensed radio frequency spectrum band.

A non-transitory computer-readable medium storing instructions for wireless communication is also described, the instructions comprising instructions executable by a processor to generate a system information block comprising a plurality of parameters related to a base station, wherein the parameters comprise at least one LBT parameter, at least one cell identifier, and at least one radio frame identifier, and transmit the system information block over an unlicensed radio frequency spectrum band.

According to some aspects of the method, apparatuses, and/or non-transitory computer-readable medium, the system information block is transmitted over the unlicensed radio frequency spectrum band during a clear channel assessment (CCA)-exempt transmission (CET) subframe associated with the base station. In some examples the CET subframe is periodic and transmitting the system information block comprises transmitting the system information block at each instance of the CET.

According to some aspects of the method, apparatuses, and/or non-transitory computer-readable medium, a CCA may be performed prior to a non-CET subframe associated with opportunistic system information block transmissions, and the system information block may be transmitted on the non-CET subframe when the CCA is successful. Different redundancy versions of the system information block may be transmitted at different time intervals.

Some aspects of the method, apparatuses, and/or non-transitory computer-readable medium may further comprise dynamically modifying the LBT parameter, and transmitting an updated version of the system information block at a next CET subframe. In some examples the at least one cell identifier is selected from the group consisting of a physical cell identifier (PID), an operator identifier, a cell global identity (CGI), and combinations thereof.

In some aspects of the method, apparatuses, and/or non-transitory computer-readable medium, the at least one LBT parameter is selected from the group consisting of an extended clear channel assessment (ECCA) counter parameter, a CCA energy threshold, a guard period for base station resynchronization, and combinations thereof. In some examples an ECCA procedure at the base station is identical for unicast and broadcast transmissions.

In some aspects of the method, apparatuses, and/or non-transitory computer-readable medium, the radio frame identifier comprises a system frame number (SFN). In some examples the system information block spans an entire bandwidth of a component carrier associated with the unlicensed radio frequency spectrum band.

The foregoing has outlined features and technical advantages of examples according to the disclosure to clarify the detailed description. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described in which unlicensed radio frequency spectrum band is used for at least a portion of a wireless communications system. In some examples, the unlicensed radio frequency spectrum band may be used for Long Term Evolution (LTE) communications and/or LTE-Advanced (LTE-A) communications. The unlicensed radio frequency spectrum band may be used in combination with, or independent from, a licensed radio frequency band. In some examples, the unlicensed radio frequency spectrum band may be a radio frequency spectrum band for which a device may need to contend for access because the radio frequency spectrum band is available, at least in part, for unlicensed use (e.g., Wi-Fi use and/or LTE/LTE-A use in an unlicensed radio frequency spectrum band).

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. As noted above, before communicating over the unlicensed radio frequency spectrum band, devices may perform a listen before talk (LBT) procedure to gain access to the unlicensed radio frequency spectrum band. Such an LBT procedure may include performing a clear channel assessment (CCA) to determine whether a channel of the unlicensed radio frequency spectrum band is available.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
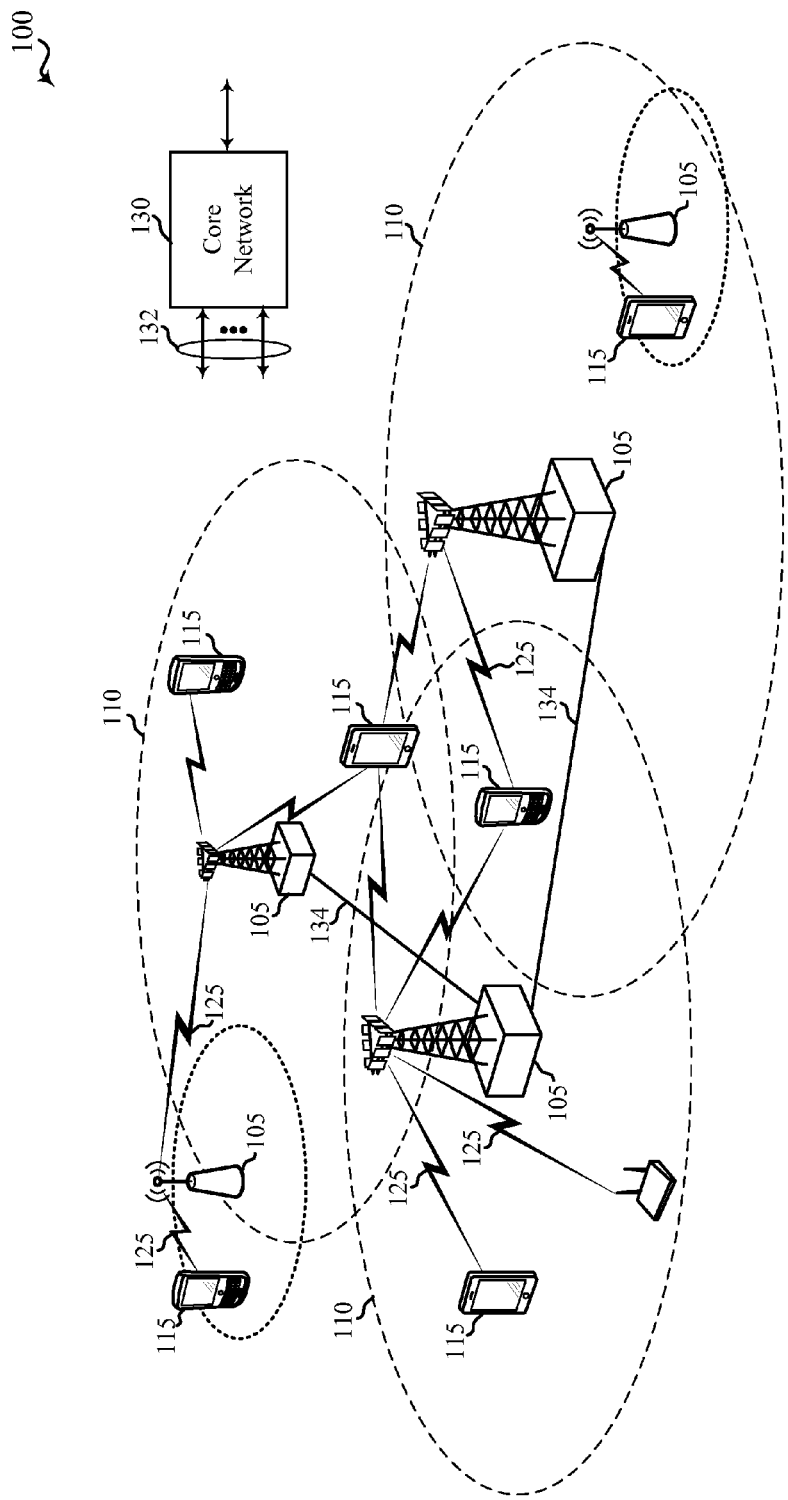
FIG. 1 shows an example of a wireless communication system, in accordance with various aspects of the present disclosure.

FIG. 1 shows an example of a wireless communication system 100, in accordance with various aspects of the present disclosure. The wireless communication system 100 may include base stations 105 (e.g., base stations forming parts or all of one or more eNBs), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a wireless local area network (WLAN) access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which may support one or more modes of operation or deployment in a first radio frequency spectrum band (e.g., a radio frequency spectrum band for which devices do not contend for access because the radio frequency spectrum band is licensed to particular users for particular uses, such as a licensed radio frequency spectrum band usable for LTE/LTE-A communications) and/or a second radio frequency spectrum band (e.g., an unlicensed radio frequency spectrum band such as an unlicensed radio frequency spectrum band for which devices may need to contend for access because the radio frequency spectrum band is available for unlicensed use, such as Wi-Fi use, or a licensed radio frequency spectrum band for which devices may need to contend for access because the radio frequency spectrum band is available for use by two or more operators on a contention basis). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include an LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes (LPNs). A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smartphone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other wireless wide area network (WWAN) access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over the first (e.g., licensed) radio frequency spectrum band or the second (e.g., unlicensed) radio frequency spectrum band, and a set of component carriers used in a particular mode of communication may all be received (e.g., at a UE 115) over the first radio frequency spectrum band, all be received over the second radio frequency spectrum band, or be received over a combination of the first radio frequency spectrum band and the second radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using the first (e.g., licensed) radio frequency spectrum band, the second (e.g., unlicensed) radio frequency spectrum band, or both.

In some examples of the wireless communication system 100, LTE/LTE-A may be deployed under different scenarios using the second (e.g., unlicensed) radio frequency spectrum band. The deployment scenarios may include a supplemental downlink mode in which LTE/LTE-A downlink communications in the first (e.g., licensed) radio frequency spectrum band may be offloaded to the second radio frequency spectrum band, a carrier aggregation mode in which both LTE/LTE-A downlink and uplink communications may be offloaded from the first radio frequency spectrum band to the second radio frequency spectrum band, and/or a standalone mode in which LTE/LTE-A downlink and uplink communications between a base station 105 and a UE 115 may solely occur using the second radio frequency spectrum band. Base stations 105 as well as UEs 115 may in some examples support one or more of these or similar modes of operation. Orthogonal frequency division multiple access (OFDMA) waveforms may be used in the communication links 125 for LTE/LTE-A downlink communications in the first (e.g., licensed) radio frequency spectrum band and/or the second (e.g., unlicensed) radio frequency spectrum band, while OFDMA, single-carrier frequency division multiple access (SC-FDMA) and/or resource block interleaved FDMA waveforms may be used in the communication links 125 for LTE/LTE-A uplink communications in the first radio frequency spectrum band and/or the second (e.g., unlicensed) radio frequency spectrum band.

Figure 2:
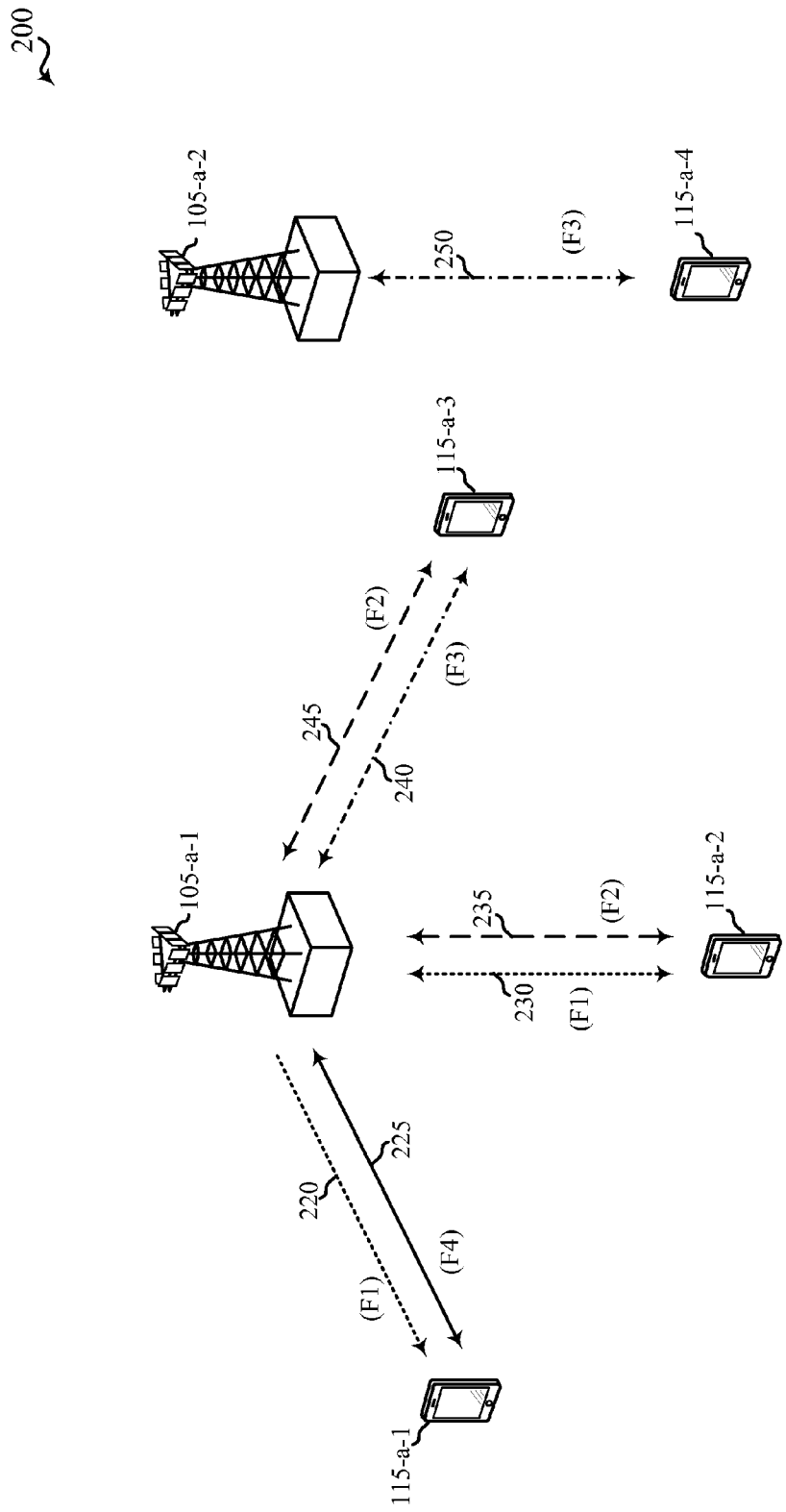
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 105-a-1 and a second base station 105-a-2 may be examples of aspects of one or more of the base stations 105 described with reference to FIG. 1, while a first UE 115-a-1, a second UE 115-a-2, a third UE 115-a-3, and a fourth UE 115-a-4 may be examples of aspects of one or more of the UEs 115 described with reference to FIG. 1.

In the example of a supplemental downlink mode in the wireless communication system 200, the first base station 105-a-1 may transmit OFDMA waveforms to the first UE 115-a-1 using a downlink channel 220. The downlink channel 220 may be associated with a frequency F1 in an unlicensed radio frequency spectrum band. The first base station 105-a-1 may also transmit OFDMA waveforms to the first UE 115-a-1 using a first bidirectional link 225 and may receive SC-FDMA waveforms from the first UE 115-a-1 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 105-a-1. In some examples, the downlink channel 220 may be used for unicast services (e.g., addressed to one UE) or for multicast services (e.g., addressed to several UEs). This supplemental downlink mode may be employed by a service provider (e.g., a mobile network operator (MNO)) using a licensed radio frequency spectrum where additional downlink bandwidth is needed.

In one example of a carrier aggregation mode in the wireless communication system 200, the first base station 105-a-1 may transmit OFDMA waveforms to the second UE 115-a-2 using a second bidirectional link 230 and may receive OFDMA waveforms, SC-FDMA waveforms, and/or resource block interleaved FDMA waveforms from the second UE 115-a-2 using the second bidirectional link 230. The second bidirectional link 230 may be associated with the frequency F1 in the unlicensed radio frequency spectrum band. The first base station 105-a-1 may also transmit OFDMA waveforms to the second UE 115-a-2 using a third bidirectional link 235 and may receive SC-FDMA waveforms from the second UE 115-a-2 using the third bidirectional link 235. The third bidirectional link 235 may be associated with a frequency F2 in a licensed radio frequency spectrum band. The second bidirectional link 230 may provide a downlink and uplink offloading for the third bidirectional link 235. This carrier aggregation mode may be employed by a service provider using a licensed radio frequency spectrum where additional downlink bandwidth and additional uplink bandwidth are needed.

In another example of a carrier aggregation mode in the wireless communication system 200, the first base station 105-a-1 may transmit OFDMA waveforms to the third UE 115-a-3 using a fourth bidirectional link 240 and may receive OFDMA waveforms, SC-FDMA waveforms, and/or resource block interleaved waveforms from the third UE 115-a-3 using the fourth bidirectional link 240. The fourth bidirectional link 240 may be associated with a frequency F3 in the unlicensed radio frequency spectrum band. The first base station 105-a-1 may also transmit OFDMA waveforms to the third UE 115-a-3 using a fifth bidirectional link 245 and may receive SC-FDMA waveforms from the third UE 115-a-3 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 105-a-1. This example and those provided above are presented for illustrative purposes and there may be other similar modes of operation or deployment scenarios that combine LTE/LTE-A in licensed radio frequency spectrum band and unlicensed radio frequency spectrum band for capacity offload.

As described above, one type of service provider that may benefit from the capacity offload offered by using LTE/LTE-A in unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed radio frequency spectrum band may fall under a hybrid frequency division duplex-time division duplex (FDD-TDD) carrier aggregation or a TDD-TDD carrier aggregation with different symmetry across component carriers.

Still referring to FIG. 2, in an example of a standalone mode in the wireless communication system 200, the second base station 105-a-2 may transmit OFDMA waveforms to the fourth UE 115-a-4 using a bidirectional link 250 and may receive OFDMA waveforms, SC-FDMA waveforms, and/or resource block interleaved FDMA waveforms from the fourth UE 115-a-4 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band. In a standalone mode, both data and control may be communicated in the unlicensed radio frequency spectrum band (e.g., via the bidirectional link 250).

In some examples, a transmitting apparatus such as one of the base stations 105 described with reference to FIGS. 1 and/or 2, and/or one of the UEs 115 described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve and/or use the channel of the unlicensed radio frequency spectrum band during part or all of the LBT radio frame by employing a channel usage beacon signal (CUBS). When the CCA indicates that the channel is not available (e.g., that the channel is in use or reserved by another apparatus), the transmitting apparatus may be prevented from using the channel during the LBT radio frame, but may nonetheless check for availability of the channel during subsequent LBT radio frames.

Figure 3:
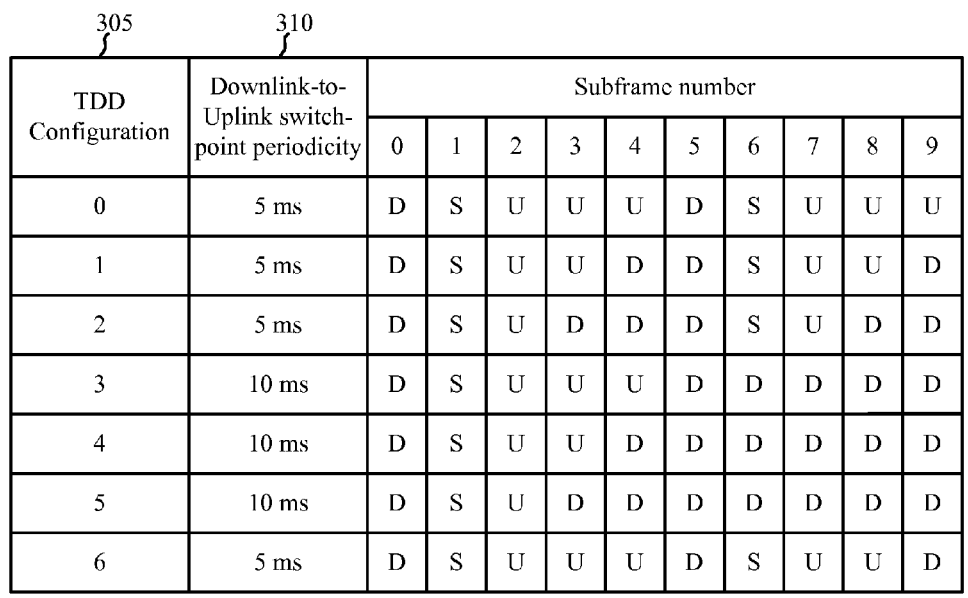
FIG. 3 shows seven TDD configurations that may be used for LTE/LTE-A communications in an LBT radio frame transmitted over an unlicensed radio frequency spectrum band, in accordance with various aspects of the present disclosure.

FIG. 3 shows seven TDD configurations 305 that may be used for LTE/LTE-A communications in an LBT radio frame transmitted over an unlicensed radio frequency spectrum band, in accordance with various aspects of the present disclosure. Each of the TDD configurations 305 has one of two DL-to-UL switch-point periodicities 310—a five ms switch-point periodicity or a ten ms switch-point periodicity. More particularly, the TDD configurations numbered 0, 1, 2, and 6 have a five ms switch-point periodicity (i.e., a half-frame switch-point periodicity, and the TDD configurations numbered 3, 4, and 5 have a ten ms switch-point periodicity. The TDD configurations having a five ms switch-point periodicity provide a number of downlink (DL) subframes, a number of uplink (UL) subframes, and two special (S) subframes per radio frame. The TDD configurations having a ten ms switch-point periodicity provide a number of DL subframes, a number of UL subframes, and one S subframe per radio frame.

Figure 4:
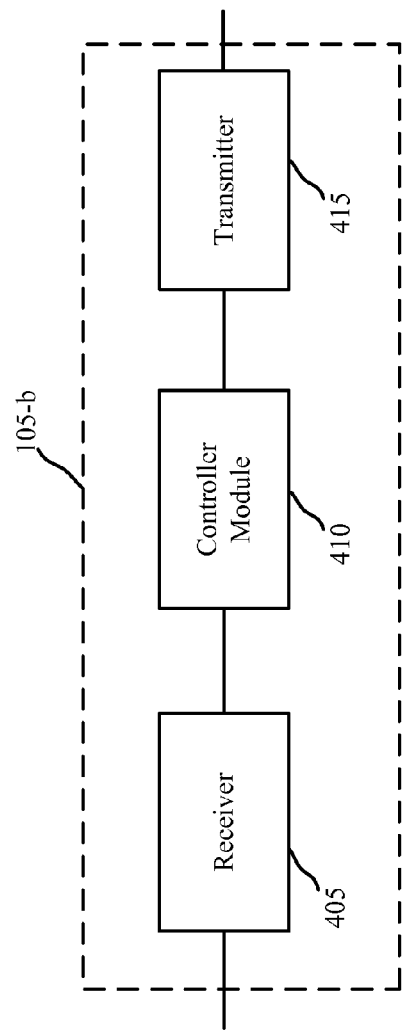
FIG. 4 shows a block diagram of a base station for use in wireless communication, in accordance with various aspects of the present disclosure.

FIG. 4 shows a block diagram 400 of a base station 105-b for use in wireless communication, in accordance with various aspects of the present disclosure. The base station 105-b in FIG. 4 may be, for example, one of the base stations 105 shown in FIGS. 1 and 2. The base station 105-b shown in FIG. 4 includes a receiver 405, a controller module 410, and a transmitter 415. The base station 105-b may also include a processor. Each of these components may be in communication with each other.

The components of the base station 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 405 may receive information such as packets, user data, and/or control information or signaling associated with various information channels (e.g., control channels, data channels, etc.). The receiver 405 may receive the information wirelessly over a wireless communication link using, for example, one or more LTE component carriers in an unlicensed and/or licensed radio frequency spectrum band. Information may be passed on to the controller module 410, and to other components of the base station 105-*b*.

The controller module 410 may be configured to implement a number of features related to the transmission and receipt of information over an unlicensed radio frequency spectrum band using, for example, LTE component carriers and waveforms.

In certain examples, the controller module 410 may be configured to generate and transmit system information blocks (SIBs) over the unlicensed radio frequency spectrum band. As used herein, SIBs may also be referred to as evolved SIBs (eSIBs). The SIBs may include parameters related to the base station, including listen-before-talk (LBT) parameters, cell identifiers, and radio frame identifiers. The SIBs may be transmitted over the unlicensed radio frequency spectrum band at regular intervals, such as during a CCA-exempt transmission (CET) subframe. In some examples, one or more of the SIBs may span an entire bandwidth of a component carrier associated with the unlicensed radio frequency spectrum band.

The controller module 410 may be additionally or alternatively configured to perform an extended CCA (ECCA) procedure to gain access to the unlicensed radio frequency spectrum band. The ECCA procedure may include performing a CCA multiple times until reaching a threshold number of CCA successes (the "ECCA threshold") is reached, indicating that the ECCA is successful. In some examples, the threshold number of CCA successes may be a function of a current radio frame and/or a current subframe or slot, as tracked by the base station 105-*b*.

In some examples, the controller module 410 may cause the base station 105-*b* to maintain an idle state after performing a successful ECCA on the unlicensed radio frequency spectrum band and before a channel usage beacon signal (CUBS) boundary. Following the idle period, the controller module 410 may cause the base station 105-*b* to perform a single CCA on the unlicensed radio frequency spectrum band immediately prior to the CUBS boundary and transmit the CUBS at the CUBS boundary when the single CCA is successful. Additionally or alternatively, the controller module 410 may cause the base station 105-*b* to delay a transmission over the unlicensed radio frequency spectrum band until a subframe boundary or a slot boundary of a radio frame. In this way, transmissions by the base station 105-*b* may be aligned with subframes and/or slots of the radio frame.

In some examples, the controller module 410 may determine that an ECCA performed by the base station 105-*b* on the unlicensed radio frequency spectrum band is unsuccessful at a CUBS boundary and continue to perform the ECCA on the unlicensed radio frequency spectrum band following the CUBS boundary in response to the determination. Upon reaching a successful ECCA, the base station 105-*b* may transmit over the unlicensed radio frequency spectrum band.

The controller module 410 may also coordinate the transmission of synchronization signals and/or reference signals over the unlicensed radio frequency spectrum band. In some cases, the transmission of synchronization signals or the transmission of reference signals may occur during CET subframes. In some cases a periodicity of the reference signals may be indicative of a system frame number (SFN) timing.

The controller module 410 may further coordinate random access procedures at the base station 105-*b* to allow wireless devices (e.g., UEs) to establish or modify radio resource control (RRC) connections or other connections. In certain examples, the controller module 405 may receive and process random access messages from wireless devices (e.g., UEs). One or more of the random access messages may be received during a CET associated with the transmitting wireless device. The random access messages may be received over different frequency domain interlaces of the unlicensed radio frequency spectrum band.

The transmitter 415 may transmit one or more signals received from other components of the base station 105-*b*. For example, the transmitter 415 may transmit packets, user data, and/or control information or signaling associated with various downlink channels (e.g., control channels, data channels, etc.). The transmitter 415 may transmit the information wirelessly over a wireless communication link using, for example, one or more LTE component carriers in an unlicensed and/or licensed radio frequency spectrum band. The transmitted information may be received from the controller module 410, and from other components of the base station 105-*b*.

Figure 5:
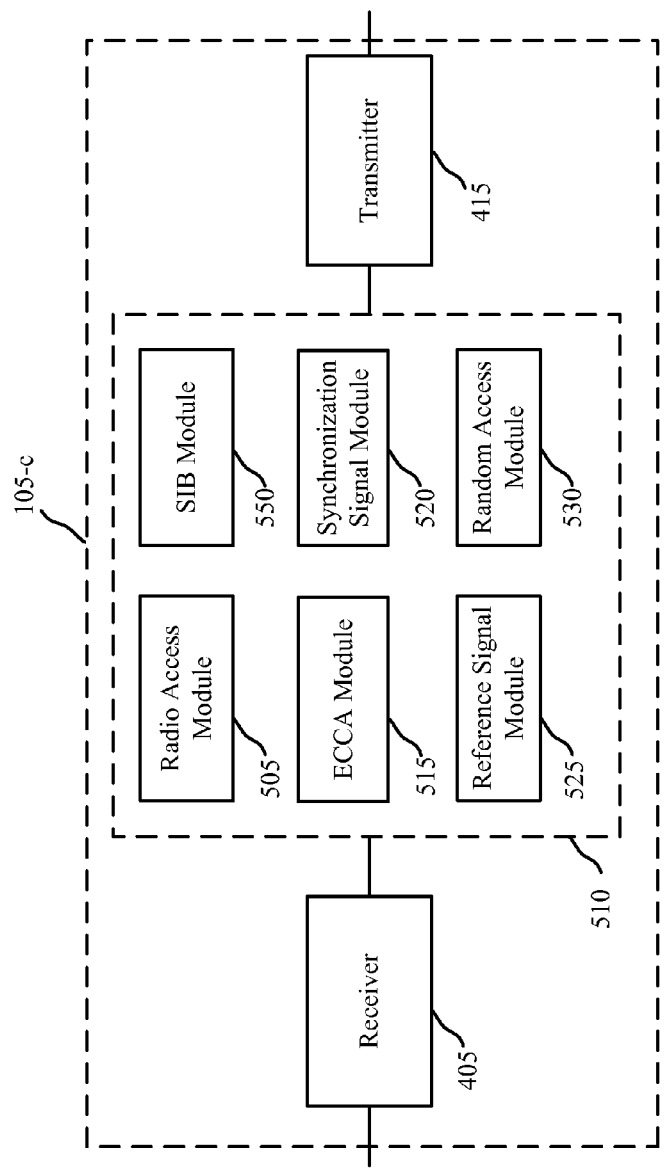
FIG. 5 shows a block diagram of a base station for use in wireless communication, in accordance with various aspects of the present disclosure.

FIG. 5 shows a block diagram 500 of a base station 105-*c* for use in wireless communication, in accordance with various aspects of the present disclosure. The base station 105-*c* may be, for example, one of the base stations 105 shown in FIG. 1, 2, or 4, and may be an example of one or more aspects of the base station 105-*b* described with reference to FIG. 4. The base station 105-*c* shown in FIG. 5 includes a receiver 405, a controller module 510, and a transmitter 415. The controller module 510 may be an example of one or more aspects of the controller module 410 described with reference to FIG. 4. The base station 105-*c* may also include a processor, which may implement one or more aspects of the receiver 405, the controller module 510, or the transmitter 415. Each of these components may be in communication with each other. The controller module 510 in FIG. 5 includes a radio access module 505, a system information block (SIB) module 550, an extended clear channel assessment (ECCA) module 515, a synchronization signal module 520, a reference signal module 525, and a random access module 530.

The receiver 405 may receive information such as packets, user data, and/or control information associated with various information channels (e.g., control channels, data channels, etc.), as described above with reference to FIG. 4. Information may be passed on to the controller module 510, and to other components of the base station 105-*c*. The controller module 510 may be configured to perform the operations described above with reference to the controller module 410 shown in FIG. 4. The transmitter 415 may transmit one or more signals received from other components of the base station 105-c.

The radio access module 505 may control the receiver 405 and transmitter 415 to enable the transmission and receipt of packets, user data, and control data or signaling over unlicensed and licensed radio frequency spectrum bands. For example, the radio access module 505 may be configured to implement physical layer procedures associated with gaining access to an unlicensed radio frequency spectrum band and communicating over the unlicensed radio frequency spectrum band using LTE and LTE-like waveforms, or other types of cellular communications, consistent with the procedures and functionality described above with respect to FIGS. 1-3. In particular, the radio access module 505 may coordinate the use of listen before talk (LBT) procedures to contend for access to the unlicensed radio frequency spectrum band and schedule uplink transmissions by other wireless devices (e.g., UEs) over the unlicensed radio frequency spectrum band. In certain examples, the radio access module 505 may be implemented within or as a component of the receiver 405 and/or the transmitter 415.

The SIB module 550 of the controller module 510 may, in collaboration with the receiver 405, the transmitter 415, and the radio access module 505, coordinate the transmission of SIBs 550 by the base station 105-c over the unlicensed radio frequency spectrum band to one or more UEs. In some examples, the SIBs 550 may be broadcast at regular intervals, and each SIB may include a number of parameters related to the base station 105-c. For example, the SIB parameters may include one or more LBT parameters, one or more cell identifiers, and one or more radio frame identifiers. In certain examples, the SIB may span an entire bandwidth of a component carrier associated with the unlicensed radio frequency spectrum band.

In some examples, the base station 105-c may transmit a SIB during a CCA-exempt transmission (CET) subframe associated with the base station 105-c. The CET subframe may be periodic (e.g., every 80 ms), and the SIB may be transmitted at each instance of the CET. Additionally, the SIB module 550 may cause the base station 105-c to perform a CCA prior to a non-CET subframe that is associated with opportunistic SIB transmissions. If CCA is successful for the non-CET subframe, the SIB module 550 may transmit the SIB opportunistically during the non-CET subframe. The SIB may be updated between transmissions. For example, the SIB module 550 may dynamically modify the LBT parameter between SIB transmissions and transmit an updated version of the SIB (i.e., containing the modified LBT parameter) at the next CET subframe or opportunistically at the next non-CET subframe associated with opportunistic SIB transmissions.

In certain examples, the SIB may transmit different redundancy versions of the SIB at different time intervals. For example, the SIB module 550 may cause a first redundancy version of the SIB to be transmitted during CET subframes, a second redundancy version of the SIB to be transmitted during a first interval of non-CET subframes associated with opportunistic SIB transmissions, a third redundancy version of the SIB to be transmitted during non-CET subframes associated with opportunistic SIB transmissions, and so on.

In certain examples, the cell identifier(s) signaled by the base station 105-c in the SIB may be selected from the group consisting of: a physical cell identifier (PID), an operator or PLMN identifier, a cell global identifier (CGI), and/or combinations thereof.

In certain examples, the LBT parameter(s) transmitted in a SIB may include an ECCA counter parameter, q, used by UEs scheduled to transmit to the base station 105-c. The scheduled UEs may use the ECCA counter parameter, q, to determine a threshold number of successful CCAs indicative of ECCA success, as explained in more detail below. In additional or alternative examples, the LBT parameter(s) signaled in the SIB may include a CCA energy threshold. The CCA energy threshold may indicate a threshold amount of measured energy on the unlicensed radio frequency spectrum band indicating that the unlicensed radio frequency spectrum band is occupied. Additionally or alternatively, the LBT parameter(s) signaled in the SIB may include a guard period for base station resynchronization. In some cases, the ECCA procedure at the base station may be identical for unicast and broadcast transmissions.

In certain examples, the radio frame identifier signaled in the SIB may include a system frame number (SFN) or other applicable radio frame identifier.

The ECCA module 515 of the controller module 510 may be configured to perform an ECCA on the unlicensed radio frequency spectrum band. As described elsewhere, an ECCA procedure may involve a wireless device (in this example, the base station 105-c) performing multiple consecutive CCAs until reaching a threshold number (the "ECCA threshold") of successful CCAs or until a time period elapses. If the ECCA threshold is reached before the time period elapses, the ECCA is considered successful and the wireless device obtains access to transmit over the unlicensed radio frequency spectrum band. The ECCA threshold may be a function of an individual radio frame r, subframe s, and/or slot, and may be distributed between 1 and a maximum threshold according to a distribution function. In certain examples, all base stations associated with the same operator deployment may use the same algorithm (i.e., the distribution function) to determine their individual ECCA thresholds for a given subframe or slot (with staggered radio frame, subframe, and/or slot values to randomize the distribution of ECCA thresholds among the base stations at any given time). For example, the base station 105-c and each of the devices synchronized with the base station 105-c may use a pseudorandom generator based on a common seed to generate its ECCA threshold for a given subframe or slot.

Parenthetically, the ECCA counter parameter q signaled to the scheduled UEs in the SIB may indicate the maximum ECCA threshold to be used by UEs when performing ECCA for uplink transmissions to the base station 105-c. In certain examples, all UEs scheduled to transmit to the base station 105-c may use the same distribution function to determine their individual ECCA thresholds for a given subframe or slot (with staggered radio frame, subframe, and/or slot values to randomize the distribution of ECCA thresholds among the scheduled UEs at any given time).

Returning to the discussion of ECCAs performed by the base station 105-c for downlink transmissions, the ECCA module 515 may be configured to cause the base station 105-c to maintain an idle state after performing a successful ECCA on the unlicensed radio frequency spectrum band and before a channel usage beacon signal (CUBS) boundary. Maintaining the idle state may include refraining from transmitting a CUBS immediately after performing the successful ECCA. This idle state may protect other base stations or wireless devices that are synchronized with the base station 105-c (e.g., wireless devices associated with the same operator or deployment as the base station 105-c). By refraining from transmitting an immediate CUBS following the successful ECCA, the base station 105-c may allow the synchronized wireless devices to continue performing ECCA after the successful ECCA of the base station 105-*c* without additional noise from the CUBS of the base station 105-*c* on the unlicensed radio frequency spectrum band.

The ECCA module 515 may cause the base station 105-*c* to perform an additional single CCA on the unlicensed radio frequency spectrum band immediately prior to the CUBS boundary. If the single CCA is successful, the base station 105-*c* may then transmit the CUBS at the CUBS boundary.

In additional or alternative examples, the ECCA module 515 may determine that an ECCA performed by the base station 105-*c* on the unlicensed radio frequency spectrum band is unsuccessful up to the point of the CUBS boundary. In such examples, the ECCA module 515 may cause the base station 105-*c* to continue performing the ECCA on the unlicensed radio frequency spectrum band following the CUBS boundary in response to the determination. If and when the ECCA is successful following the CUBS boundary, the ECCA module 515 may transmit a CUBS transmission and other information over the unlicensed radio frequency spectrum band. In certain examples, the base station 105-*c* may continue to perform the ECCA on the unlicensed radio frequency spectrum band concurrent to a transmission by a second wireless device that is synchronized with the base station 105-*c*, such as a base station or other wireless device from the same deployment or operator as the base station 105-*c*.

In additional or alternative examples, the ECCA module 515 may cause transmissions by the base station 105-*c* to align with subframe boundaries or slot boundaries of radio frames. Thus, when the base station 105-*c* performs a successful ECCA on the unlicensed radio frequency spectrum band, the ECCA module 515 may cause the base station 105-*c* to delay transmission over the unlicensed radio frequency spectrum band until at least a subframe boundary of a radio frame or a slot boundary of the radio frame. The base station 105-*c* may then begin the transmission at the subframe boundary or the slot boundary. As discussed above, in some cases the base station 105-*c* may be synchronized with at least a second wireless device, such as another base station. The subframe boundaries and/or slot boundaries of the base station 105-*c* may be substantially aligned with the subframe boundaries and/or slot boundaries, respectively, of the second wireless device.

In certain examples, the ECCA module 515 may implement identical ECCA procedures for both unicast and broadcast transmissions.

The synchronization signal module 520 of the controller module 510 may be configured to generate and transmit synchronization signals over the unlicensed radio frequency spectrum band. In certain examples, one or more synchronization signal(s) may be transmitted over the unlicensed radio frequency spectrum band during a CCA-exempt transmission (CET) subframe associated with the base station. The CET subframe may be periodic (e.g., with a periodicity of 80 ms), and the synchronization signal(s) may be transmitted at each instance of the CET subframe. The synchronization signals may include a primary synchronization signal (PSS), which may be a standard PSS or an evolved PSS (ePSS), and/or a secondary synchronization signal (SSS), which may be a standard SSS or an evolved SSS (eSSS).

In addition to the CET subframes, the synchronization signal(s) may be transmitted opportunistically over one or more non-CET subframes that are scheduled for or otherwise associated with opportunistic synchronization signal transmissions. The synchronization signal(s) may be transmitted over a non-CET subframe when a CCA performed prior to the non-CET subframe is successful.

The synchronization signal(s) may be transmitted over a number of resource blocks within a center of the unlicensed radio frequency spectrum band, for example, the six center resource blocks of the radio frequency spectrum band. In certain examples, the synchronization signal(s) may be transmitted during the first and second symbols of a subframe or slot. The synchronization signal(s) may be transmitted during a subset of the subframes in each radio frame (e.g., subframe 0 and subframe 5 of every tenth radio frame). The synchronization signal(s) may include physical layer cell identity (PCI) information, as well as symbol, slot, and radio frame boundary information for the base station 105-*c*.

The reference signal module 525 of the controller module 510 may coordinate the transmission of reference signals by the base station 105-*c* over the unlicensed radio frequency spectrum band. The reference signal module 525 may, for example, generate a cell-specific reference signal and transmit the cell-specific reference signal over the unlicensed radio frequency spectrum band during a CET subframe associated with the base station 105-*c*. The cell-specific reference signal (CRS) may also be referred to as an evolved CRS (eCRS).

In certain examples, the CET subframe may be periodic (e.g., with a periodicity of 80 ms), and the cell-specific reference signal may be transmitted at each instance of the CET subframe. The cell-specific reference signal may be generated using a sequence having the same periodicity as the CET subframe (e.g., 80 ms). Thus, the cell-specific reference signal may indicate a system frame number (SFN) timing of the base station 105-*c*.

In addition to the CET subframes, the cell-specific reference signal may be transmitted opportunistically over one or more non-CET subframes that are scheduled for or otherwise associated with opportunistic cell-specific reference signal transmissions. The cell-specific reference signal may be transmitted over a non-CET subframe when a CCA performed prior to the non-CET subframe is successful.

In certain examples, the cell-specific reference signal may be transmitted during the first, second, eight, and ninth symbols of a subframe. The cell-specific reference signal may, in some examples, be transmitted during two subframes of every radio frame (subframes 0 and 5 of every tenth radio frame).

The random access module 530 of the controller module 510 may be configured to coordinate random access procedures to establish or modify radio resource control (RRC) connections with UEs. In certain examples, the random access module 530 may be configured to receive a random access message transmitted by a wireless device, e.g., a UE, over the unlicensed radio frequency spectrum band.

In some examples, the random access message may be received at a guaranteed random access transmission opportunity during a CET subframe of the UE. Alternatively, the random access message may be received during a non-CET subframe to which the UE has gained channel access by successfully performing a CCA.

The random access message may be transmitted over a random access channel that spans an entire bandwidth of a component carrier associated with the unlicensed radio frequency spectrum band. The random access module 530 may provide one or more random access parameters for use by the UE to the SIB module 550, and the SIB module 550 may broadcast the random access parameters to the UE over the unlicensed radio frequency spectrum band prior to the UE transmitting the random access message. The random access parameter(s) may include a parameter identifying the guaranteed random access transmission opportunity, a parameter identifying an opportunistic random access transmission opportunity, and/or combinations thereof.

In certain examples, the random access channel may include a number of frequency domain interlaces of the unlicensed radio frequency spectrum band. The random access message may be received over one of the interlaces selected by the UE. The UE may, in some cases, randomly select the frequency domain interlace for transmitting the random access message.

In certain examples, the random access message may include an RRC connection request message, an RRC reconfiguration message, and/or similar messages.

The components of the base station 105-*c* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

Figure 6:
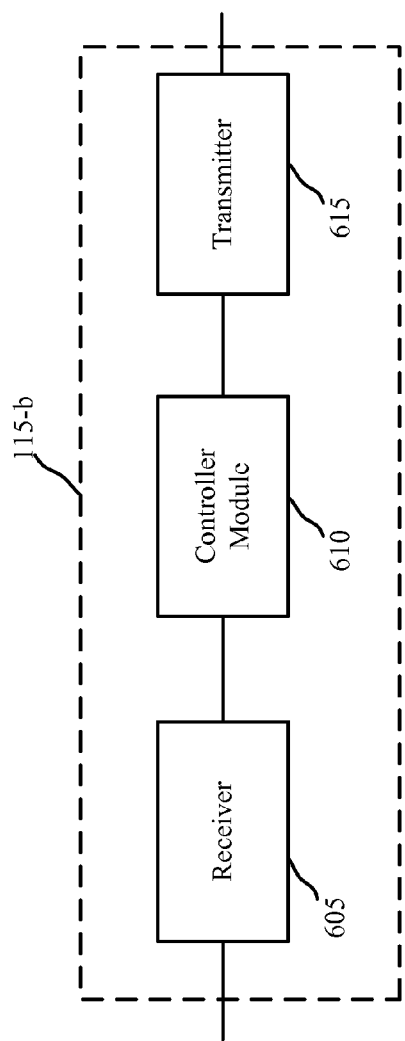
FIG. 6 shows a block diagram of a UE that may be used in wireless communication, in accordance with various aspects of the present disclosure.

FIG. 6 shows a block diagram 600 of a UE 115-*b* that may be used for wireless communication, in accordance with various aspects of the present disclosure. The UE 115-*b* in FIG. 6 may be, for example, one of the UEs 115 shown in FIGS. 1 and 2. The UE 115-*b* shown in FIG. 6 includes a receiver 605, a controller module 610, and a transmitter 615. The UE 115-*b* may also include a processor. Each of these components may be in communication with each other.

The components of the UE 115-*b* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 605 may receive information such as packets, user data, and/or control information associated with various information channels (e.g., control channels, data channels, etc.). The receiver 605 may receive the information wirelessly over a wireless communication link using, for example, one or more LTE component carriers in an unlicensed and/or licensed radio frequency spectrum band. Information may be passed on to the controller module 610, and to other components of the UE 115-*b*.

The controller module 610 may be configured to implement a number of features related to the transmission and receipt of information over an unlicensed radio frequency spectrum band using, for example, LTE component carriers and waveforms.

In certain examples, the controller module 610 may be configured to receive SIBs from a base station over the unlicensed radio frequency spectrum band. The SIBs may include parameters related to the base station, including LBT parameters, cell identifiers, and radio frame identifiers. The SIBs may be received over the unlicensed radio frequency spectrum band at regular intervals, such as during CET subframes of the base station. In some examples, one or more of the SIBs may span an entire bandwidth of a component carrier associated with the unlicensed radio frequency spectrum band.

The controller module 610 may be additionally or alternatively configured to perform an ECCA procedure to gain access to the unlicensed radio frequency spectrum band. The ECCA procedure may include performing a CCA multiple times until reaching a threshold number of CCA successes (the "ECCA threshold") is reached, indicating that the ECCA is successful. In some examples, the threshold number of CCA successes may be a function of a current radio frame and/or a current subframe or slot, as tracked by the UE 115-*b*.

In some examples, the controller module 610 may cause the UE 115-*b* to maintain an idle state after performing a successful ECCA on the unlicensed radio frequency spectrum band and before a CUBS boundary. Following the idle period, the controller module 610 may cause the UE 115-*b* to perform a single CCA on the unlicensed radio frequency spectrum band immediately prior to the CUBS boundary and transmit the CUBS at the CUBS boundary when the single CCA is successful. Additionally or alternatively, the controller module 610 may cause the UE 115-*b* to delay a transmission over the unlicensed radio frequency spectrum band until a subframe boundary or a slot boundary of a radio frame. In this way, transmissions by the UE 115-*b* may be aligned with subframes and/or slots of the radio frame.

In some examples, the controller module 610 may be configured to determine that an ECCA performed by the UE 115-*b* on the unlicensed radio frequency spectrum band is unsuccessful at a CUBS boundary and continue to perform the ECCA on the unlicensed radio frequency spectrum band following the CUBS boundary in response to the determination. Upon reaching a successful ECCA, the UE 115-*b* may transmit over the unlicensed radio frequency spectrum band.

The controller module 610 may also be configured to coordinate receiving synchronization signals and/or reference signals over the unlicensed radio frequency spectrum band. In some cases, the synchronization signals or reference signals may be received during CET subframes of a base station. In some cases the controller module 610 may determine a system frame number (SFN) timing based on a periodicity of the received reference signals.

The controller module 610 may also be configured to, based on an alignment with data transmissions and subframe boundaries or slot boundaries, detect a downlink CUBS on the unlicensed radio frequency spectrum band during a last symbol of a subframe or slot, determine that downlink data will be transmitted in a next subframe or slot based on the detected CUBS, and receive the downlink data in the next subframe or slot. In certain examples, the controller module 610 may determine a TDD ratio of a radio frame based on the detected CUBS.

In certain examples, the controller module 610 may be further configured to receive a downlink CET over an unlicensed radio frequency spectrum band, determine a timing of the downlink CET, and transmit an uplink CET according to the determined timing of the downlink CET.

The controller module 610 may further be configured to coordinate random access procedures at the UE to establish or modify RRC connections or other connections. In certain examples, the controller module 610 may generate random access messages and transmit the random access messages over the unlicensed radio frequency spectrum band. The random access messages may be transmitted during a CET subframe of the UE or opportunistically during non-CET subframes. In some cases, the controller module 610 may select one of a number of frequency domain interlaces of the unlicensed radio frequency spectrum band, where each frequency domain interlace is associated with a random access channel, and transmitting the random access message over the selected frequency domain interlace.

The controller module 610 may additionally or alternatively be configured to identify a set of channel parameters associated with a communication link over an unlicensed radio frequency spectrum band, select between an OFDM transmission mode and a SC-FDMA transmission mode based on the set of channel parameters, and transmit over the unlicensed radio frequency spectrum band according to the selected transmission mode.

The transmitter 615 may transmit one or more signals received from other components of the UE 115-b. For example, the transmitter 615 may transmit packets, user data, and/or control information or signaling associated with various uplink channels (e.g., control channels, data channels, etc.). The transmitter 615 may transmit the information wirelessly over a wireless communication link using, for example, one or more LTE component carriers in an unlicensed and/or licensed radio frequency spectrum band. For example, the transmitter 615 may transmit data on an uplink connection to a base station 105. The transmitted information may be received from the controller module 610, and from other components of the UE 115-b.

Figure 7:
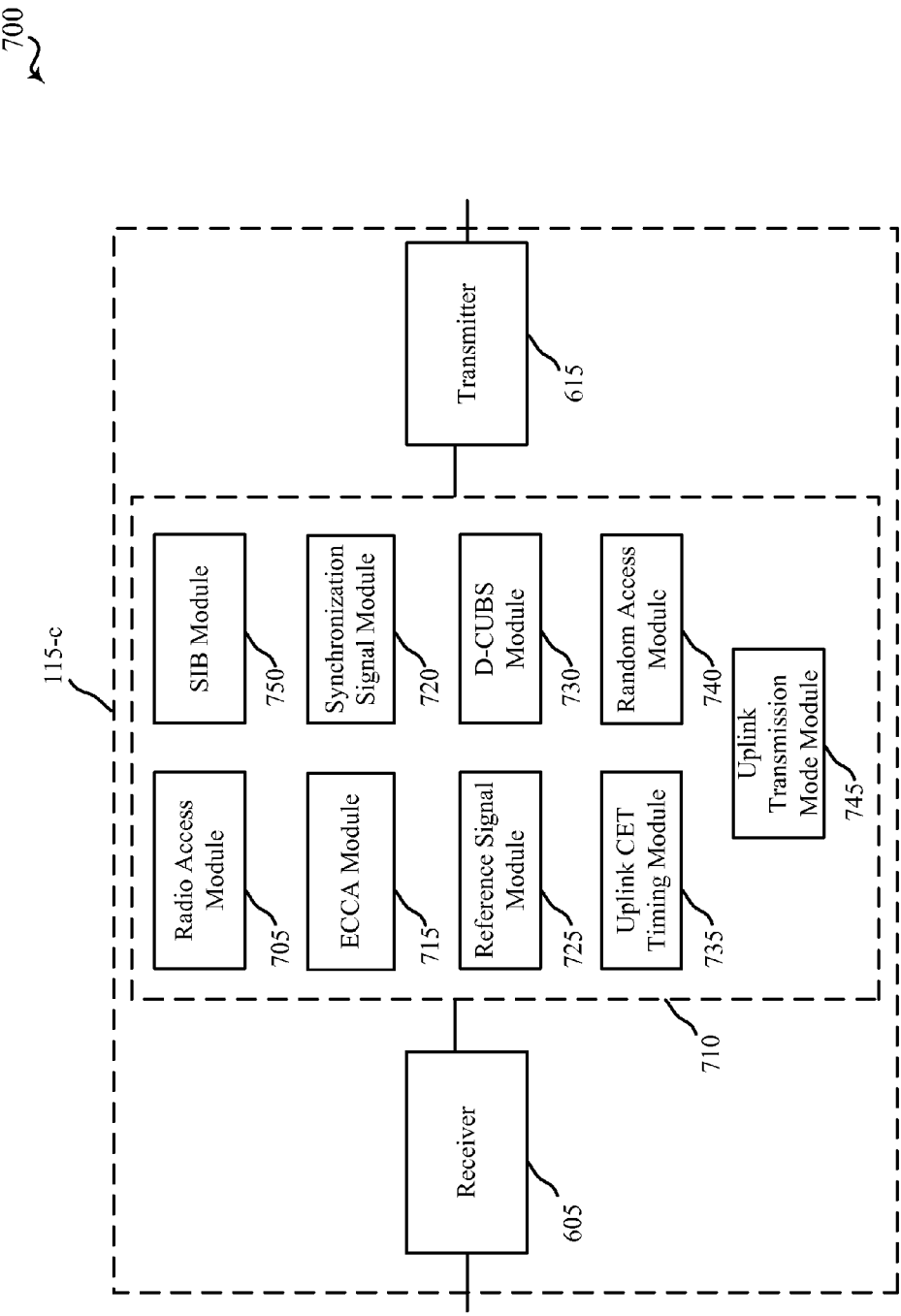
FIG. 7 shows a block diagram of a UE that may be used for wireless communication, in accordance with various aspects of the present disclosure.

FIG. 7 shows a block diagram 700 of a UE 115-c that may be used for wireless communication, in accordance with various aspects of the present disclosure. The UE 115-c in FIG. 7 may be, for example, one of the UEs 115 shown in FIG. 1, 2, or 6, and may be an example of one or more aspects of the UE 115-b described with reference to FIG. 6. The UE 115-c shown in FIG. 7 includes a receiver 605, a controller module 710, and a transmitter 615. The UE 115-c may also include a processor. Each of these components may be in communication with each other. The controller module 710 in FIG. 7 includes a radio access module 705, a system information block (SIB) module 750, an ECCA module 715, a synchronization signal module 720, a reference signal module 725, a downlink CUBS (D-CUBS) module 730, an uplink CET timing module 735, a random access module 740, and an uplink transmission mode module 745.

The components of the UE 115-c may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 605 may receive information such as packets, user data, and/or control information associated with various information channels (e.g., control channels, data channels, etc.), as described above. Information may be passed on to the controller module 710, and to other components of the UE 115-c. The controller module 710 may be an example of one or more aspects of the controller module 610 described with reference to FIG. 6. The controller module 710 may be configured to perform the operations described above with reference to the controller module 610 shown in FIG. 6. The transmitter 615 may transmit the one or more signals received from other components of the UE 115-c, as described above.

The radio access module 705 may control the receiver 605 and transmitter 615 to enable the transmission and receipt of packets, user data, and control data or signaling over unlicensed and licensed radio frequency spectrum bands. For example, the radio access module 705 may be configured to implement physical layer procedures associated with gaining access to an unlicensed radio frequency spectrum band and communicating over the unlicensed radio frequency spectrum band using LTE and LTE-like waveforms, or other types of cellular communications, consistent with the procedures and functionality described above with respect to FIGS. 1-3. In particular, the radio access module 705 may coordinate the use of LBT procedures to contend for access to the unlicensed radio frequency spectrum band and schedule uplink transmissions by other wireless devices (e.g., UEs) over the unlicensed radio frequency spectrum band. In certain examples, the radio access module 705 may be implemented within or as a component of the receiver 605 and/or the transmitter 615.

The SIB module 750 of the controller module 710 may, in collaboration with the receiver 605 and the radio access module 705 receive SIBs 750 from a base station 105-c over the unlicensed radio frequency spectrum band. In some examples, the SIBs 750 may be broadcast at regular intervals, and each SIB may include a number of parameters related to the base station. For example, the SIB parameters may include one or more LBT parameters, one or more cell identifiers, and one or more radio frame identifiers. In certain examples, the SIB may span an entire bandwidth of a component carrier associated with the unlicensed radio frequency spectrum band.

In some examples, the SIB may be received during a CET subframe associated with the base station. The CET subframe may be periodic (e.g., every 80 ms), and the SIB may be received at each instance of the CET. Additionally, the SIB module 750 may be received at non-CET subframes associated with opportunistic SIB transmissions. The SIB may be updated between transmissions, and changing parameters in the SIB may result in modified operations at the UE 115-c. For example, the SIB module 750 may adjust an LBT operation based on the at least one LBT parameter received in the SIB.

In certain examples, the SIB may contain different redundancy versions of the SIB at different time intervals. For example, a first redundancy version of the SIB may be received during CET subframes, a second redundancy version of the SIB may be received during a first interval of non-CET subframes associated with opportunistic SIB transmissions, a third redundancy version of the SIB may be received during non-CET subframes associated with opportunistic SIB transmissions, and so on.

In certain examples, the cell identifier(s) signaled in the SIB may be selected from the group consisting of: a physical cell identifier (PID), an operator or PLMN identifier, a cell global identifier (CGI), and/or combinations thereof.

In certain examples, the LBT parameter(s) received in the SIB may include an ECCA counter parameter, q, used by the UEs 115-c to transmit to the base station. The scheduled UE 115-c may use the ECCA counter parameter, q, to determine a threshold number of successful CCAs indicative of ECCA success (the "ECCA threshold"), as explained in more detail below. In additional or alternative examples, the LBT parameter(s) signaled in the SIB may include a CCA energy threshold. The CCA energy threshold may indicate a threshold amount of measured energy on the unlicensed radio frequency spectrum band indicating that the unlicensed radio frequency spectrum band is occupied. Additionally or alternatively, the LBT parameter(s) signaled in the SIB may include a guard period for base station resynchronization.

In certain examples, the radio frame identifier signaled in the SIB may include a system frame number (SFN) or other applicable radio frame identifier.

The ECCA module 715 of the controller module 710 may be configured to perform an ECCA on the unlicensed radio frequency spectrum band. As described elsewhere, an ECCA procedure may involve a wireless device (in this example, the UE 115-c) performing multiple consecutive CCAs until reaching a threshold number (the "ECCA threshold") of successful CCAs or until a time period elapses. If the ECCA threshold is reached before the time period elapses, the ECCA is considered successful and the wireless device obtains access to transmit over the unlicensed radio frequency spectrum band. The ECCA threshold may be a function of an individual radio frame r, subframe s, and/or slot, and may be distributed between 1 and a maximum threshold according to a distribution function. In certain examples, all wireless devices synchronized with the UE 115-c (e.g., all UEs associated with the same operator or deployment) may use the same algorithm (i.e., the distribution function) to determine their individual ECCA thresholds for a given subframe or slot (with staggered radio frame, subframe, and/or slot values to randomize the distribution of ECCA thresholds among the UEs at any given time). For example, the UE 115-c and each of the wireless devices synchronized with the UE 115-c may use a pseudorandom generator based on a common seed to generate its ECCA threshold for a given subframe or slot.

The ECCA module 715 may be further configured to cause the UE 115-c to maintain an idle state after performing a successful ECCA on the unlicensed radio frequency spectrum band and before a CUBS boundary. Maintaining the idle state may include refraining from transmitting a CUBS immediately after performing the successful ECCA. This idle state may protect other UEs or wireless devices that are synchronized with the UE 115-c. By refraining from transmitting an immediate CUBS following the successful ECCA, the UE 115-c may allow the synchronized wireless devices to continue performing ECCA after the successful ECCA of the UE 115-c without additional noise from the CUBS of the UE 115-c on the unlicensed radio frequency spectrum band. The ECCA module 715 may cause the UE 115-c to perform an additional single CCA on the unlicensed radio frequency spectrum band immediately prior to the CUBS boundary. If the single CCA is successful, the UE 115-c may then transmit the CUBS at the CUBS boundary.

In additional or alternative examples, the ECCA module 715 may determine that an ECCA performed by the UE 115-c on the unlicensed radio frequency spectrum band is unsuccessful up to the point of the CUBS boundary. In such examples, the ECCA module 715 may cause the UE 115-c to continue performing the ECCA on the unlicensed radio frequency spectrum band following the CUBS boundary in response to the determination. If and when the ECCA is successful following the CUBS boundary, the ECCA module 715 may transmit a CUBS transmission and other information over the unlicensed radio frequency spectrum band. In certain examples, the UE 115-c may continue to perform the ECCA on the unlicensed radio frequency spectrum band concurrent to a transmission by a second wireless device that is synchronized with the UE 115-c, such as a base station or other wireless device from the same deployment or operator as the UE 115-c.

In additional or alternative examples, the ECCA module 715 may cause transmissions by the UE 115-c to align with subframe boundaries or slot boundaries of radio frames. Thus, when the UE 115-c performs a successful ECCA on the unlicensed radio frequency spectrum band, the ECCA module 715 may cause the UE 115-c to delay transmission over the unlicensed radio frequency spectrum band until at least a subframe boundary of a radio frame or a slot boundary of the radio frame. The UE 115-c may then begin the transmission at the subframe boundary or the slot boundary. As discussed above, in some cases the UE 115-c may be synchronized with at least a second wireless device, such as another UE. The subframe boundaries and/or slot boundaries of the UE 115-c may be substantially aligned with the subframe boundaries and/or slot boundaries, respectively, of the second wireless device.

The synchronization signal module 720 of the controller module 710 may be configured to receive synchronization signals over the unlicensed radio frequency spectrum band. In certain examples, one or more synchronization signal(s) may be received over the unlicensed radio frequency spectrum band during a CET subframe associated with a base station. The CET subframe may be periodic (e.g., with a periodicity of 80 ms), and the synchronization signal(s) may be received at each instance of the CET subframe. The synchronization signals may include a primary synchronization signal (PSS), which may be a standard PSS or an evolved PSS (ePSS), and/or a secondary synchronization signal (SSS), which may be a standard SSS or an evolved SSS (eSSS).

In addition to the CET subframes, the synchronization signal(s) may be received over one or more non-CET subframes that are scheduled for or otherwise associated with opportunistic synchronization signal transmissions. The synchronization signal(s) may be received over a non-CET subframe when a CCA performed by the base station prior to the non-CET subframe is successful.

The synchronization signal(s) may be received over a number of resource blocks within a center of the unlicensed radio frequency spectrum band, for example, the six center resource blocks of the radio frequency spectrum band. In certain examples, the synchronization signal(s) may be received during the first and second symbols of a subframe or slot. The synchronization signal(s) may be received during a subset of the subframes in each radio frame (e.g., subframe 0 and subframe 5 of every tenth radio frame). The synchronization signal(s) may include PCI information, as well as symbol, slot, and radio frame boundary information for the base station.

The reference signal module 725 of the controller module 710 may be configured to coordinate receiving reference signals from a base station over the unlicensed radio frequency spectrum band. The reference signal module 725 may, for example, receive a cell-specific reference signal over the unlicensed radio frequency spectrum band during a CET subframe associated with the base station. The cell-specific reference signal (CRS) may also be referred to as an evolved CRS (eCRS).

In certain examples, the CET subframe may be periodic (e.g., with a periodicity of 80 ms), and the cell-specific reference signal may be received at each instance of the CET subframe. The cell-specific reference signal may be generated using a sequence having the same periodicity as the CET subframe (e.g., 80 ms). Thus, the reference signal module 725 may, in some cases, be configured to determine a system frame number (SFN) timing based on the periodicity of the cell specific reference signal.

In addition to the CET subframes of the base station, the cell-specific reference signal may be received opportunistically over one or more non-CET subframes of the base station that are scheduled for or otherwise associated with opportunistic cell-specific reference signal transmissions. The cell-specific reference signal may be received over a non-CET subframe of the base station when a CCA performed by the base station prior to the non-CET subframe is successful.

In certain examples, the cell-specific reference signal may be received during the first, second, eight, and ninth symbols of a subframe. The cell-specific reference signal may, in some examples, be received during two subframes of every radio frame (subframes 0 and 5 of every tenth radio frame).

The D-CUBS module 730 of the controller module 710 may be configured to detect a CUBS from another wireless device (e.g., a base station) on the unlicensed radio frequency spectrum band during a last symbol of a subframe or slot. The D-CUBS module 730 may be further configured to determine that downlink data will be transmitted in a next subframe or slot based on the detected CUBS, and coordinate the receiving of the downlink data in the next subframe or slot. This determination may be based on knowledge that transmissions in the network are aligned with subframe and slot boundaries. In certain examples, the downlink CUBS may span a bandwidth of an entire component carrier of the unlicensed radio frequency spectrum band. A sequence used for the downlink CUBS may be based on a cell-specific reference signal sequence. In certain examples, the D-CUBS module 730 may be configured to determine a TDD downlink-to-uplink ratio of a radio frame based on the detected CUBS.

The uplink CET timing module 735 of the controller module 710 may be configured to coordinate receiving a downlink CET transmission over the unlicensed radio frequency spectrum band. The uplink CET timing module 735 may determine an observed timing of the downlink CET, and based on a the timing of the downlink CET, determine a timing for an uplink CET to be transmitted by the UE 115-c. The uplink CET timing module 735 may then cause the UE 115-c to transmit the uplink CET over the unlicensed radio frequency spectrum band according to the determined observed timing of the downlink CET and imputed timing of the uplink CET. In certain examples, the uplink CET timing module may determine the timing of the uplink CET based on a known or fixed offset between the downlink CET and the uplink CET. The uplink CET may include a scheduling request (SR), a sounding reference signal (SRS), a physical uplink control channel (PUCCH or enhanced PUCCH (ePUCCH)), a physical random access channel (PRACH or enhanced PRACH (ePRACH)), and/or other signals or channels.

The random access module 740 of the controller module 710 may be configured to coordinate random access procedures to establish or modify RRC connections with a network. In certain examples, the random access module 740 may be configured to generate a random access message and transmit the random access message over the unlicensed radio frequency spectrum band.

In some examples, the random access message may be transmitted at a guaranteed random access transmission opportunity during a CET subframe of the UE 115-c. Alternatively, the random access message may be transmitted during a non-CET subframe of the UE 115-c for which the UE 115-c has gained channel access by successfully performing a CCA.

The random access message may be transmitted over a random access channel that spans an entire bandwidth of a component carrier associated with the unlicensed radio frequency spectrum band. The random access module 740 may receive one or more random access parameters from a SIB broadcast by a base station over the unlicensed radio frequency spectrum band prior to the UE 115-c transmitting the random access message. The random access parameter(s) may include a parameter identifying the guaranteed random access transmission opportunity, a parameter identifying an opportunistic random access transmission opportunity, and/or combinations thereof.

In certain examples, the random access channel may include a number of frequency domain interlaces of the unlicensed radio frequency spectrum band. The UE 115-c may select one of the interlaces to transmit the random access message. The UE 115-c may, in some cases, select the frequency domain interlace randomly. In certain examples, the random access message may include an RRC connection request message, an RRC reconfiguration message, and/or similar messages.

The uplink transmission mode module 745 of the controller module 710 may be configured to identify a set of channel parameters associated with a communication link over the unlicensed radio frequency spectrum band. Based on the channel parameters, the uplink transmission mode module 745 may select an uplink transmission mode for the UE 115-c. The transmission mode may be selected from an OFDM transmission mode and a SC-FDMA transmission mode.

For example, the set of channel parameters may include a MIMO parameter indicating whether the communication link is configured for MIMO transmissions. When MIMO is in use, the uplink transmission mode module 745 may select the OFDM transmission mode for the UE 115-c. Similarly, the channel parameters may include a modulation parameter indicating that a modulation and coding scheme of the communication link is greater than a threshold. For modulation and coding schemes that are greater than the threshold, the uplink transmission mode module 745 may select the OFDM transmission mode for the UE 115-c. For lower-order modulation and coding schemes, or for scenarios where MIMO is not in use, the uplink transmission mode module 745 may select the SC-FDMA transmission mode for uplink transmission by the UE 115-c. In certain examples, the uplink transmission mode of the communication may be selected to match a downlink transmission mode of the communication link.

Figure 8:
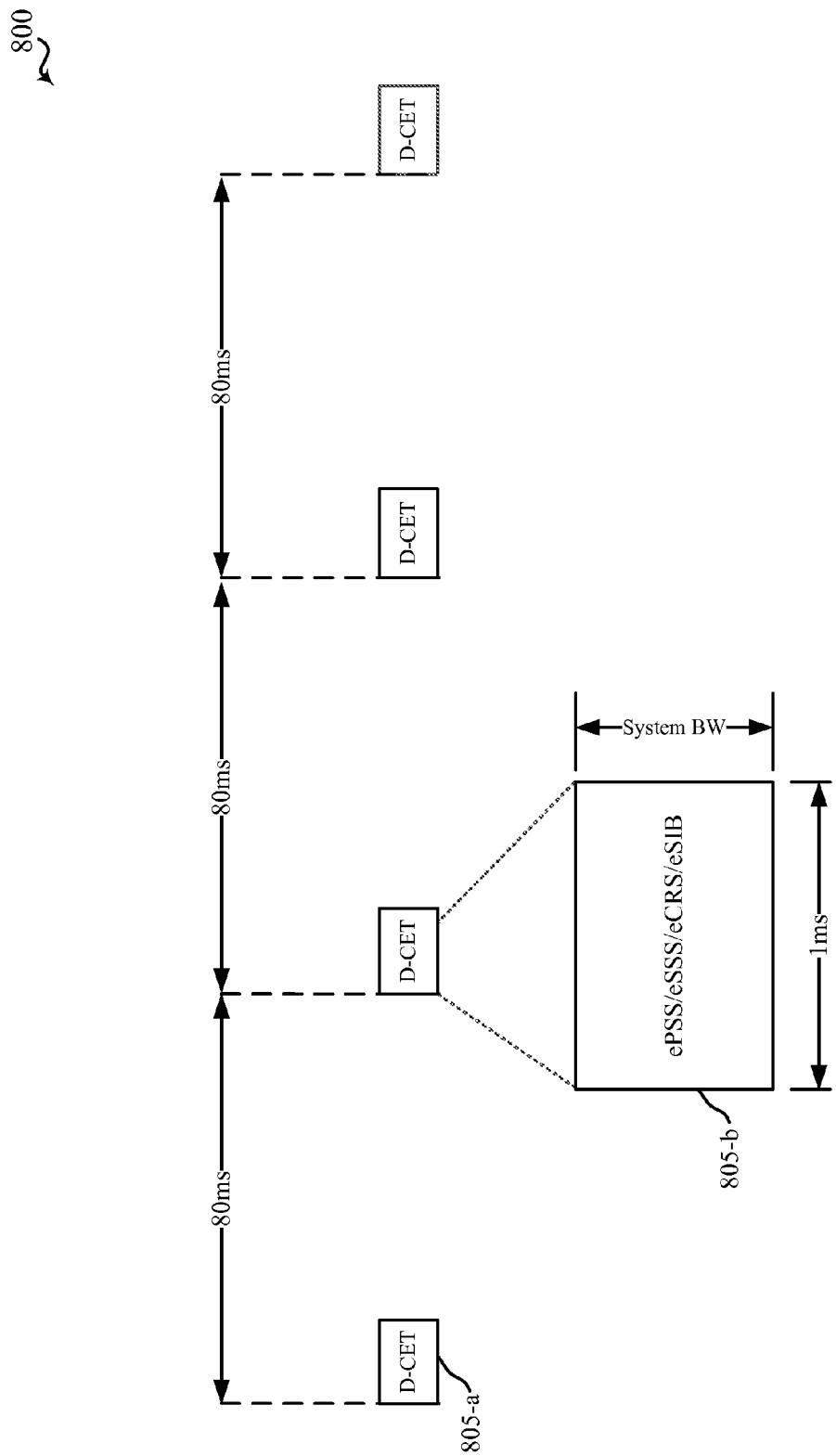
FIG. 8 shows a timing diagram illustrating the transmission of a plurality of parameters during a CET subframe over an unlicensed radio frequency spectrum band, in accordance with various aspects of the present disclosure.

FIG. 8 shows a timing diagram 800 illustrating the transmission of a plurality of parameters during a CET subframe 805 over an unlicensed radio frequency spectrum band, in accordance with various aspects of the present disclosure. The parameters may relate to a base station, a UE, transmissions between the base station and UE, and so forth, and may include one or more of an evolved system information block (eSIB) (which may also be referred to simply as a system information block or SIB), evolved primary and secondary synchronization signals (ePSS, eSSS) (which may be generated at the base station), evolved common or cell-specific reference signal (eCRS), and so forth. In some examples, the eSIB may provide system information for cell discovery, and may include a LBT parameter (such as an ECCA counter parameter, a CCA energy threshold, a guard period for base station resynchronization, or some combination thereof), a cell identifier (such as a physical cell identifier (PID), an operator (e.g., a PLMN operator) identifier, a cell global identifier (CGI), or some combination thereof), a radio frame identifier (such as a system frame number (SFN)) and timing, and so forth. Thus, in some examples, a single CET subframe may be used to send both access parameters (for a standalone implementation) and LBT/CCA parameters (for a carrier aggregation implementation).

As mentioned, the LBT/CCA parameters may include an ECCA counter parameter, which defines a number of successful CCAs before a transmitting apparatus can initiate a CUBS and begin transmitting over the unlicensed radio frequency spectrum band channel. A global maximum, q, for the ECCA counter parameter may be defined and advertised in the eSIB. A frame/subframe specific ECCA counter, N, may be used in specific frames/subframes, with N ranging from 1 up to the global maximum q. As used herein, the "frame/subframe specific ECCA counter" refers to the "ECCA threshold" described with respect to previous Figures (FIGS. 4-7). The frame/subframe specific ECCA counter N may be a function of the frame (e.g., based on the radio frame identifier) and/or the subframe (e.g., the subframe identifier). The frame/subframe specific ECCA counter N may vary in time, and may be randomly distributed between 1 and q in some examples. The frame/subframe specific ECCA counter N may be computed by base stations (e.g., eNBs), and all base stations from a single PLMN may have identical but time-varying frame/subframe specific ECCA counters N. The common counter N may be derived using a shared algorithm, which may be a pseudorandom generator based on a seed shared by the base stations.

The LBT/CCA parameters may also include a CCA energy threshold, which defines a threshold at which a CCA will be deemed to be successful, and which may also be advertised in the eSIB. The LBT/CCA parameters may also include a guard period, which may define a period for base station resynchronization, and which may also be advertised in the eSIB.

As illustrated in FIG. 8, the CET subframe 805 may be associated with the unlicensed radio frequency spectrum band, and may be transmitted by a base station and received by any UEs within range of the base station at a certain interval, such as every 80 ms. The CET subframe 805 may be relatively short—for example 1 ms as illustrated in FIG. 8. In one example, as shown in FIG. 8, the CET transmission subframe, including for example the eSIB, may be transmitted at the beginning (e.g., in subframe 0) of the 80 ms interval. The transmission of the CET subframe 805 is thus periodic, and, in some examples, one or more of the parameters, such as the eSIB, may be transmitted by the base station at every instance of the CET.

As mentioned above, in some examples, some of the parameters that are transmitted during the CET subframe 805 may also be transmitted opportunistically at certain times in between CET subframes 805. For example, the eSIB may be transmitted in non-CET subframes in some examples after the base station performs a CCA prior to the non-CET subframe if the CCA is successful. Such non-CET transmissions of the eSIB may be at predefined intervals, such as at 20, 40, and 60 ms markers of the 80 ms interval illustrated in FIG. 8. Non-CET transmissions of the eSIB may be used to communicate dynamically modified LBT parameters and/or to provide different redundancy versions of the eSIB at different time intervals.

Still referring to FIG. 8, in one example, the transmission of one or more of the parameters (such as the eSIB) during the CET subframe 805 may span an entire bandwidth of a component carrier associated with the unlicensed radio frequency spectrum band. For example, the eSIB may be transmitted using an entire 20 MHz component carrier for 2.4 GHz or 5 GHz bands, an entire 10 MHz component carrier for a 3.5 GHz band, an entire 5 MHz component carrier for a 900 MHz band, and so forth.

Figure 9:
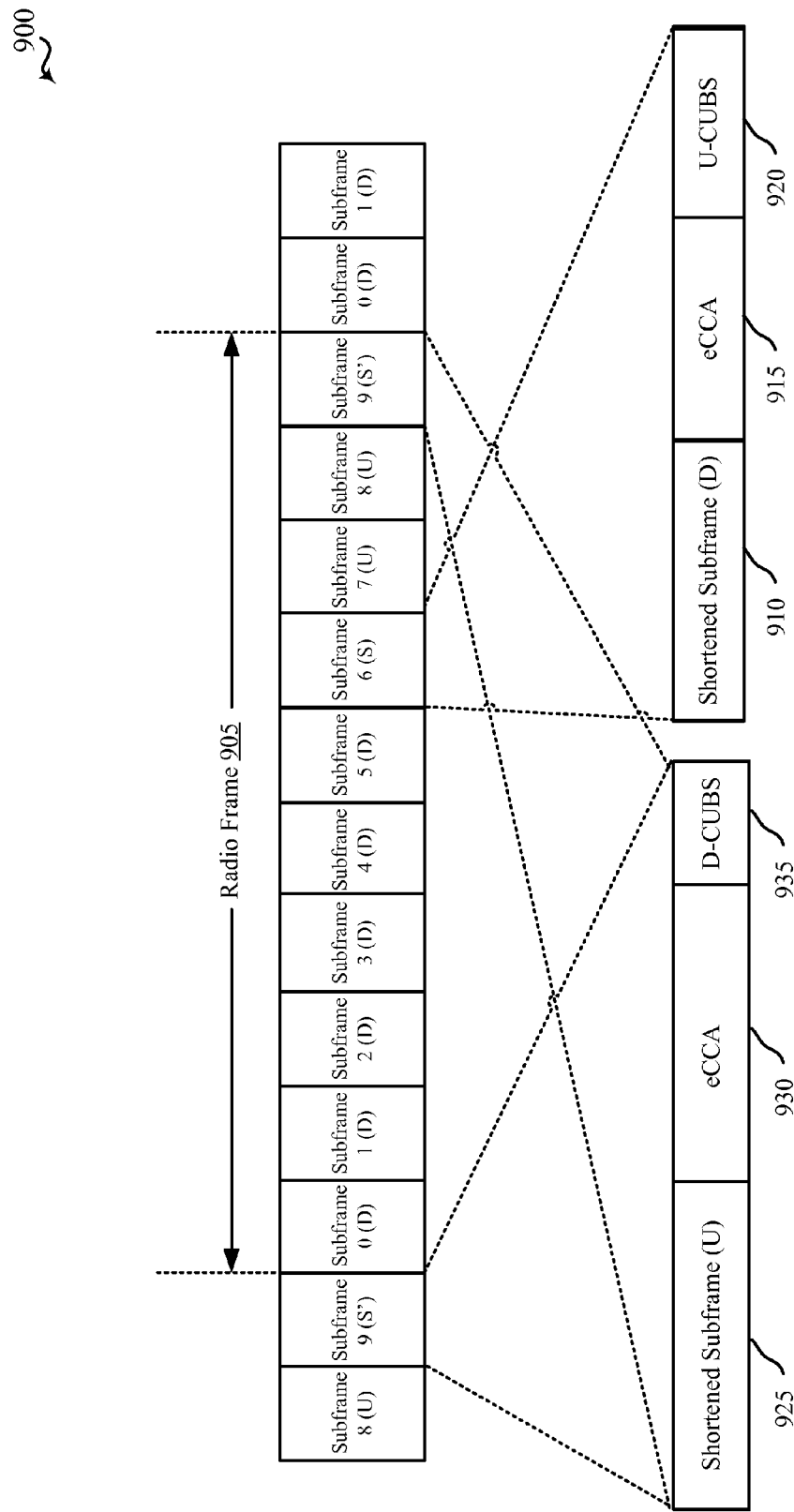
FIG. 9 shows a diagram of a radio frame defining a plurality of subframes for a particular TDD configuration, in accordance with various aspects of the present disclosure.

FIG. 9 shows a diagram 900 of a radio frame 905 defining a plurality of subframes for a particular TDD configuration, in accordance with various aspects of the present disclosure. In FIG. 9, the radio frame 905 includes 10 subframes, with subframes 0, 1, 2, 3, 4, and 5 being downlink subframes, subframe 6 being a special subframe (which includes a shortened downlink subframe 910, an ECCA period 915, and a U-CUBS period 920, subframes 7 and 8 being uplink subframes, and subframe 9 being another special subframe (which includes a shortened uplink subframe 925, an ECCA period 930, and a D-CUBS period 935).

Turning to the diagram 1000 shown in FIG. 10, the ECCA subframe 1030 will now be described in more detail. While FIG. 10 describes the ECCA 1005 procedure for downlink transmissions, the ECCA 1005 procedure for uplink transmissions may be similar in some examples. The ECCA subframe 1030 may include a plurality of CCA occasions 1040, 1045 each of which may be 20 microseconds (μs) long. Each CCA occasion 1040, 1045 may be deemed successful if the energy detected is less than a CCA energy, such as 80 dBm (which, as described above, may be advertised in the eSIB). The overall ECCA 1005 may be deemed successful if the number of successful CCA occasions 1040 is greater than the frame/subframe specific ECCA counter (with the successful CCA occasions not necessarily needing to be contiguous). More specifically, in one example, the frame/subframe specific counter N may be initialized at the beginning of the ECCA period and may be decremented by 1 with each CCA success, with the overall ECCA 1005 being deemed successful with the counter N reaches 0. In some examples, the ECCA 1005 procedure at the base station may be identical for unicast and broadcast transmissions.

Figure 10:
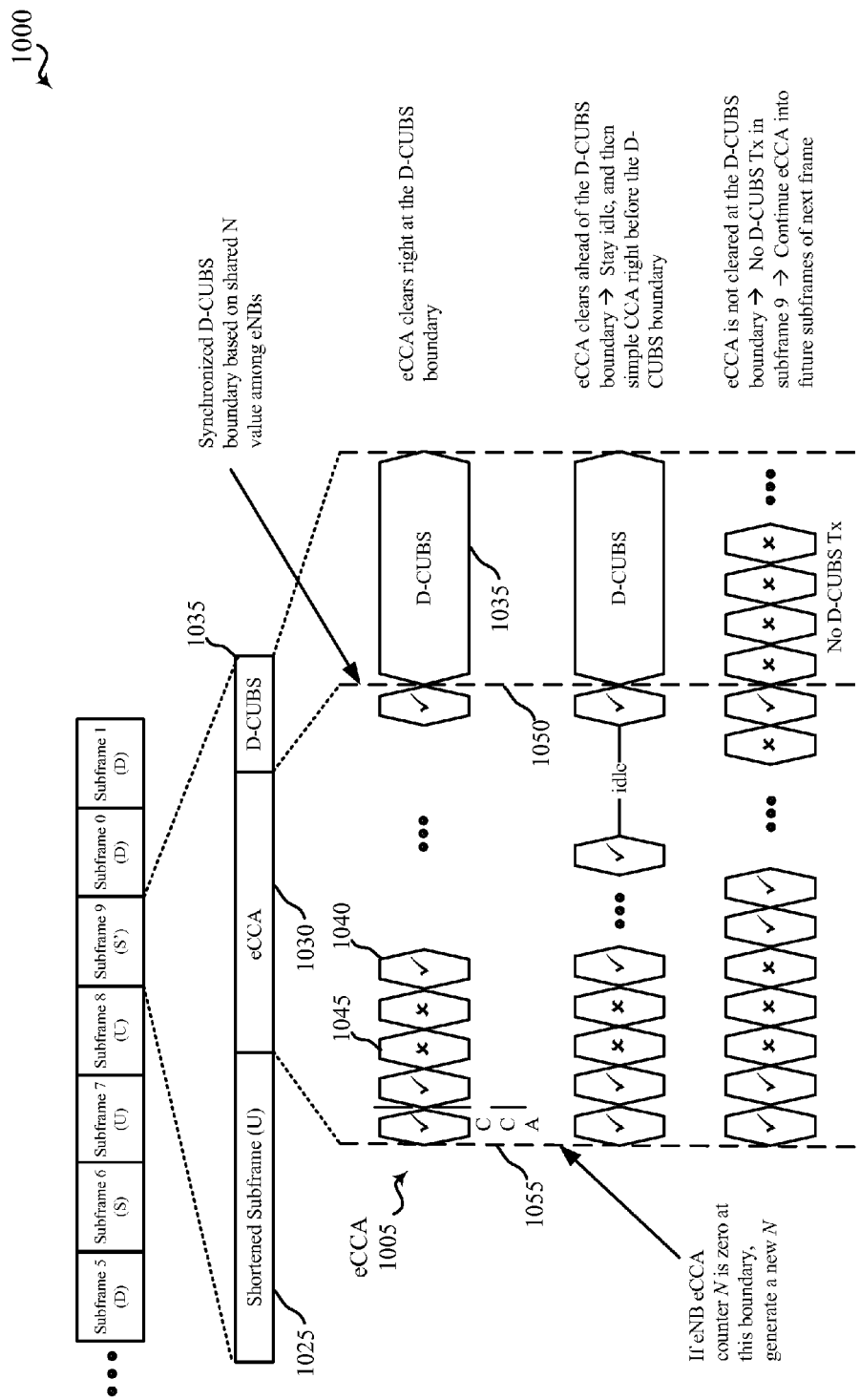
FIG. 10 shows a diagram of a radio frame illustrating an ECCA subframe, in accordance with various aspects of the present disclosure.

As illustrated in FIG. 10, the D-CUBS boundary 1050 may be synchronized based on a shared value (e.g., N) among base stations (e.g., eNBs), and, if the base station ECCA counter N is zero at the ECCA boundary 1055, a new N may be generated. In general, control and/or data transmission may be aligned to subframe boundaries (or boundaries of slots within a subframe) based on the synchronization of one or more base stations, UEs, etc. For example, a transmission over the unlicensed radio frequency spectrum band may be delayed, even after a successful ECCA, until at least one of a subframe boundary of a radio frame or a slot boundary of the radio frame. The base station operation during the ECCA 1005 procedure may, however, not be visible to the UE; the UE may only be able to assume the presence of D-CUBS 1035 in the last symbol slot of the subframe.

FIG. 10 illustrates three different ECCA 1005 procedures, which may correspond to three different base stations, three different UEs, or even to the same base station/UE pair over three different periods of time or three different channels. Checkmarks for each CCA occasion represent successful CCAs occasions 1040, while an X indicates an unsuccessful CCA occasion 1045. In the first (top) ECCA 1005 illustrated in FIG. 10, the last CCA before the D-CUBS boundary 1050 is the final count required to deem the overall ECCA successful. In this instance, because the ECCA 1005 is successful, the transmitter (e.g., the base station) may begin to transmit a CUBS at the CUBS boundary 1050.

In the second (middle) ECCA 1005 illustrated in FIG. 10, the ECCA 1005 may clear (i.e., the number of successful CCA occasions 1040 may be met) before the D-CUBS boundary 1050. In this instance, the transmitter may, however, enter an idle state until the synchronized D-CUBS boundary 1050 or just before the D-CUBS boundary 1050, thereby refraining from transmitting the D-CUBS immediately after the successful ECCA. In one example, immediately prior to the D-CUBS boundary 1050, one additional CCA occasion may be initialized in the last CCA slot of the ECCA subframe. If this additional CCA is successful, then the transmitter may proceed to transmit the D-CUBS at the D-CUBS boundary 1050. In other examples, however, the last CCA occasion may not be used and, after the idling period, the transmitter may transmit the D-CUBS based on the successful ECCA process.

In the third (bottom) ECCA 1005 illustrated in FIG. 10, the ECCA 1005 may not clear (i.e., may not be deemed successful) by the D-CUBS boundary 1050. Nonetheless, CCA occasions may continue to proceed following the D-CUBS boundary 1050 in order to allow the potential transmitter to continue to try to obtain access to the channel. In this instance, no D-CUBS is transmitted in the D-CUBS subframe 1035, but the ECCA 1005 process may nonetheless continue in case, for example, a separate transmitter relinquishes the channel. If the ECCA 1005 process is deemed successful sometime after the D-CUBS boundary 1050, the transmitter may, at that time, transmit the D-CUBS and begin using the channel for transmission.

Figure 11:
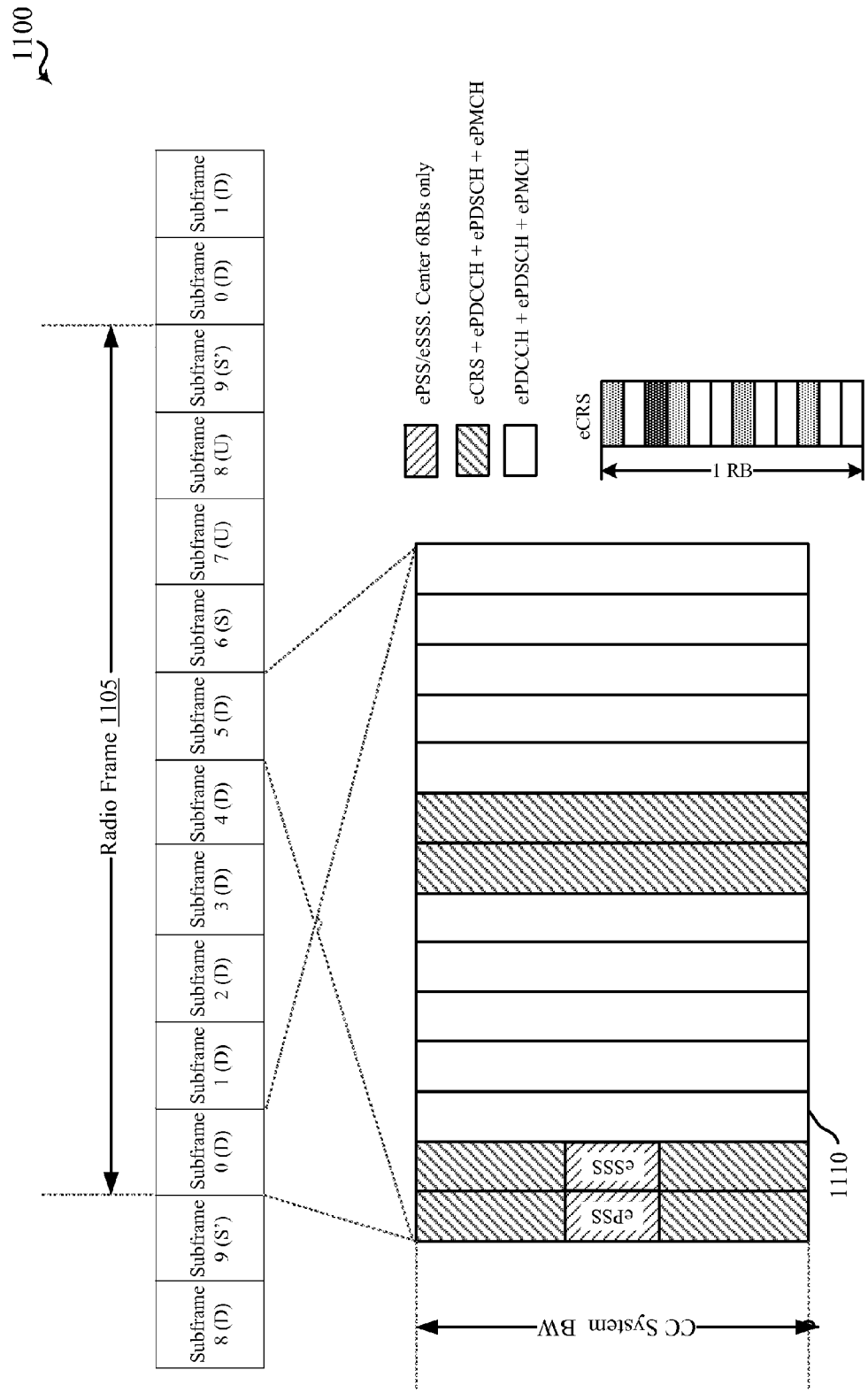
FIG. 11 shows a diagram of a radio frame illustrating a location in frequency and time of one or more synchronization signals (e.g., ePSS, eSSS, or a combination thereof) and an eCRS signal, in accordance with various aspects of the present disclosure.

FIG. 11 shows a diagram 1100 with more detail regarding certain subframes of the radio frame 1105, in accordance with various aspects of the present disclosure. The radio frame 1105 may be an example of aspects of the radio frame 905 described above with reference to FIG. 9. More specifically, FIG. 11 shows the location in frequency and time of one or more synchronization signals (e.g., ePSS, eSSS, or a combination thereof) and an eCRS signal. As mentioned above with reference to FIG. 8, the ePSS, eSSS, and eCRS signals may be transmitted in subframe 0 in the D-CET frame every 80 ms. In addition, these signals may be opportunistically provided during non-CET subframes based on ECCA success—i.e., they may be provided in non-CET subframes in which the transmitter is successful at obtaining the channel as described above with reference to FIG. 10.

As illustrated in FIG. 11, in one example, the ePSS, eSSS, and eCRS may opportunistically be provided in subframes 0 and 5 (mod 10). Each subframe may include 14 OFDM symbols 1110. More particularly, FIG. 11 shows ePSS being provided in the 6 center resource blocks (RBs) in symbol 0 of subframe 0 and/or 5 (mod 10) and eSSS being provided in the 6 center RBs in symbol 1 of subframe 0 and/or 5 (mod 10), with the ePSS and eSSS providing PCI together with symbol, slot, and/or radio frame boundary information in some examples. FIG. 11 also shows an eCRS being provided in symbols 0, 1, 7, and 8 of subframe 0 and/or 5 (mod 10) together with enhanced physical downlink control channel (ePDCCH), enhanced physical downlink shared channel (ePDSCH), and enhanced physical multicast channel (ePMCH), with these components spanning the entire component carrier in those symbols 1110, and the eCRS providing PCI information in some examples. In some examples, the eCRS may implicitly indicate a system frame number (SFN) timing such that a UE can determine a SFN timing based on a periodicity of the sequence of the eCRS. The sequence of the eCRS may have a periodicity of 80 ms in some examples (e.g., in standalone mode), and may be punctured in subframes 1-4, 6-9 in a radio frame. In the other OFDM symbols 1110 (i.e. symbols 2-6 and 9-13) of the subframes, ePDCCH, ePDSCH, and ePMCH information may be provided over the component carrier.

Figure 12:
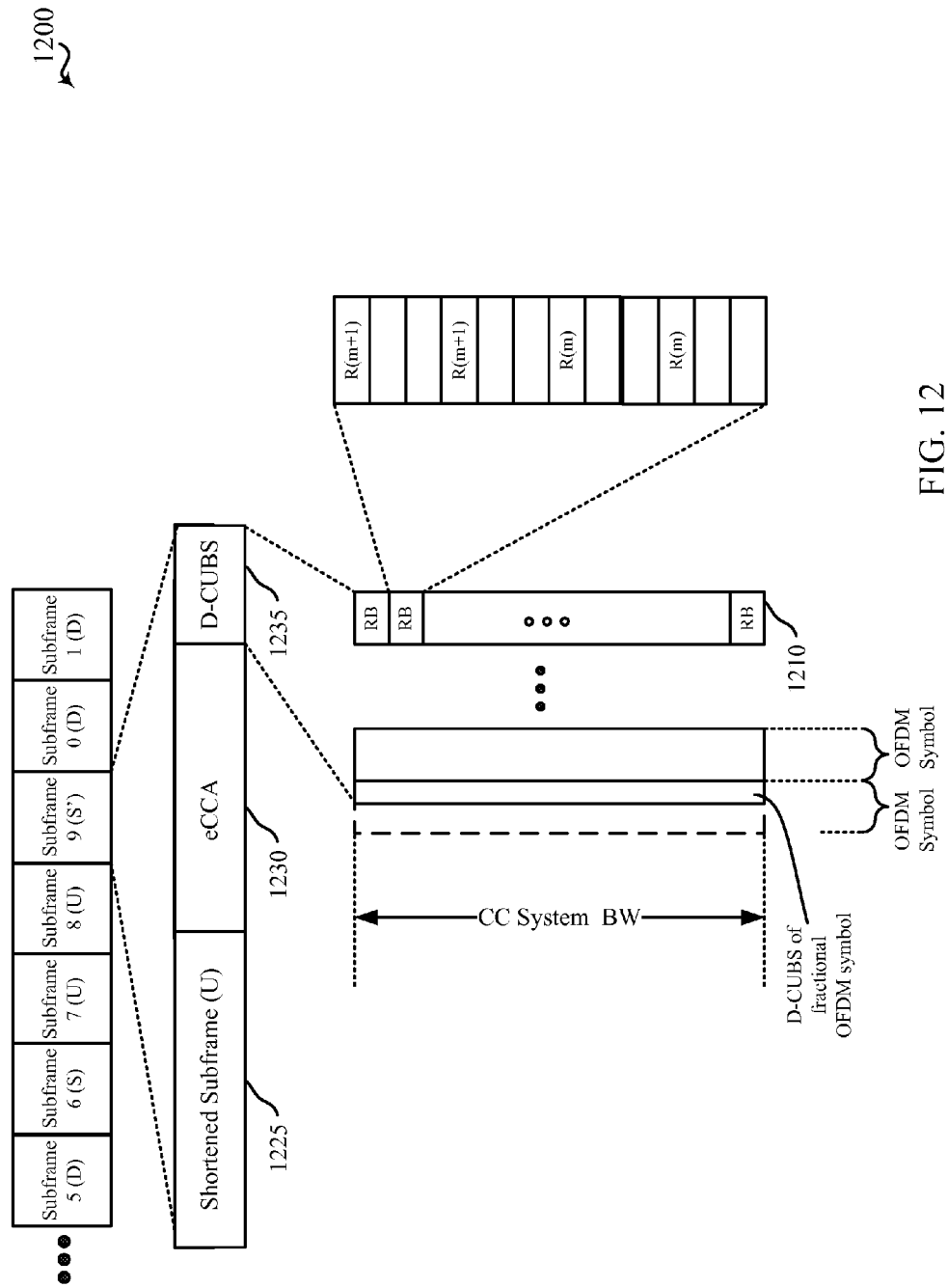
FIG. 12 shows a diagram of a radio frame illustrating a transmission of a D-CUBS during the radio frame, in accordance with various aspects of the present disclosure.

FIG. 12 shows a diagram 1200 with more detail regarding the transmission of a D-CUBS during the radio frame described above with reference to FIG. 9, in accordance with various aspects of the present disclosure. As illustrated in FIG. 12, the D-CUBS 1235 may be provided over the entire bandwidth of the component carrier. From the base station (e.g., eNB) perspective, the D-CUBS 1235 may be provided at variable locations in time, for example, as soon as ECCA succeeds. From the UE perspective, the D-CUBS may always be provided in symbol 13 (i.e. a last symbol 1210) of a candidate subframe. The sequence of the D-CUBS may be based on the cell-specific eCRS sequence, and the D-CUBS may include information regarding the DL:UL ratio in a radio frame, which may change. Alternatively, this information may be provided in the same symbol 1210 as the D-CUBS if not included within the D-CUBS. Also note that in some examples, UE implementations may use D-CUBS for channel state information (CSI), measurements, and so forth.

Still referring to FIG. 12, in some examples, a UE may interpret the presence of a CUBS during the last symbol 1210 of a subframe or slot as indicating that downlink data will be transmitted in the next (i.e., subsequent) subframe or slot based on the detected CUBS. Accordingly, the UE may prepare to and receive the downlink data in the next subframe or slot after detecting the CUBS in the last symbol 1210. The UE may also or alternatively determine a downlink (DL) to uplink (UL) ratio of a TDD radio frame based on the detected CUBS—for example, the DL to UP ratio may be determined based on the location of the subframe or slot within the radio frame in some examples.

Figure 13:
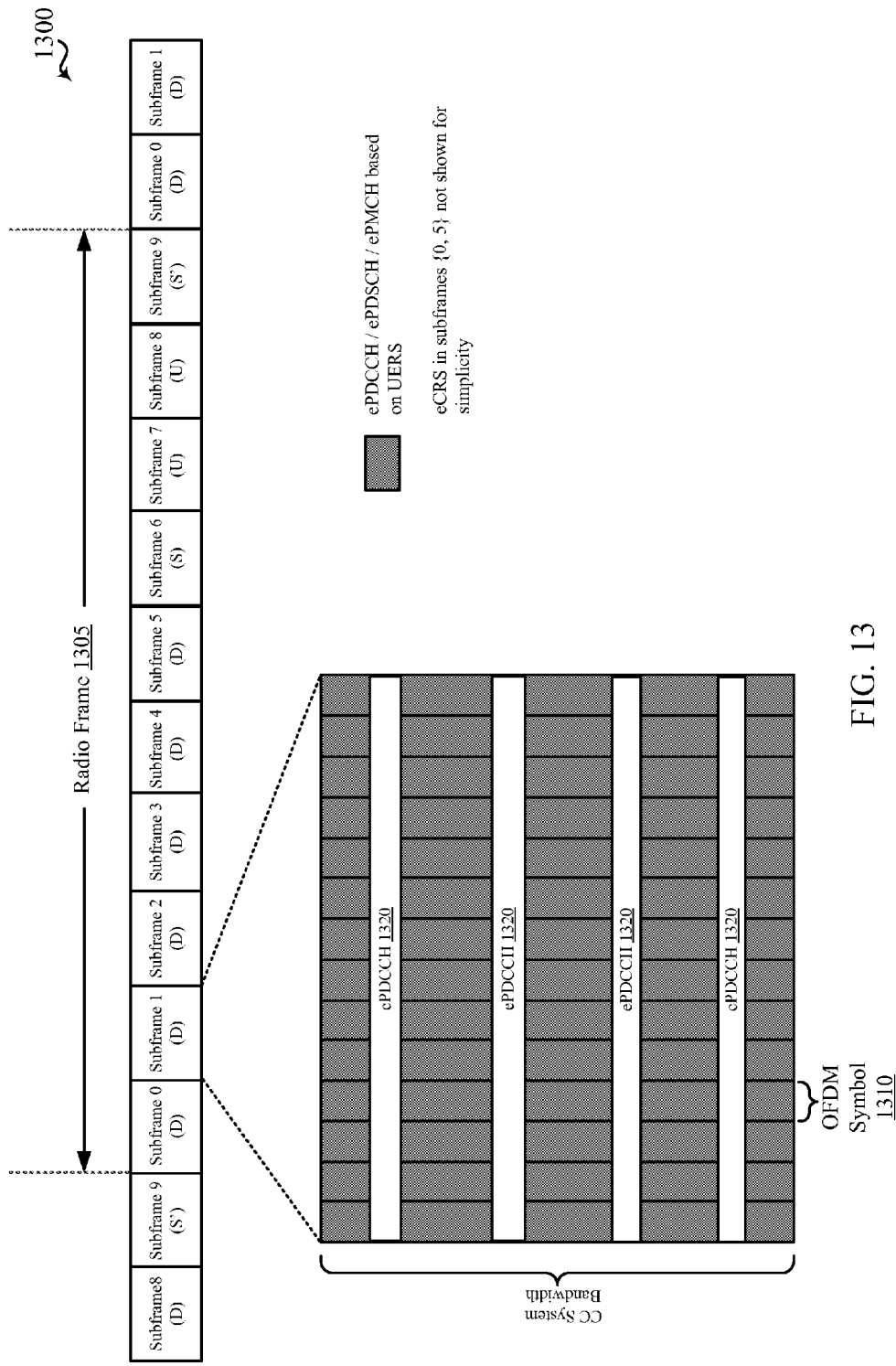
FIG. 13 shows a diagram illustrating another timing diagram of certain subframes, in accordance with various aspects of the present disclosure.

FIG. 13 shows a diagram 1300 illustrating another timing diagram of certain subframes of a radio frame 1305, in accordance with various aspects of the present disclosure. As illustrated in FIG. 13, the ePDCCH 1320, ePDSCH, and ePMCH may span the entire 1 ms subframe (with the eCRS, ePSS, and eSSS not being shown in FIG. 13 for simplicity). In some examples, UE-specific reference signal (UERS) based demodulation may be used for ePDCCH 1320, ePDSCH, and ePMCH. The UERS pattern may be built on a TM10 pattern for ePDCCH and ePDSCH, with additional tones optionally used for Nt estimation.

Figure 14:
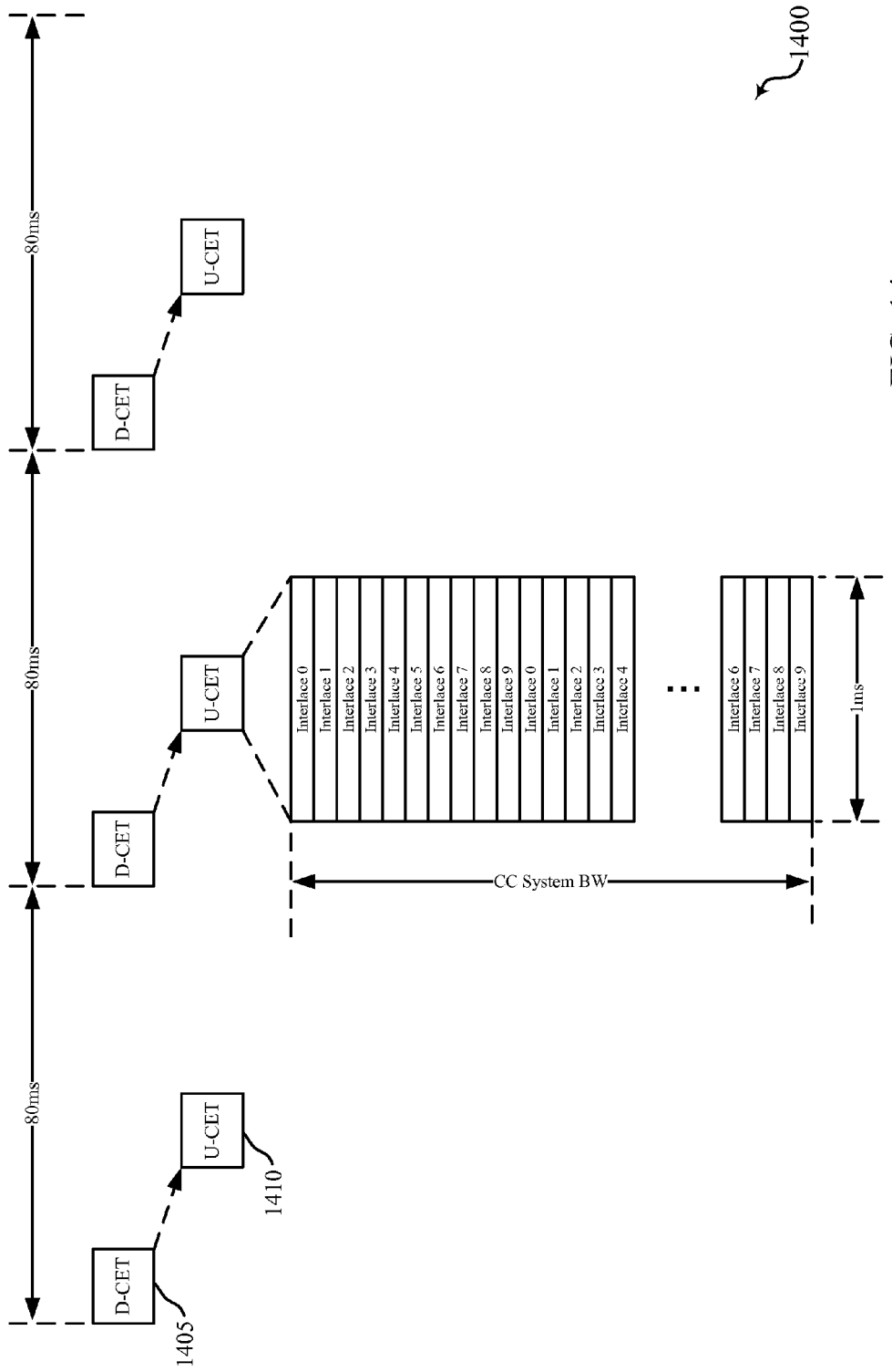
FIG. 14 shows a diagram illustrating an uplink CET (U-CET) subframe, in accordance with various aspects of the present disclosure.

While FIGS. 8-13 have generally described processes for the downlink portion of wireless communication, it will be appreciated than many concepts described are also applicable to the corresponding uplink portions of wireless communication. For example, and the CET and ECCA procedures described with reference to FIGS. 8 and 9 are also applicable to uplink transmissions. Turning now to FIG. 14, a diagram 1400 illustrating an uplink CET (U-CET) 1410 subframe is illustrated. The U-CET 1410 may include, for example, a scheduling request (eSR), a sounding reference signal (eSRS), and so forth, and may be transmitted on a physical uplink control channel (ePUCCH), a physical random access channel (ePRACH), and so forth. In some examples, the U-CET timing may be based on timing of a received downlink CET (D-CET) 1405. For example, a UE may receive a D-CET 1405, may determine the timing of the D-CET 1405, and may then transmit a U-CET 1410 based on the determined timing of the D-CET 1405. The timing of the U-CET 1410 may be based on the determined timing of the D-CET 1405 in some examples (e.g., the timing of the U-CET 1410 may be based on a fixed offset between the D-CET 1405 and U-CET 1410), and/or the D-CET 1405 may provide information regarding when the U-CET 1410 should be transmitted and the format the U-CET 1410 should follow.

Still referring to FIG. 14, in some examples, no CCA may be required by the transmitter, and the U-CET 1410 may include only control and other signaling, without any data. As illustrated in FIG. 14, in some examples, the U-CET 1410 may span the entire bandwidth of the relevant component carrier, similar to the D-CET 1405, as described above.

Figure 15:
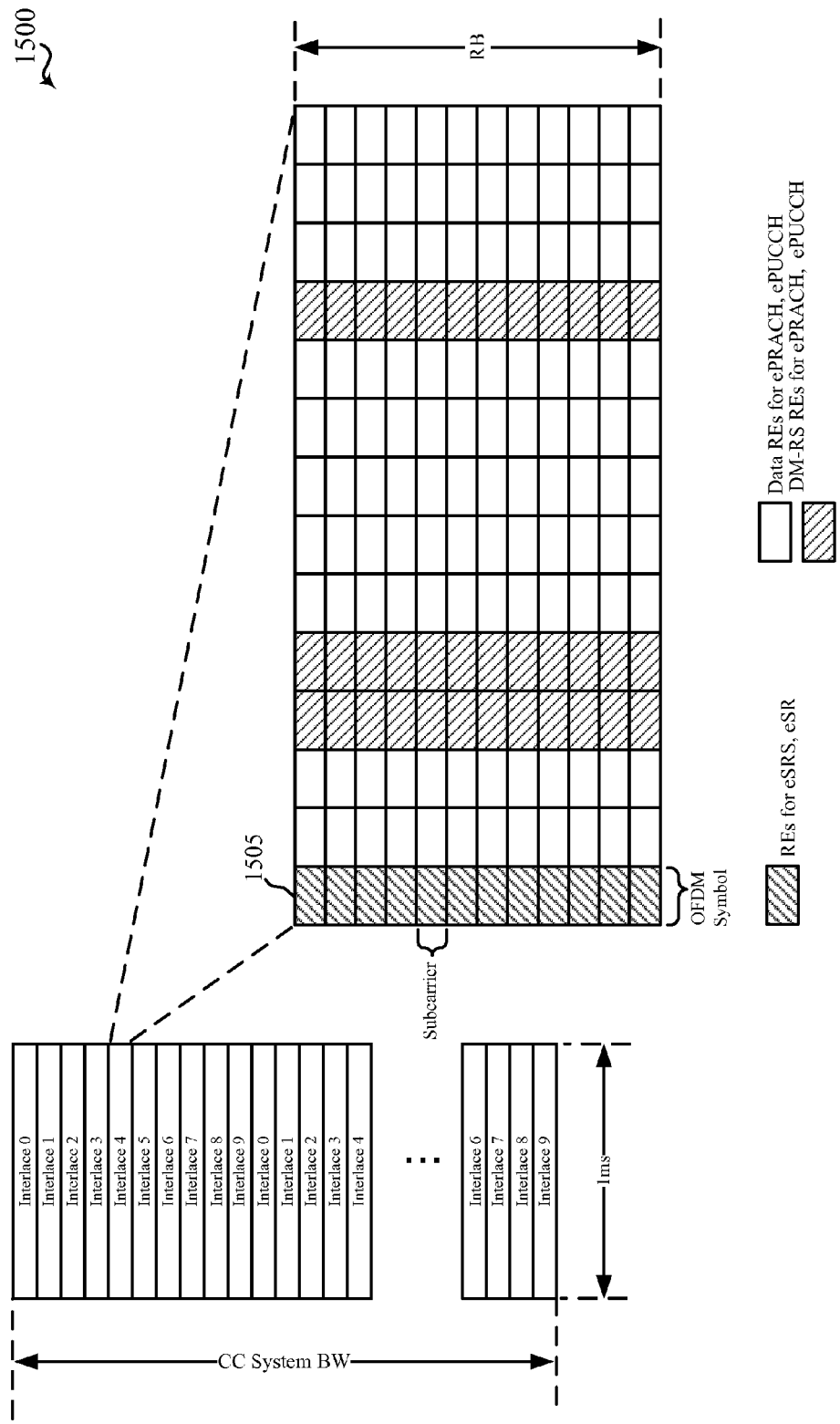
FIG. 15 shows a diagram illustrating an enlarged interlace of the U-CET, in accordance with various aspects of the present disclosure.

FIG. 15 shows a diagram 1500 of one enlarged interlace of the U-CET 1410 from FIG. 14. As illustrated in FIG. 15, symbol (1505) 0 of the interface may be a resource element (RE) for eSRS and/or eSR, symbols (1505) 3 and 10 may be demodulation reference signal (DM-RS) REs for ePRACH and/or ePUCCH, with the remaining symbols 1505 being data REs for ePRACH, ePUCCH. FIG. 15 also illustrates that the U-CET may have a 1 ms duration.

In some examples, and still referring to FIG. 15, a random access message (e.g., a RRC connection request, an RRC reconfiguration message, etc.) may be generated by a wireless device (e.g., a UE), and transmitted over an unlicensed radio frequency spectrum band at a guaranteed random access transmission opportunity during an U-CET 1410. In some instances, such a random access message may only be allowed in a standalone mode (e.g., not in a carrier aggregation mode), in order to provide a mechanism for cell access for the UEs. The random access message may be transmitted over a random access channel (e.g., ePRACH), which may span an entire bandwidth of a component carrier associated with the unlicensed radio frequency spectrum band. In some examples, the random access message may be transmitted based on one or more received access parameters for transmitting the random access message. For example, the parameters may be received in an eSIB (described above with reference to FIG. 8), with the parameter including one or more of a parameter identifying the guaranteed random access transmission opportunity, a parameter identifying an opportunistic random access transmission opportunity, and so forth. The guaranteed random access transmission opportunity may be available in radio frame 0 (mod 8), and the opportunistic random access transmission may be available in other frames or subframes based on availability of the channel as determined by an ECCA procedure described above.

Figure 16:
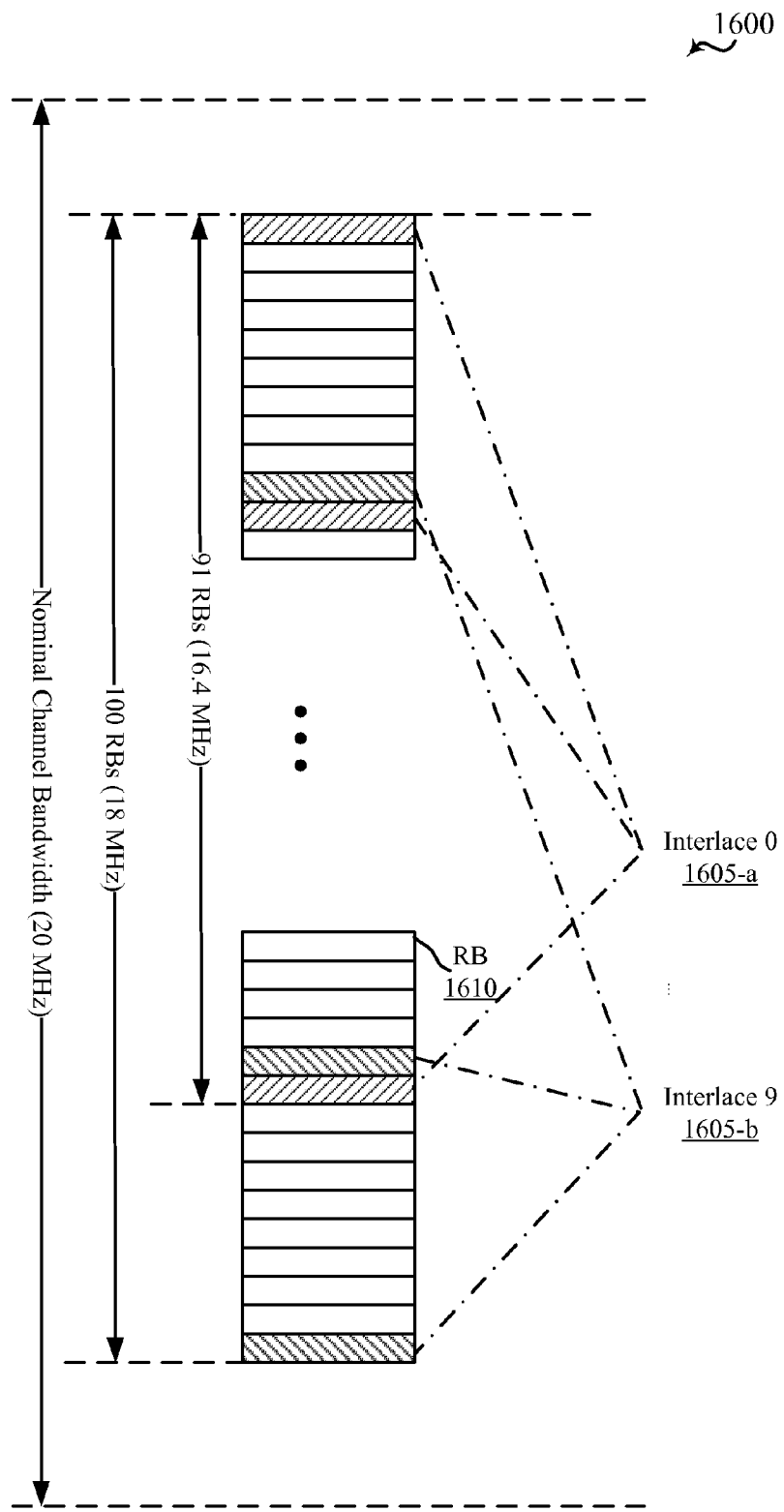
FIG. 16 shows a diagram corresponding to random access channels in accordance with various aspects of the present disclosure.

FIG. 16 shows a diagram 1600 corresponding to random access channels. The random access channels may have a multi-cluster, SC-FDMA structure, with resource block (RB) levels interleaved and being uniformly spaced in frequency. Each ePRACH may span one interlace 1605 or 10 RBs 1610. In some examples, a UE may select one of a plurality of the frequency domain interlaces of the unlicensed radio frequency spectrum band, with each of the frequency domain interlaces being associated with a random access channel (e.g., ePRACH). The selection of the interlace 1605 may be done randomly and/or based on a received access parameter (e.g., the eSIB may advertise available ePRACH interlaces). The UE may also transmit a random access message over the selected interlace 1605, and may in some examples do so during a U-CET subframe, or during a non-CET frame following a successful ECCA procedure. The random access message may be, for example, an RRC connection request, an RRC reconfiguration request, and so forth.

Figure 17:
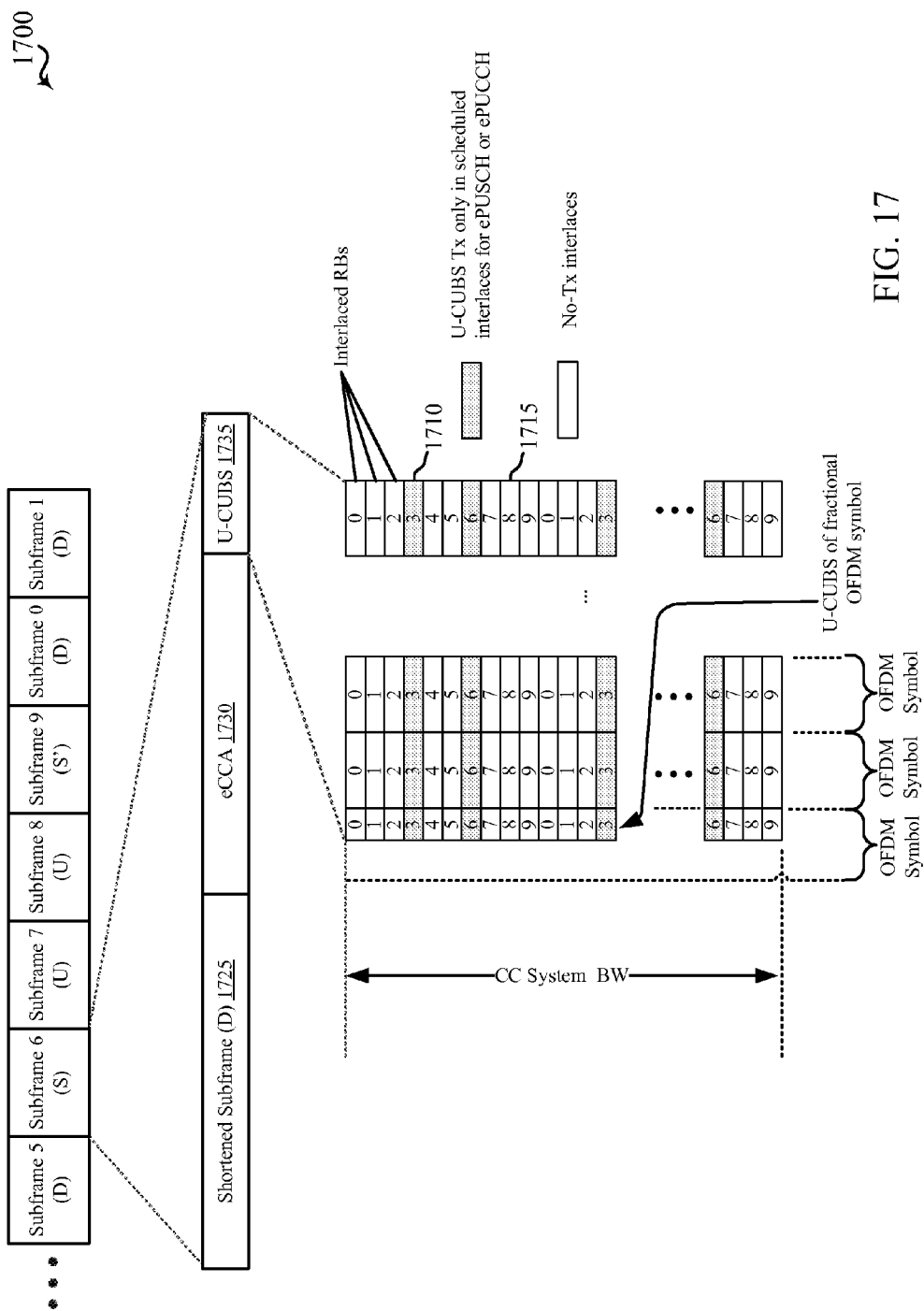
FIG. 17 shows a diagram of a radio subframe and an ECCA subframe for use in an ECCA procedure for uplink transmissions, in accordance with various aspects of the present disclosure.

Turning now to the diagram 1700 illustrated in FIG. 17, and with reference back to the radio frame 905 illustrated in FIG. 9 and the ECCA subframe 1030 illustrated in FIG. 10, the ECCA procedure for uplink transmissions will now be described. As mentioned above, the ECCA procedure for uplink transmissions is generally similar to the ECCA procedure for downlink transmissions. For example, there may be a frame/subframe specific ECCA counter N, which may or may not be the same as the counter in downlink ECCA, and may be advertised in the eSIB described above. The uplink ECCA procedure may also include energy thresholds, guard periods, and so forth, as described above with reference to FIG. 10. In FIG. 17, however, the transmission of U-CUBS 1735 may be different than the transmission of D-CUBS 1035 (of FIG. 10) in some examples. For example, and as illustrated in FIG. 17, U-CUBS 1735 may only be transmitted in scheduled interlaces 1710 for ePUSCH or ePUCCH in some examples, with no transmissions in other, unscheduled interlaces 1715. Furthermore, in some instances only scheduled UEs may be allowed to transmit the U-CUBS 1735, while non-scheduled UEs continue to perform pending ECCA from previous radio frames.

Figure 18:
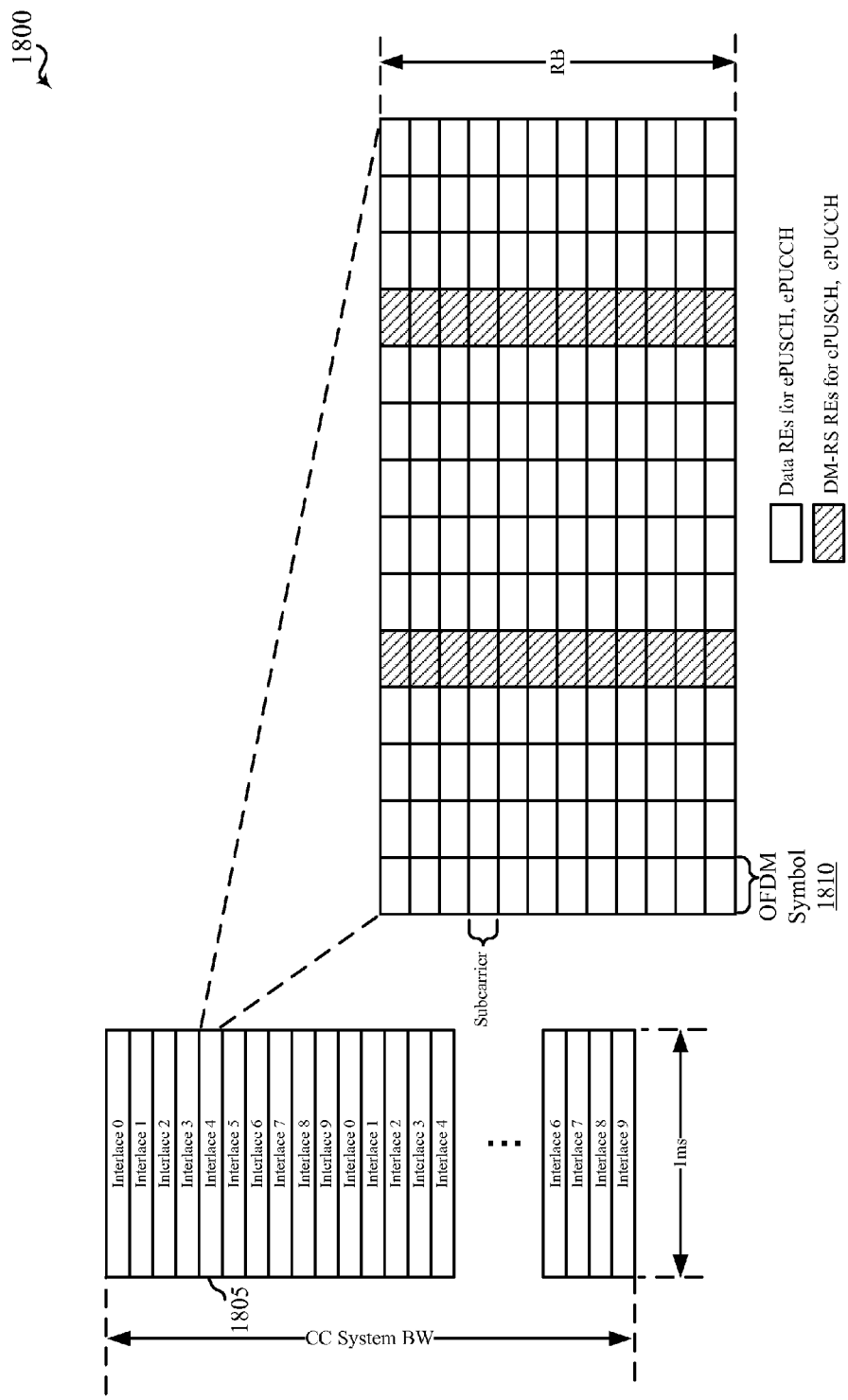
FIG. 18 shows a diagram of an enlarged interlace for use in an uplink SC-FDMA transmission, in accordance with various aspects of the present disclosure.
Figure 19:
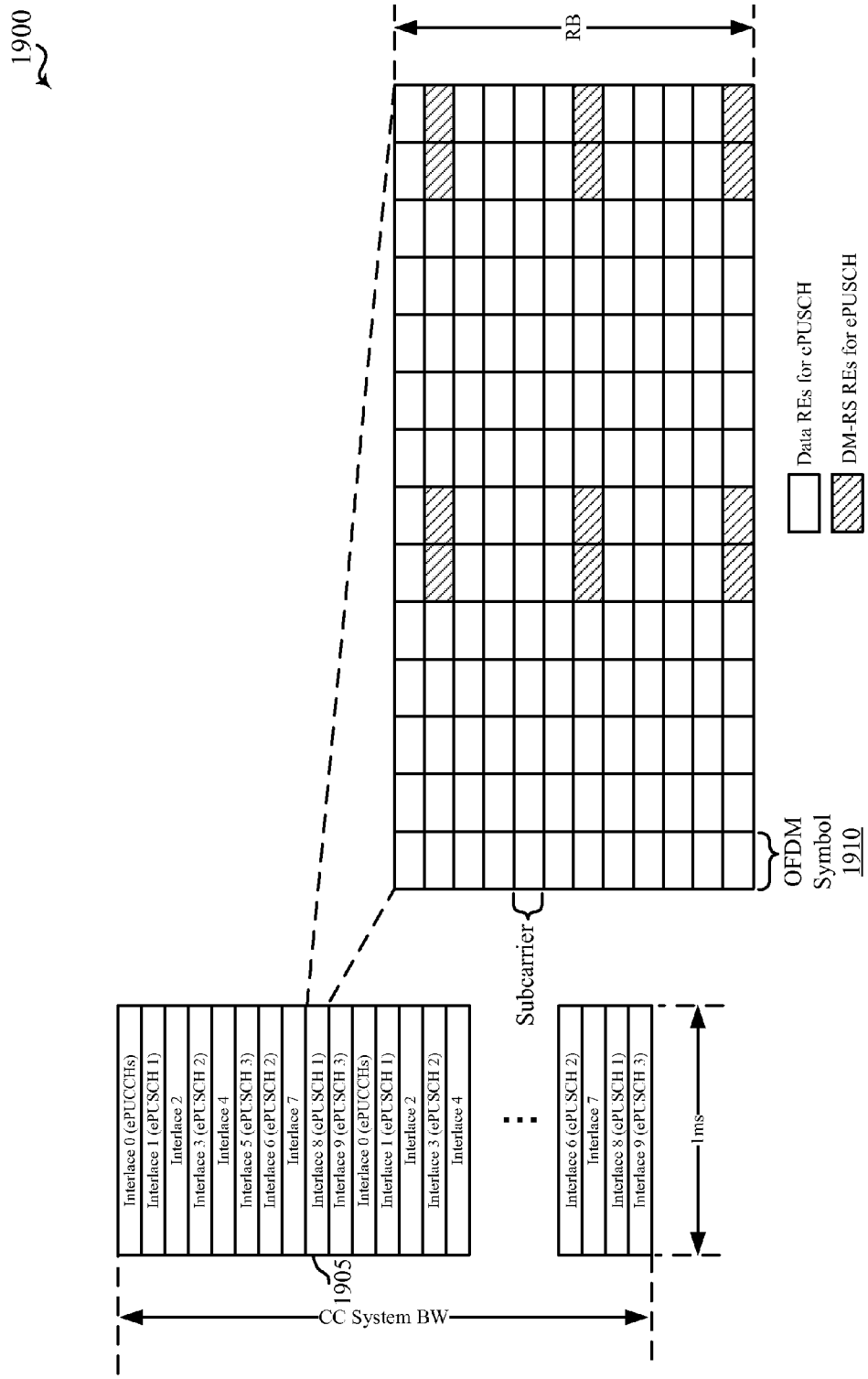
FIG. 19 shows a diagram of an enlarged interlace for use in an uplink OFDMA transmission, in accordance with various aspects of the present disclosure.

FIG. 18 shows a diagram 1800 of one enlarged interlace 1805 for use in an uplink SC-FDMA transmission. As illustrated in FIG. 18, DM-RS REs for ePUSCH and/or ePUCCH are transmitted over all 12 resource elements of the interlace 1805 during symbols (1810) 3 and 10, while data REs for ePUSCH and/or ePUCCH are transmitted during the other symbols 1810. FIG. 19 shows a diagram 1900 of one enlarged interlace 1905 for use in an uplink OFDMA transmission. As illustrated in FIG. 19, DM-RS REs for ePUSCH are transmitted over only a subset of the 12 resource elements during symbols (1910) 5-6 and 12-13, while data REs are transmitted over the remainder of the resource elements during those symbols 1910 and also during the other symbols 1910.

Referring to both FIGS. 18 and 19, in some examples OFDMA may be used for uplink transmissions because of higher modulation and coding scheme (MCS) and MIMO—UE capability. In these examples, the downlink and uplink waveforms may be symmetrical (i.e., the uplink transmission mode of the communication link may match the downlink transmission mode of the communication link). In order to determine whether OFDMA or SC-FDMA should be used for uplink transmissions, a set of channel parameters associated with a communication link over an unlicensed radio frequency spectrum band may be identified and, based on the set of parameters, a transmitter may select between OFDMA and SC-FDMA transmission modes. For example, if the parameters indicate that a communication link is configured for MIMO, a certain type of transmission mode (e.g., OFDMA) may be used. As another example, if the parameters indicate that a modulation and coding scheme for the communication link is greater than a threshold, a certain type of transmission mode (e.g., OFDMA) may be used.

Figure 20:
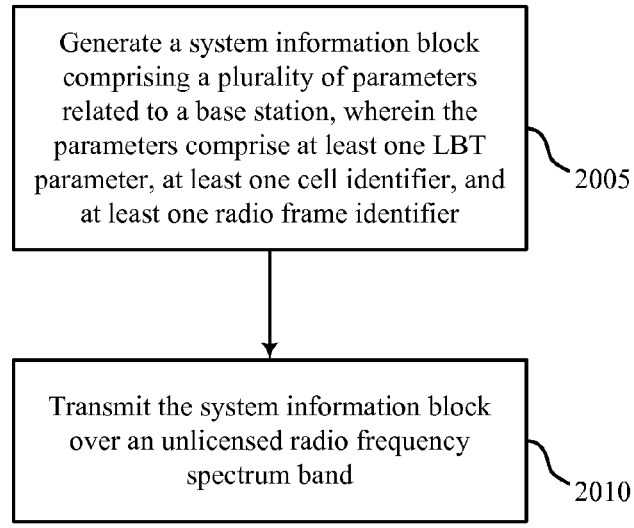
FIGS. 20-38 show flowcharts illustrating methods for wireless communication in accordance with various aspects of the present disclosure.

FIG. 20 shows a flowchart 2000 illustrating a method for wireless communication in accordance with various aspects of the present disclosure. The functions of flowchart 2000 may be implemented by a base station 105 or its components as described with reference to FIGS. 1, 2, 4, 5, and 39. In certain examples, the blocks of the flowchart 2000 may be performed by the controller module 410, 510, and/or 3910 as described with reference to FIGS. 4, 5, and/or 39.

At block 2005, the base station may generate a system information block comprising a plurality of parameters related to a base station, wherein the parameters comprise at least one LBT parameter, at least one cell identifier, and at least one radio frame identifier. In certain examples, the functions of block 2005 may be performed by the SIB module 550 as described above with reference to FIG. 5.

At block 2010, the base station may transmit the system information block over an unlicensed radio frequency spectrum band. In certain examples, the functions of block 2010 may be performed by the SIB module 550 as described above with reference to FIG. 5.

It should be noted that the method of flowchart 2000 is just one implementation and that the operations of the method, and the steps may be rearranged or otherwise modified such that other implementations are possible.

Figure 21:
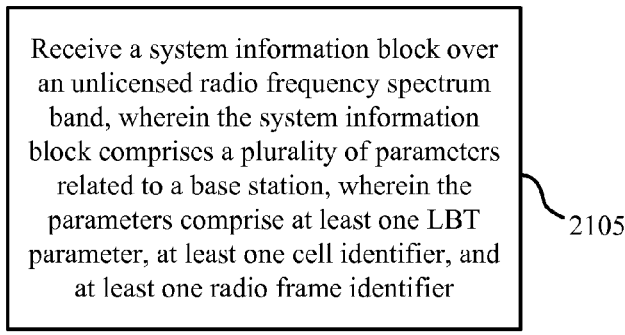

FIG. 21 shows a flowchart 2100 illustrating a method for wireless communication in accordance with various aspects of the present disclosure. The functions of flowchart 2100 may be implemented by a UE 115 or its components as described with reference to FIGS. 1, 2, 6, 7, and 40. In certain examples, the blocks of the flowchart 2100 may be performed by the controller module 610, 710, and/or 4010 as described with reference to FIGS. 6, 7, and/or 40.

At block 2105, the UE may receive a system information block over an unlicensed radio frequency spectrum band, wherein the system information block comprises a plurality of parameters related to a base station, wherein the parameters comprise at least one LBT parameter, at least one cell identifier, and at least one radio frame identifier. In certain examples, the functions of block 2105 may be performed by the SIB module 750 as described above with reference to FIG. 7.

It should be noted that the method of flowchart 2100 is just one implementation and that the operations of the method, and the steps may be rearranged or otherwise modified such that other implementations are possible.

Figure 22:
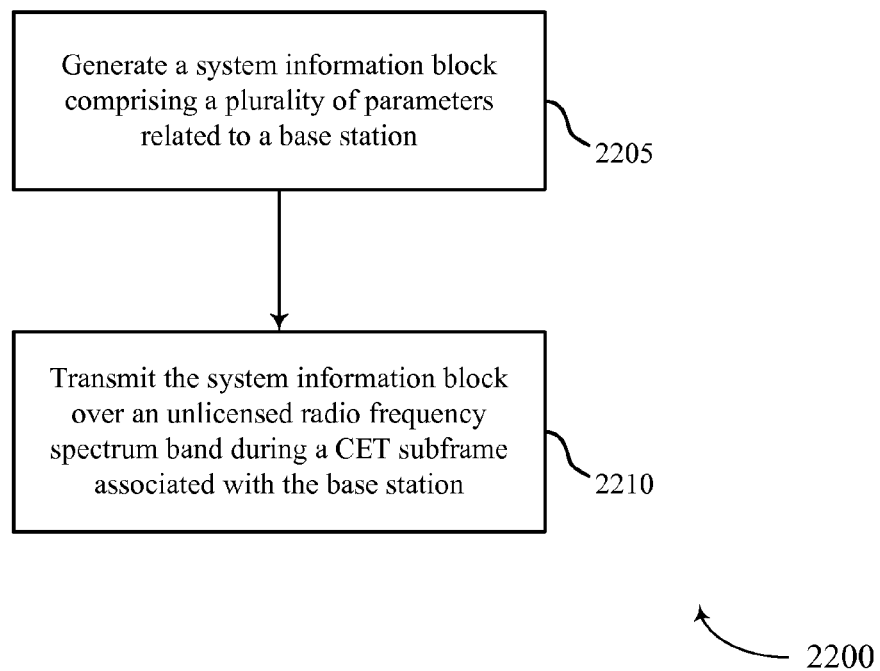

FIG. 22 shows a flowchart 2200 illustrating a method for wireless communication in accordance with various aspects of the present disclosure. The functions of flowchart 2200 may be implemented by a base station 105 or its components as described with reference to FIGS. 1, 2, 4, 5, and 39. In certain examples, the blocks of the flowchart 2200 may be performed by the controller module 410, 510, and/or 3910 as described with reference to FIGS. 4, 5, and/or 39.

At block 2205, the base station may generate a system information block comprising a plurality of parameters related to a base station. In certain examples, the functions of block 2205 may be performed by the SIB module 550 as described above with reference to FIG. 5.

At block 2210, the base station may transmit the system information block over an unlicensed radio frequency spectrum band during a CET subframe associated with the base station. In certain examples, the functions of block 2210 may be performed by the SIB module 550 as described above with reference to FIG. 5.

It should be noted that the method of flowchart 2200 is just one implementation and that the operations of the method, and the steps may be rearranged or otherwise modified such that other implementations are possible.

Figure 23:
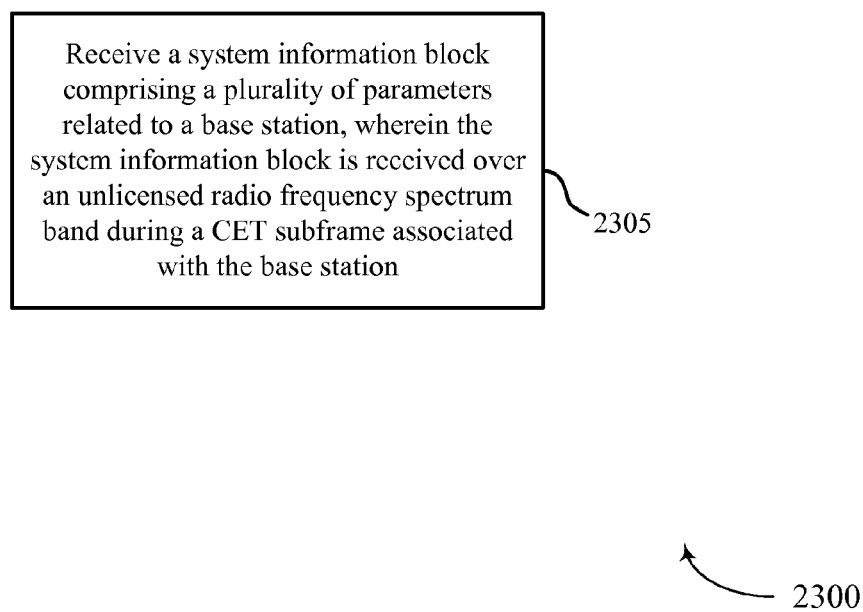

FIG. 23 shows a flowchart 2300 illustrating a method for wireless communication in accordance with various aspects of the present disclosure. The functions of flowchart 2300 may be implemented by a UE 115 or its components as described with reference to FIGS. 1, 2, 6, 7, and 40. In certain examples, the blocks of the flowchart 2300 may be performed by the controller module 610, 710, and/or 4010 as described with reference to FIGS. 6, 7, and/or 40.

At block 2305, the UE may receive a system information block comprising a plurality of parameters related to a base station, wherein the system information block is received over an unlicensed radio frequency spectrum band during a CET subframe associated with the base station. In certain examples, the functions of block 2305 may be performed by the SIB module 750 as described above with reference to FIG. 7.

It should be noted that the method of flowchart 2300 is just one implementation and that the operations of the method, and the steps may be rearranged or otherwise modified such that other implementations are possible.

Figure 24:
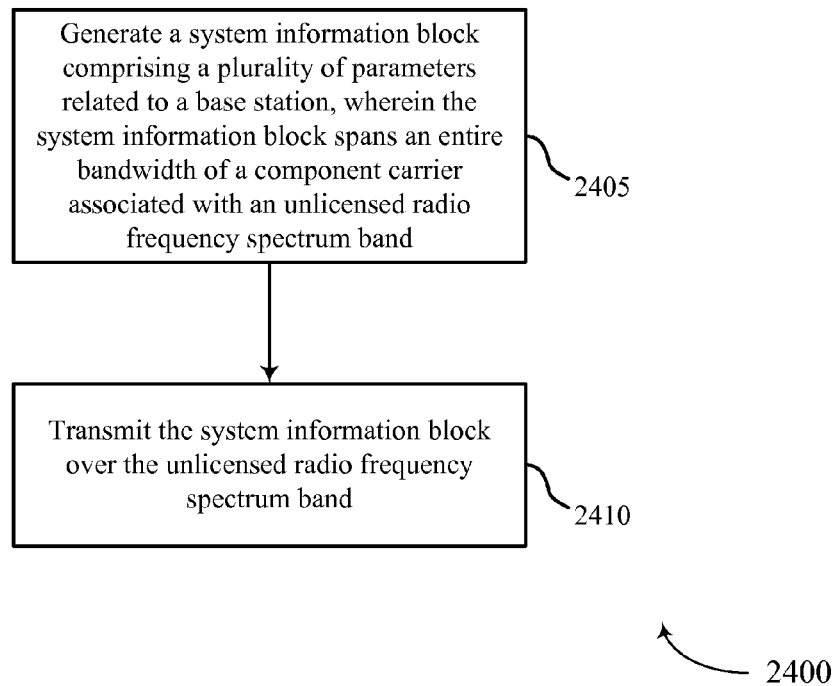

FIG. 24 shows a flowchart 2400 illustrating a method for wireless communication in accordance with various aspects of the present disclosure. The functions of flowchart 2400 may be implemented by a base station 105 or its components as described with reference to FIGS. 1, 2, 4, 5 and 39. In certain examples, the blocks of the flowchart 2400 may be performed by the controller module 410, 510, and/or 3910 as described with reference to FIGS. 4, 5, and/or 39.

At block 2405, the base station may generate a system information block comprising a plurality of parameters related to a base station, wherein the system information block spans an entire bandwidth of a component carrier associated with an unlicensed radio frequency spectrum band. In certain examples, the functions of block 2405 may be performed by the SIB module 550 as described above with reference to FIG. 5.

At block 2410, the base station may transmit the system information block over the unlicensed radio frequency spectrum band. In certain examples, the functions of block 2410 may be performed by the SIB module 550 as described above with reference to FIG. 5.

It should be noted that the method of flowchart 2400 is just one implementation and that the operations of the method, and the steps may be rearranged or otherwise modified such that other implementations are possible.

Figure 25:
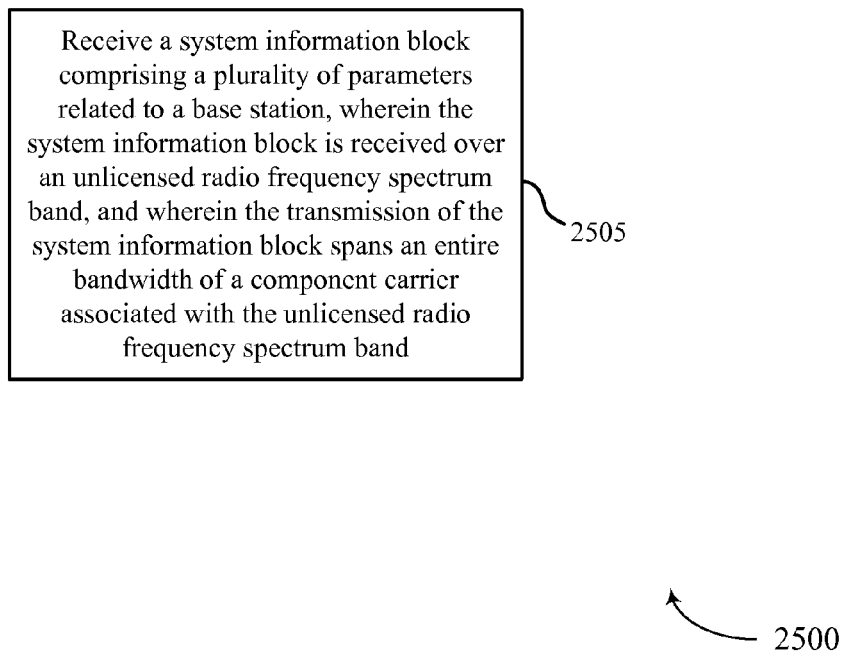

FIG. 25 shows a flowchart 2500 illustrating a method for wireless communication in accordance with various aspects of the present disclosure. The functions of flowchart 2500 may be implemented by a UE 115 or its components as described with reference to FIGS. 1, 2, 6, 7, and 40. In certain examples, the blocks of the flowchart 2500 may be performed by the controller module 610, 710, and/or 4010 as described with reference to FIGS. 6, 7, and/or 40.

At block 2505, the UE may receive a system information block comprising a plurality of parameters related to a base station, wherein the system information block is received over an unlicensed radio frequency spectrum band, and wherein the transmission of the system information block spans an entire bandwidth of a component carrier associated with the unlicensed radio frequency spectrum band. In certain examples, the functions of block 2505 may be performed by the SIB module 750 as described above with reference to FIG. 7.

It should be noted that the method of flowchart 2500 is just one implementation and that the operations of the method, and the steps may be rearranged or otherwise modified such that other implementations are possible.

Figure 26:
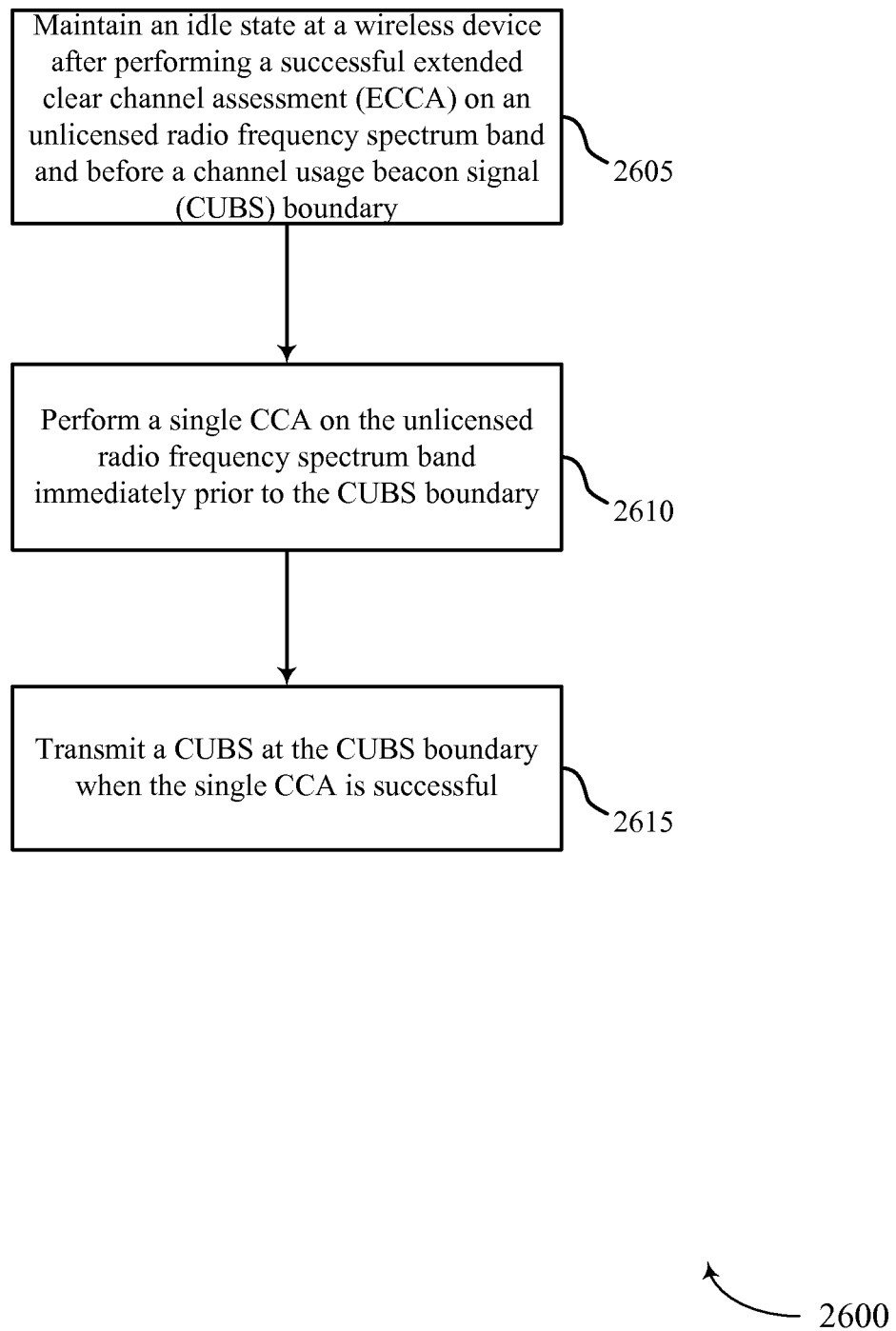

FIG. 26 shows a flowchart 2600 illustrating a method for wireless communication in accordance with various aspects of the present disclosure. The functions of flowchart 2600 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 2600 may be performed by the controller 410, 510, 610, or 710 module as described with reference to FIGS. 4-7.

At block 2605, a wireless device may maintain an idle state after performing a successful ECCA on an unlicensed radio frequency spectrum band and before a CUBS boundary. In certain examples, the functions of block 2605 may be performed by the ECCA module 515 or 715 as described above with reference to FIGS. 5 and 7.

At block 2610, the wireless device may perform a single CCA on the unlicensed radio frequency spectrum band immediately prior to the CUBS boundary. In certain examples, the functions of block 2610 may be performed by the ECCA module 515 or 715 as described above with reference to FIGS. 5 and 7.

At block 2615, the wireless device may transmit a CUBS at the CUBS boundary when the single CCA is successful. In certain examples, the functions of block 2615 may be performed by the ECCA module 515 or 715 as described above with reference to FIGS. 5 and 7.

It should be noted that the method of flowchart 2600 is just one implementation and that the operations of the method, and the steps may be rearranged or otherwise modified such that other implementations are possible.

Figure 27:
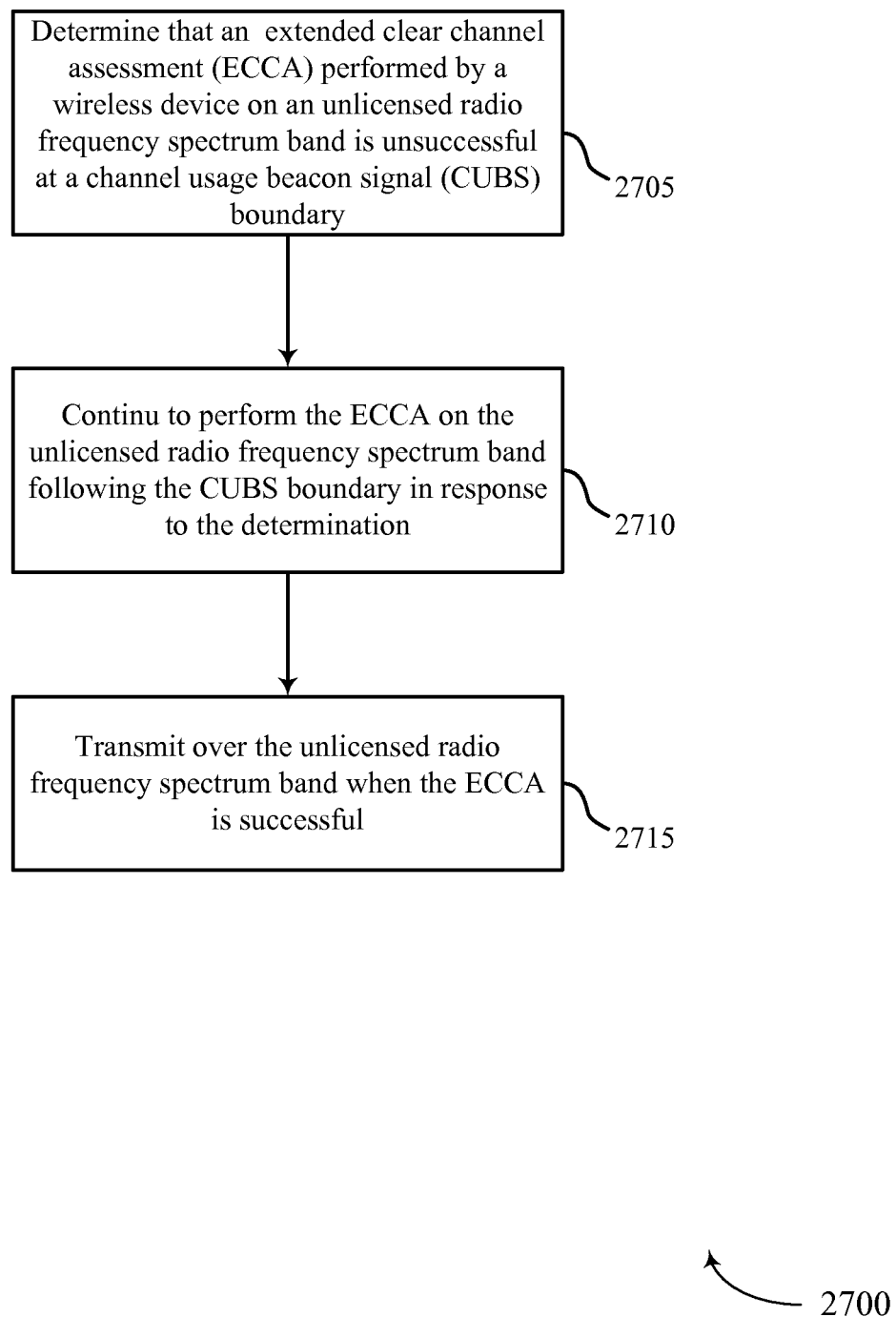

FIG. 27 shows a flowchart 2700 illustrating a method for wireless communication in accordance with various aspects of the present disclosure. The functions of flowchart 2700 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 2700 may be performed by the controller module 410, 510, 610, 710, 3910, or 4010 as described with reference to FIGS. 4-7, 39, and 40.

At block 2705, the wireless device may determine that an ECCA performed by the wireless device on an unlicensed radio frequency spectrum band is unsuccessful at a CUBS boundary. In certain examples, the functions of block 2705 may be performed by the ECCA module 515 or 715 as described above with reference to FIGS. 5 and 7.

At block 2710, the wireless device may continue to perform the ECCA on the unlicensed radio frequency spectrum band following the CUBS boundary in response to the determination. In certain examples, the functions of block 2710 may be performed by the ECCA module 515 or 715 as described above with reference to FIGS. 5 and 7.

At block 2715, the wireless device may transmit over the unlicensed radio frequency spectrum band when the ECCA is successful. In certain examples, the functions of block 2715 may be performed by the ECCA module 515 or 715 as described above with reference to FIGS. 5 and 7.

It should be noted that the method of flowchart 2700 is just one implementation and that the operations of the method, and the steps may be rearranged or otherwise modified such that other implementations are possible.

Figure 28:
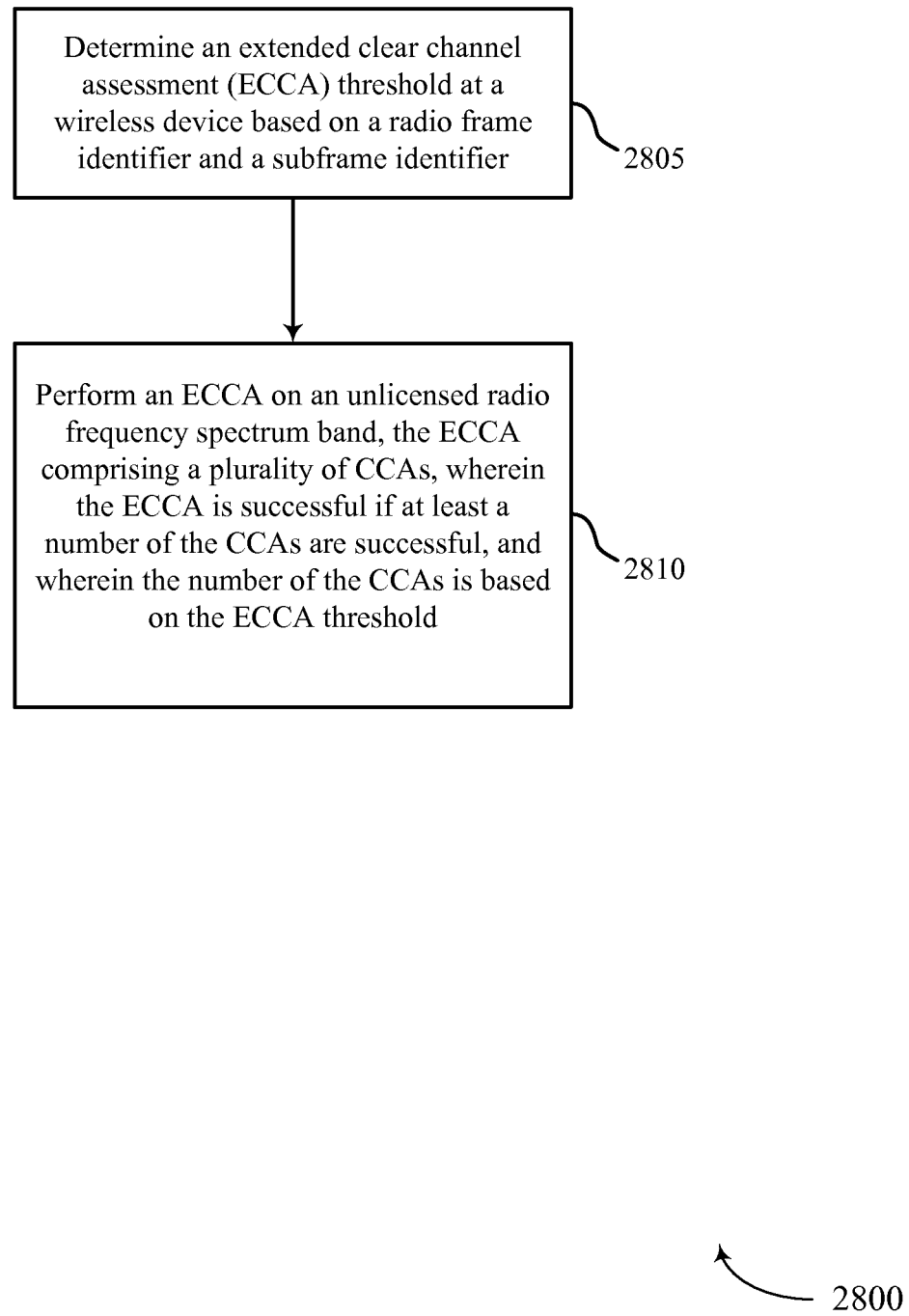

FIG. 28 shows a flowchart 2800 illustrating a method for wireless communication in accordance with various aspects of the present disclosure. The functions of flowchart 2800 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 2800 may be performed by the controller module 410, 510, 610, 710, 3910, or 4010 as described with reference to FIGS. 4-7, 39, and 40.

At block 2805, the wireless device may determine an ECCA threshold based on a radio frame identifier and a subframe identifier. In certain examples, the functions of block 2805 may be performed by the ECCA module 515 or 715 as described above with reference to FIGS. 5 and 7.

At block 2810, the wireless device may perform an ECCA on an unlicensed radio frequency spectrum band, the ECCA comprising a plurality of CCAs. In certain examples, the functions of block 2810 may be performed by the ECCA module 515 or 715 as described above with reference to FIGS. 5 and 7. The ECCA may be successful if at least a number of the CCAs are successful, and wherein the number of the CCAs is based on the ECCA threshold. In certain examples, the functions of block 2815 may be performed by the ECCA module 515 or 715 as described above with reference to FIGS. 5 and 7.

It should be noted that the method of flowchart 2800 is just one implementation and that the operations of the method, and the steps may be rearranged or otherwise modified such that other implementations are possible.

Figure 29:
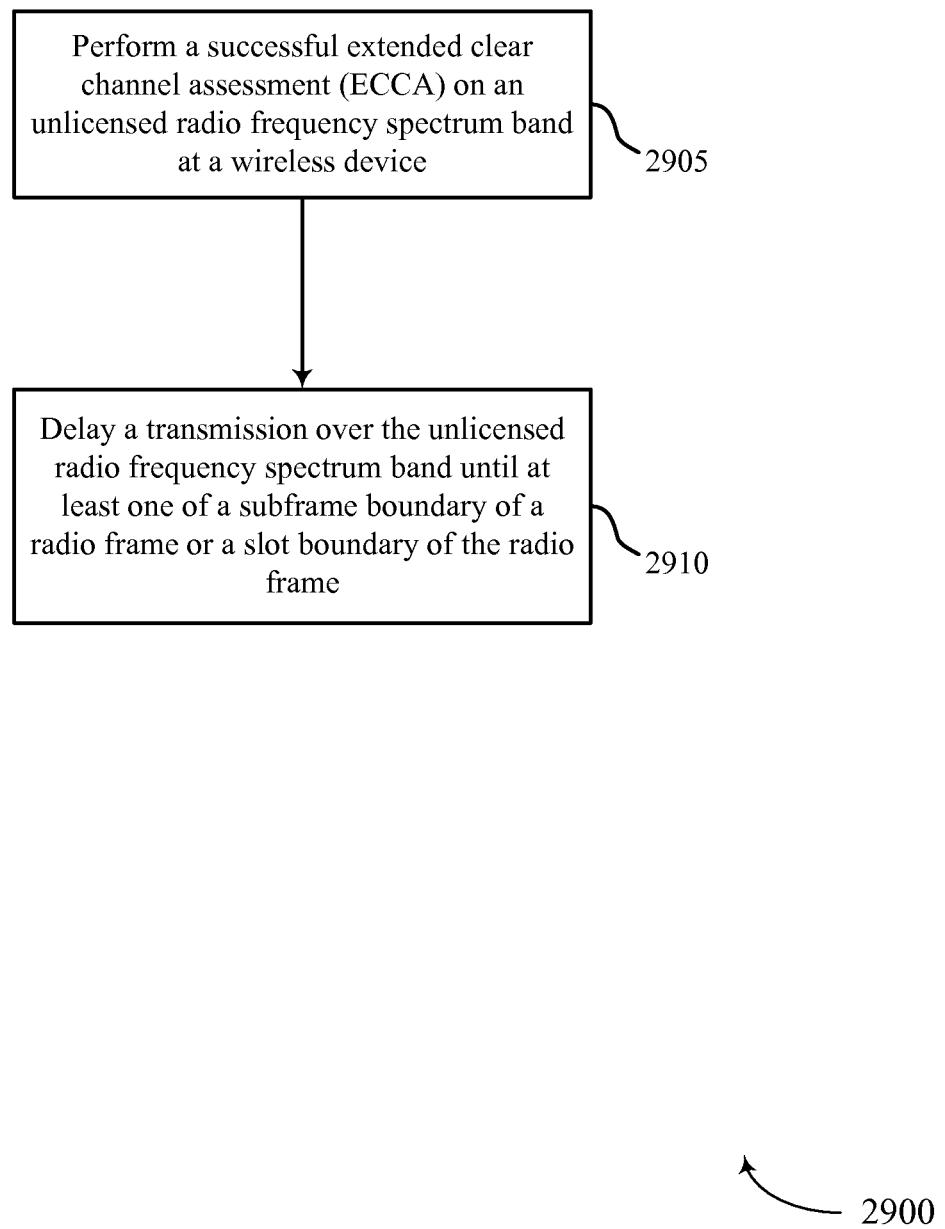

FIG. 29 shows a flowchart 2900 illustrating a method for wireless communication in accordance with various aspects of the present disclosure. The functions of flowchart 2900 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 2900 may be performed by the controller module 410, 510, 610, 710, 3910, or 4010 as described with reference to FIGS. 4-7, 39, and 40.

At block 2905, the wireless device may perform a successful ECCA on an unlicensed radio frequency spectrum band. In certain examples, the functions of block 2905 may be performed by the ECCA module 515 or 715 as described above with reference to FIGS. 5 and 7.

At block 2910, the device may delay a transmission over the unlicensed radio frequency spectrum band until at least one of a subframe boundary of a radio frame or a slot boundary of the radio frame. In certain examples, the functions of block 2910 may be performed by the ECCA module 515 or 715 as described above with reference to FIGS. 5 and 7.

It should be noted that the method of flowchart 2900 is just one implementation and that the operations of the method, and the steps may be rearranged or otherwise modified such that other implementations are possible.

Figure 30:
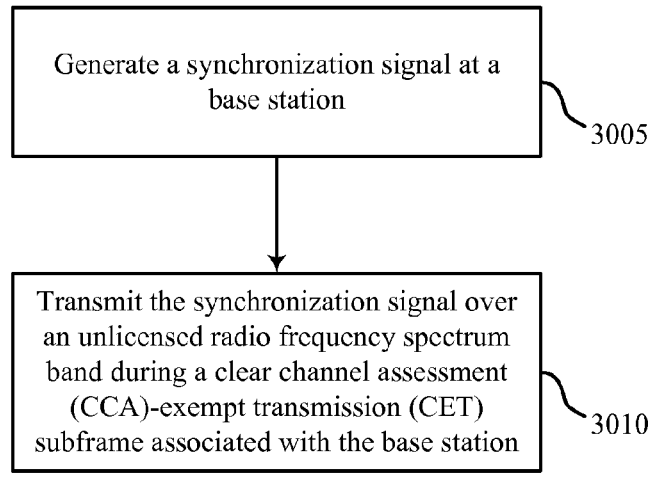

FIG. 30 shows a flowchart 3000 illustrating a method for wireless communication in accordance with various aspects of the present disclosure. The functions of flowchart 3000 may be implemented by a base station 105 or its components as described with reference to FIGS. 1, 2, 4, 5, and 39. In certain examples, the blocks of the flowchart 3000 may be performed by the controller module 410, 510, and/or 3910 as described with reference to FIGS. 4, 5, and/or 39.

At block 3005, the base station may generate a synchronization signal. In certain examples, the functions of block 3005 may be performed by the synchronization signal module 520 as described above with reference to FIG. 5.

At block 3010, the base station may transmit the synchronization signal over an unlicensed radio frequency spectrum band during a CET subframe associated with the base station. In certain examples, the functions of block 3010 may be performed by the synchronization signal module 520 as described above with reference to FIG. 5.

It should be noted that the method of flowchart 3000 is just one implementation and that the operations of the method, and the steps may be rearranged or otherwise modified such that other implementations are possible.

Figure 31:
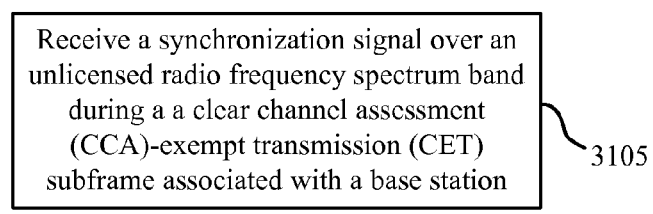

FIG. 31 shows a flowchart 3100 illustrating a method for wireless communication in accordance with various aspects of the present disclosure. The functions of flowchart 3100 may be implemented by a UE 115 or its components as described with reference to FIGS. 1, 2, 6, 7, and 40. In certain examples, the blocks of the flowchart 3100 may be performed by the controller module 610, 710, and/or 4010 as described with reference to FIGS. 6, 7, and/or 40.

At block 3105, the UE may receive a synchronization signal over an unlicensed radio frequency spectrum band during a CET subframe associated with a base station. In certain examples, the functions of block 3105 may be performed by the synchronization signal module 720 as described above with reference to FIG. 7.

It should be noted that the method of flowchart 3100 is just one implementation and that the operations of the method, and the steps may be rearranged or otherwise modified such that other implementations are possible.

Figure 32:
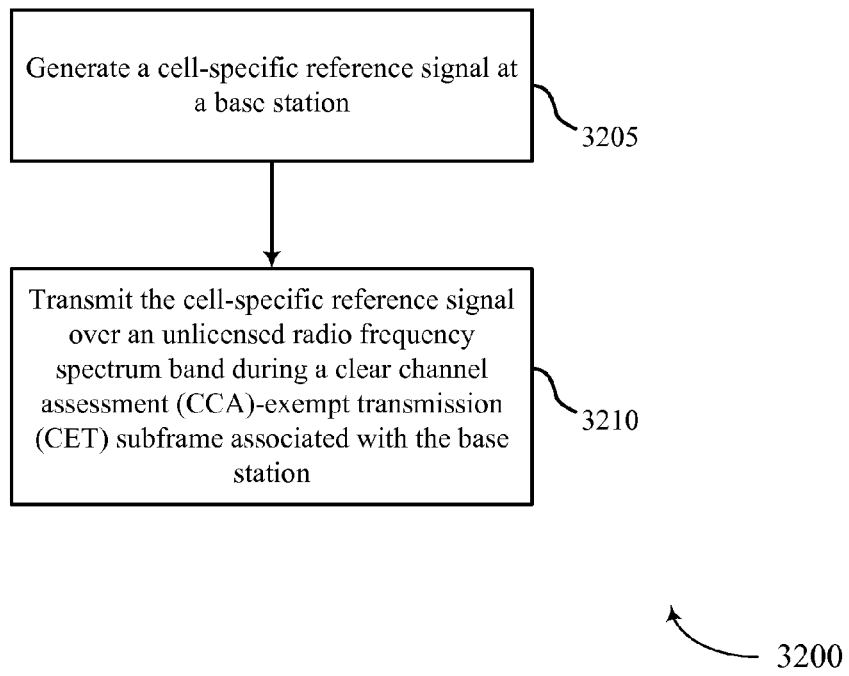

FIG. 32 shows a flowchart 3200 illustrating a method for wireless communication in accordance with various aspects of the present disclosure. The functions of flowchart 3200 may be implemented by a base station 105 or its components as described with reference to FIGS. 1, 2, 4, 5, and 39. In certain examples, the blocks of the flowchart 3200 may be performed by the controller module 410, 510, and/or 3910 as described with reference to FIGS. 4, 5, and/or 39.

At block 3205, the base station may generate a cell-specific reference signal. In certain examples, the functions of block 3205 may be performed by the reference signal module 525 as described above with reference to FIG. 5.

At block 3210, the base station may transmit the cell-specific reference signal over an unlicensed radio frequency spectrum band during a CET subframe associated with the base station. In certain examples, the functions of block 3210 may be performed by the reference signal module 525 as described above with reference to FIG. 5.

It should be noted that the method of flowchart 3200 is just one implementation and that the operations of the method, and the steps may be rearranged or otherwise modified such that other implementations are possible.

Figure 33:
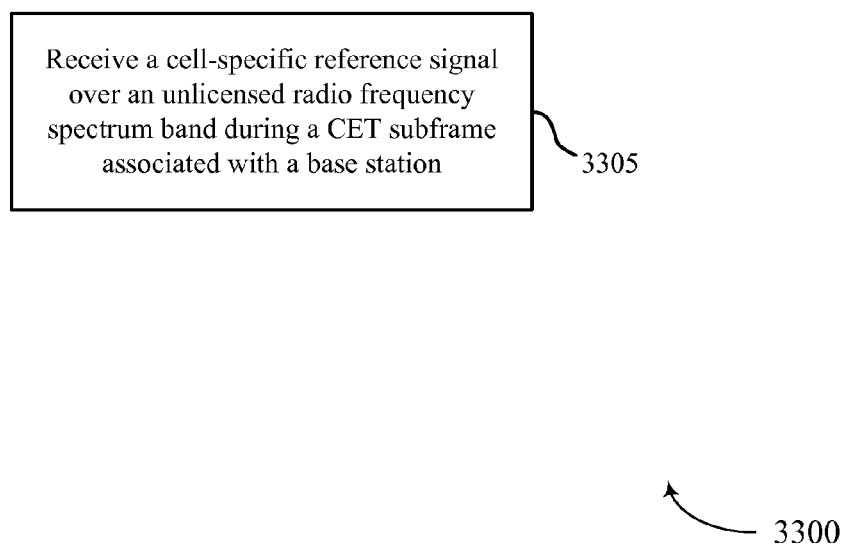

FIG. 33 shows a flowchart 3300 illustrating a method for wireless communication in accordance with various aspects of the present disclosure. The functions of flowchart 3300 may be implemented by a UE 115 or its components as described with reference to FIGS. 1, 2, 6, 7, and 40. In certain examples, the blocks of the flowchart 3300 may be performed by the controller module 610, 710, and/or 4010 as described with reference to FIGS. 6, 7, and/or 40.

At block 3305, the UE may receive a cell-specific reference signal over an unlicensed radio frequency spectrum band during a CET subframe associated with a base station. In certain examples, the functions of block 3305 may be performed by the reference signal module 725 as described above with reference to FIG. 7.

It should be noted that the method of flowchart 3300 is just one implementation and that the operations of the method, and the steps may be rearranged or otherwise modified such that other implementations are possible.

Figure 34:
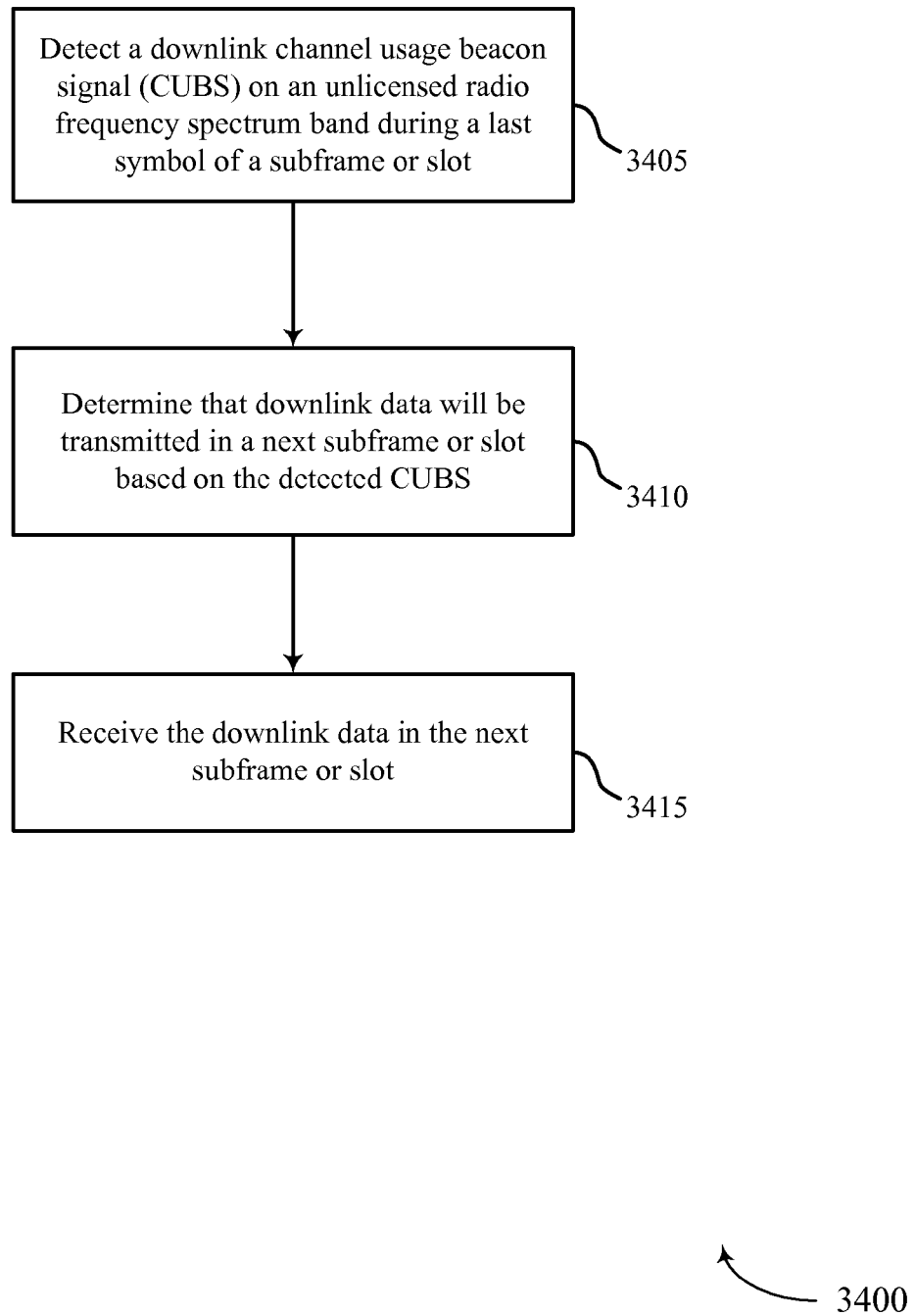

FIG. 34 shows a flowchart 3400 illustrating a method for wireless communication in accordance with various aspects of the present disclosure. The functions of flowchart 3400 may be implemented by a UE 115 or its components as described with reference to FIGS. 1, 2, 6, 7, and 40. In certain examples, the blocks of the flowchart 3400 may be performed by the controller module 610, 710, and/or 4010 as described with reference to FIGS. 6, 7, and/or 40.

At block 3405, the UE may detect a downlink CUBS on an unlicensed radio frequency spectrum band during a last symbol of a subframe or slot. In certain examples, the functions of block 3405 may be performed by the D CUBS module 730 as described above with reference to FIG. 7.

At block 3410, the UE may determine that downlink data will be transmitted in a next subframe or slot based on the detected CUBS. In certain examples, the functions of block 3410 may be performed by the D CUBS module 730 as described above with reference to FIG. 7.

At block 3415, the UE may receive the downlink data in the next subframe or slot. In certain examples, the functions of block 3415 may be performed by the D CUBS module 730 and/or the receiver 605 as described above with reference to FIG. 7.

It should be noted that the method of flowchart 3400 is just one implementation and that the operations of the method, and the steps may be rearranged or otherwise modified such that other implementations are possible.

Figure 35:
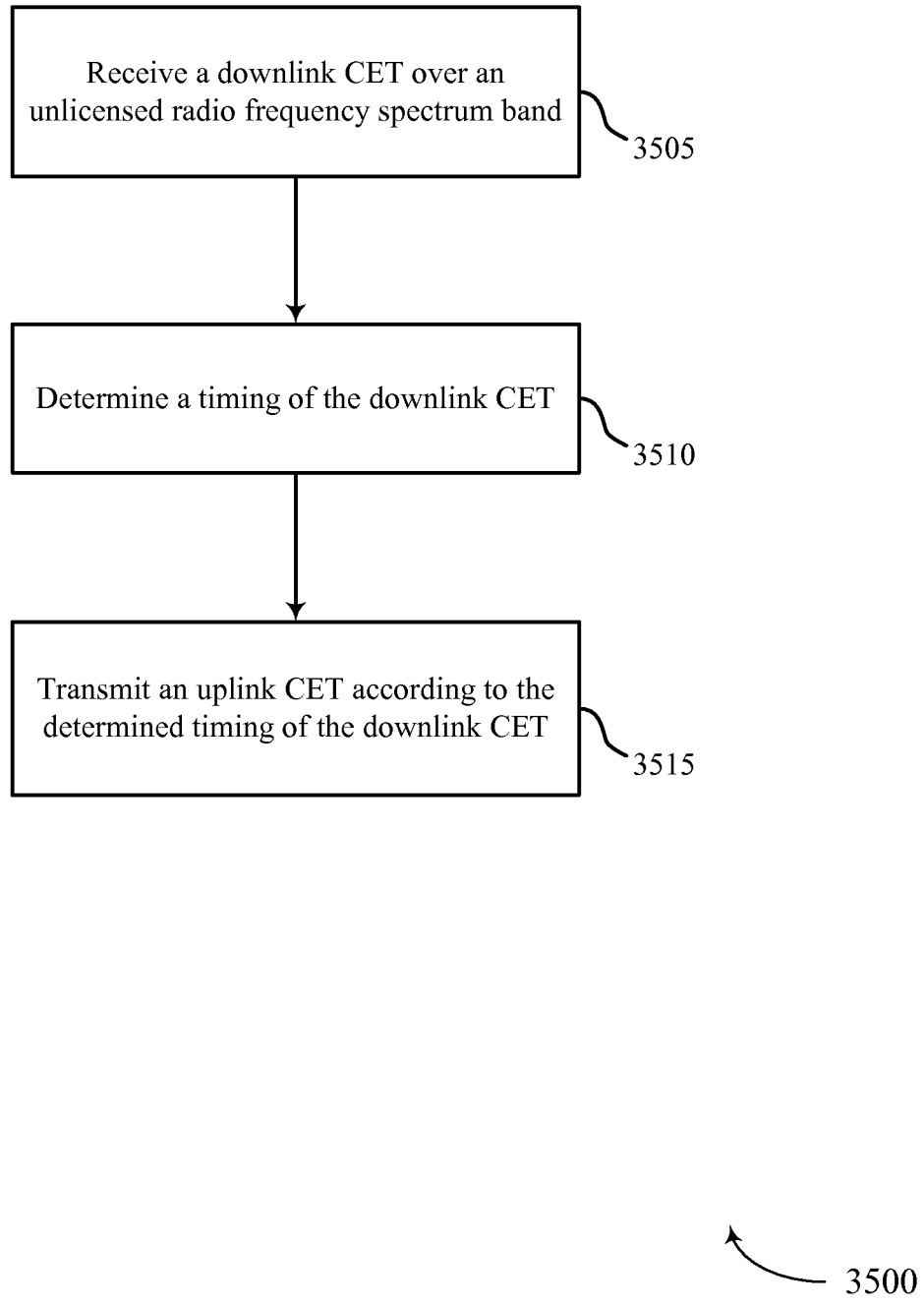

FIG. 35 shows a flowchart 3500 illustrating a method for wireless communication in accordance with various aspects of the present disclosure. The functions of flowchart 3500 may be implemented by a UE 115 or its components as described with reference to FIGS. 1, 2, 6, 7, and 40. In certain examples, the blocks of the flowchart 3500 may be performed by the controller module 610, 710, and/or 4010 as described with reference to FIGS. 6, 7, and/or 40.

At block 3505, the UE may receive a downlink CET over an unlicensed radio frequency spectrum band. In certain examples, the functions of block 3505 may be performed by the uplink CET timing module 735 and/or the receiver 605 as described above with reference to FIG. 7.

At block 3510, the UE may determine a timing of the downlink CET. In certain examples, the functions of block 3510 may be performed by the uplink CET timing module 735 as described above with reference to FIG. 7.

At block 3515, the UE may transmit an uplink CET according to the determined timing of the downlink CET. In certain examples, the functions of block 3515 may be performed by the uplink CET timing module 735 and/or the transmitter 615 as described above with reference to FIG. 7.

It should be noted that the method of flowchart 3500 is just one implementation and that the operations of the method, and the steps may be rearranged or otherwise modified such that other implementations are possible.

Figure 36:
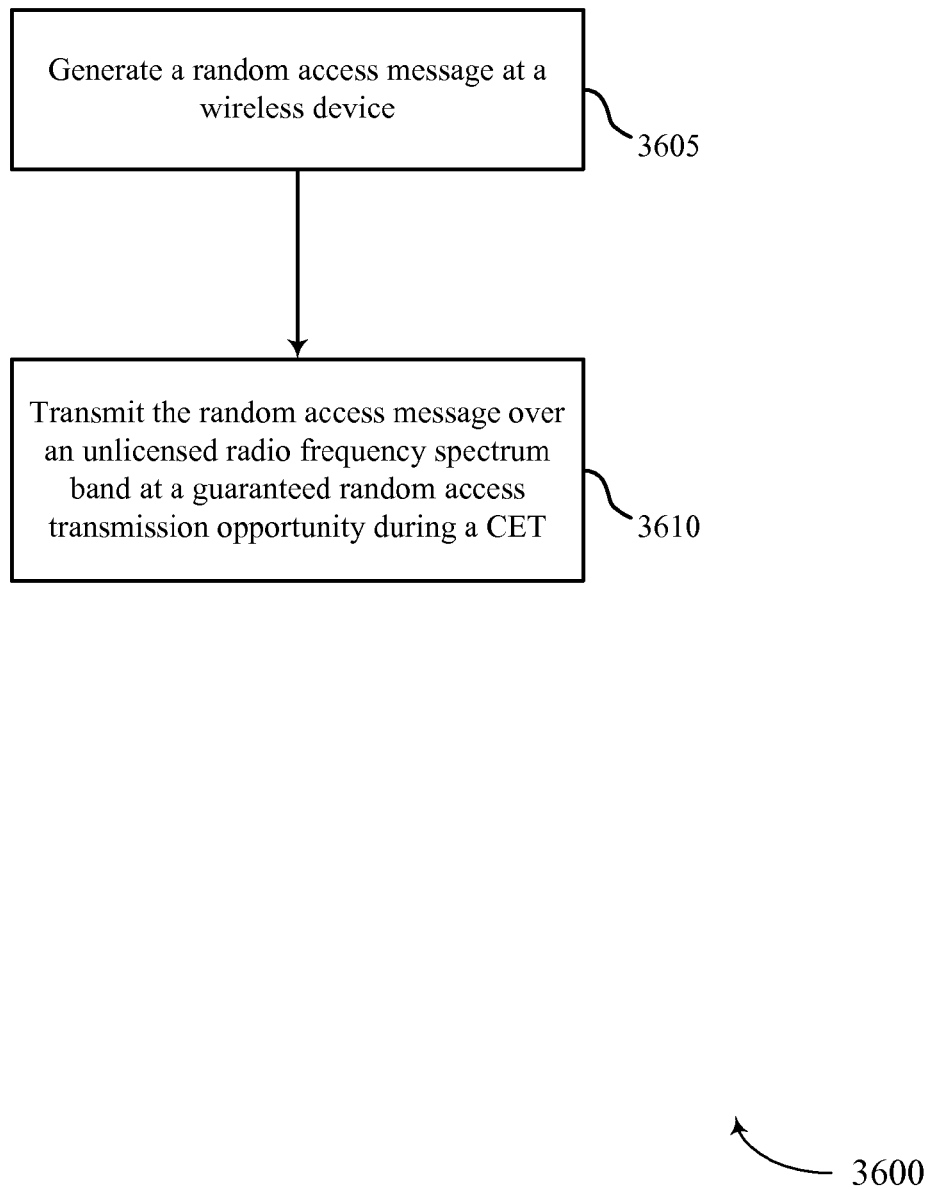

FIG. 36 shows a flowchart 3600 illustrating a method for wireless communication in accordance with various aspects of the present disclosure. The functions of flowchart 3600 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 3600 may be performed by the controller module 410, 510, 610, 710, 3910, or 4010 as described with reference to FIGS. 4-7, 39, and 40.

At block 3605, a wireless device may generate a random access message. In certain examples, the functions of block 3605 may be performed by the random access module 530 or 740 as described above with reference to FIG. 5 or 7.

At block 3610, the wireless device may transmit the random access message over an unlicensed radio frequency spectrum band at a guaranteed random access transmission opportunity during a CET. In certain examples, the functions of block 3610 may be performed by the random access module 530 or 740 as described above with reference to FIGS. 5 and 7.

It should be noted that the method of flowchart 3600 is just one implementation and that the operations of the method, and the steps may be rearranged or otherwise modified such that other implementations are possible.

Figure 37:
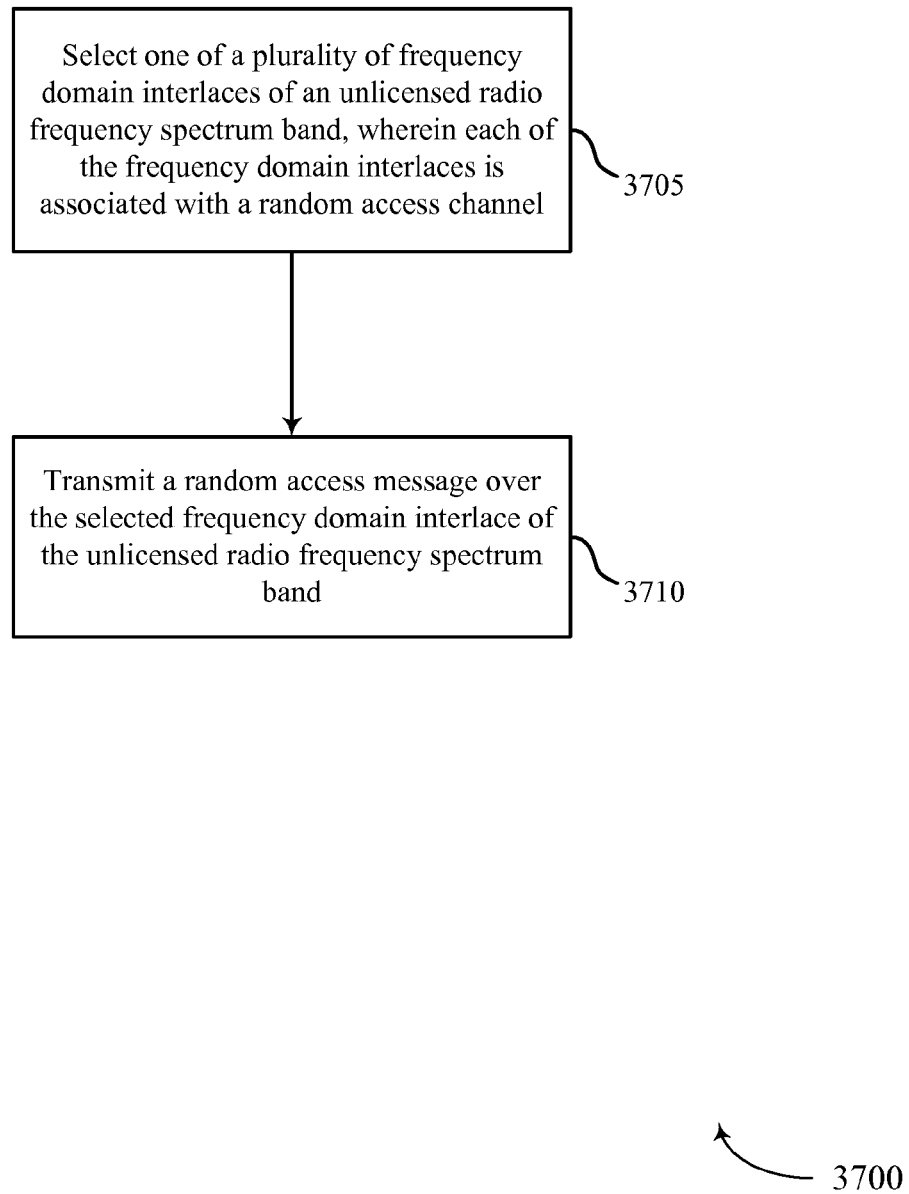

FIG. 37 shows a flowchart 3700 illustrating a method for wireless communication in accordance with various aspects of the present disclosure. The functions of flowchart 3700 may be implemented by a base station 105 or its components as described with reference to FIGS. 1, 2, 4, 5, and 39 or by a UE 115 or its components as described with reference to FIGS. 1, 2, 6, 7, and 40. In certain examples, the blocks of the flowchart 3700 may be performed by the controller module 410, 510, 610, 710, 3910, or 4010 as described with reference to FIGS. 4-7, 39, and 40.

At block 3705, the device may select one of a plurality of frequency domain interlaces of an unlicensed radio frequency spectrum band, wherein each of the frequency domain interlaces is associated with a random access channel. In certain examples, the functions of block 3705 may be performed by the random access module 530 or 740 as described above with reference to FIG. 5 or 7.

At block 3710, the device may transmit a random access message over the selected frequency domain interlace of the unlicensed radio frequency spectrum band. In certain examples, the functions of block 3710 may be performed by the random access module 530 or 740 as described above with reference to FIGS. 5 and 7.

It should be noted that the method of flowchart 3700 is just one implementation and that the operations of the method, and the steps may be rearranged or otherwise modified such that other implementations are possible.

Figure 38:
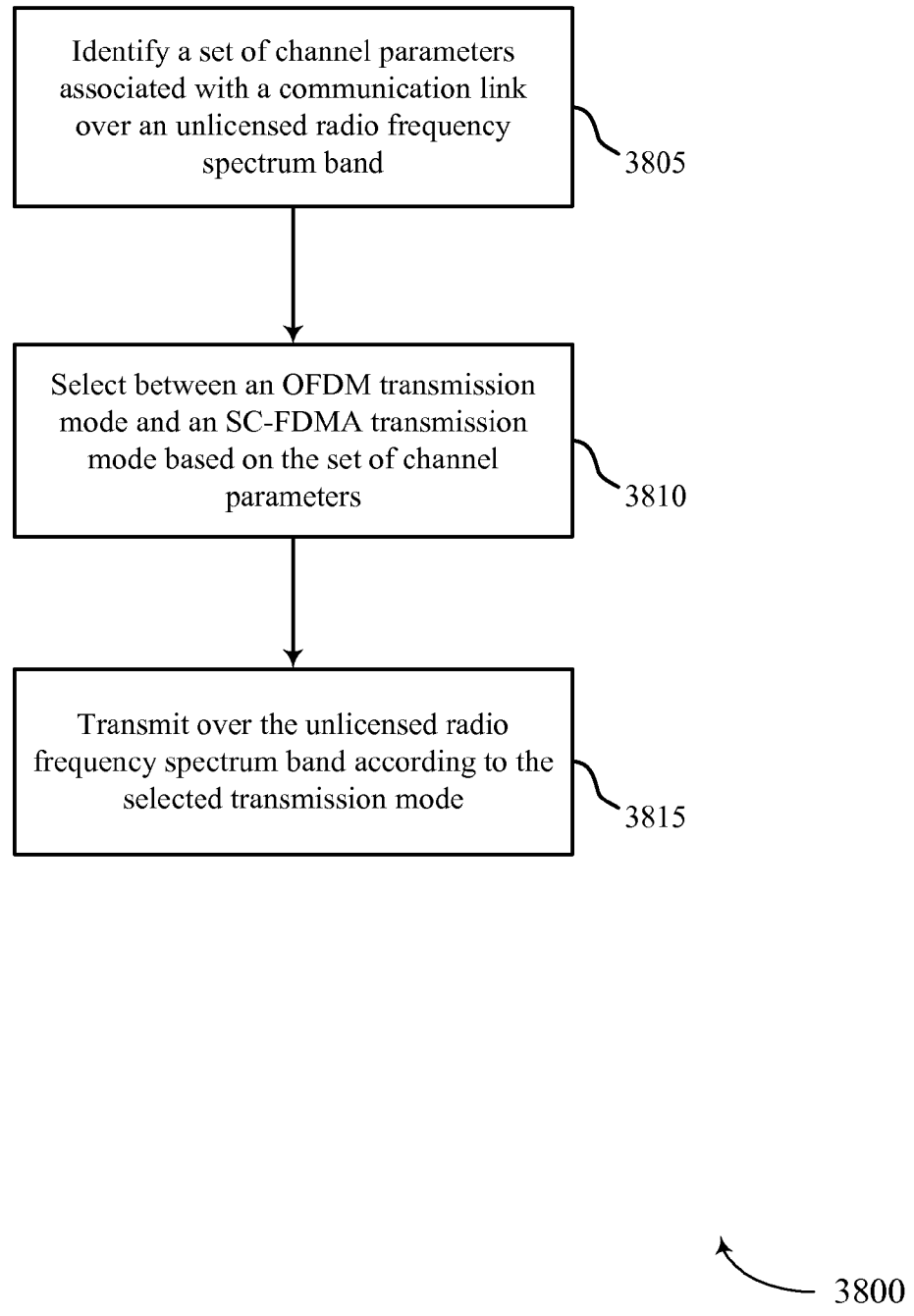

FIG. 38 shows a flowchart 3800 illustrating a method for wireless communication in accordance with various aspects of the present disclosure. The functions of flowchart 3800 may be implemented by a UE 115 or its components as described with reference to FIGS. 1, 2, 6, 7, and 40. In certain examples, the blocks of the flowchart 3800 may be performed by the controller module 610, 710, and/or 4010 as described with reference to FIGS. 6, 7, and/or 40.

At block 3805, the device may identify a set of channel parameters associated with a communication link over an unlicensed radio frequency spectrum band. In certain examples, the functions of block 3805 may be performed by the uplink transmission mode module 745 as described above with reference to FIG. 7.

At block 3810, the device may select between an OFDM transmission mode and an SC-FDMA transmission mode based on the set of channel parameters. In certain examples, the functions of block 3810 may be performed by the uplink transmission mode module 745 as described above with reference to FIG. 7.

At block 3815, the device may transmit over the unlicensed radio frequency spectrum band according to the selected transmission mode. In certain examples, the functions of block 3815 may be performed by the uplink transmission mode module 745 as described above with reference to FIG. 7.

It should be noted that the method of flowchart 3800 is just one implementation and that the operations of the method, and the steps may be rearranged or otherwise modified such that other implementations are possible.

Figure 39:
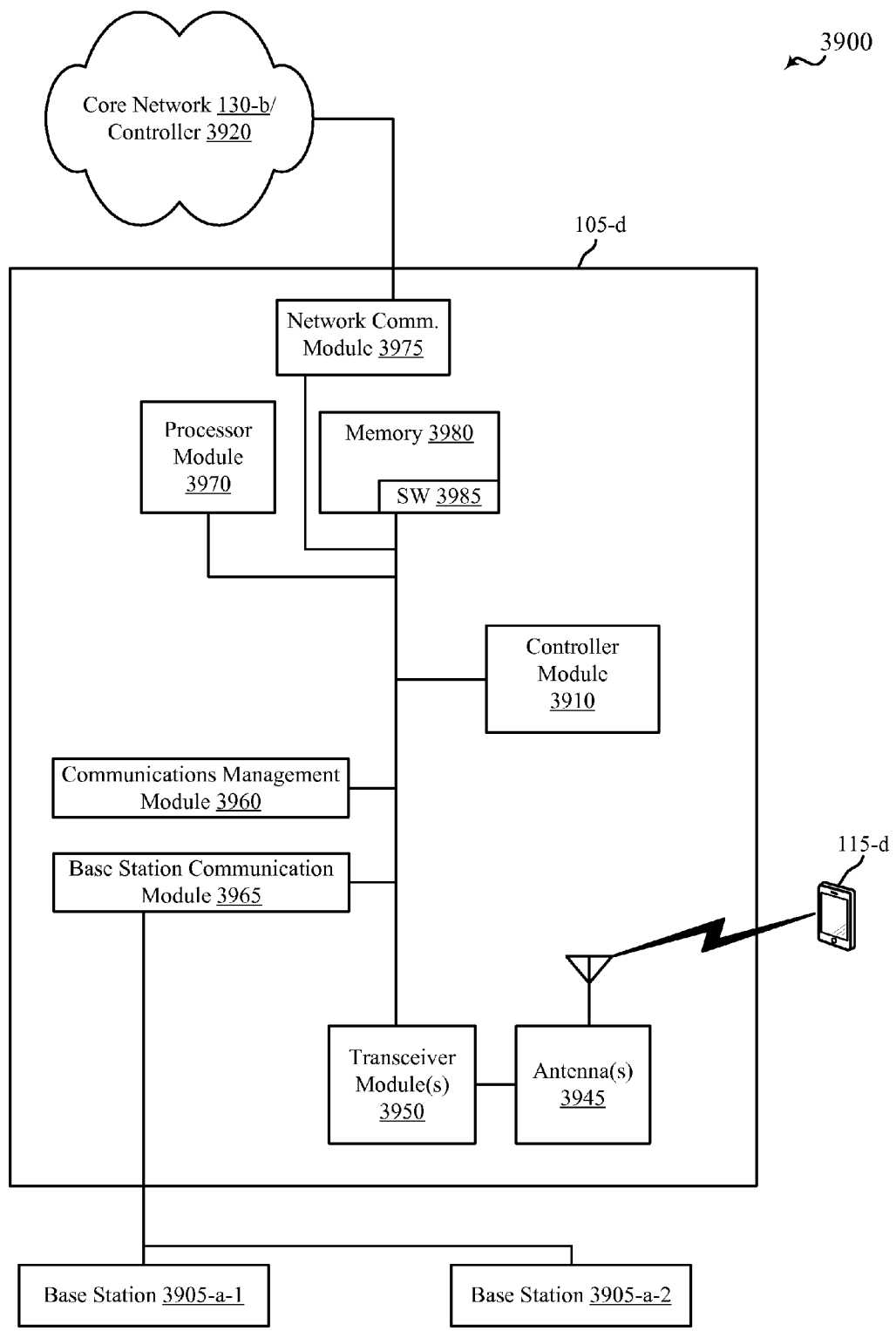
FIG. 39 shows a diagram of a system for use in wireless communications in accordance with various aspects of the present disclosure.

FIG. 39 shows a diagram of a system 3900 for use in wireless communications in accordance with various aspects of the present disclosure. System 3900 includes base stations 105-*d*, 3905-*a*-1, 3905-*a*-2, which may be examples of the base stations 105 described above. System 3900 also includes a UE 115-*d*, which may be an example of the UEs 115 described above.

The base station 105-*d* may include antenna(s) 3945, a transceiver module 3950, memory 3980, and a processor module 3970, which each may be in communication, directly or indirectly, with each other (e.g., over one or more buses). The transceiver module 3950 may be configured to communicate bi-directionally, via the antenna(s) 3945, with the UE 115-*d* as well as other UEs (not shown in FIG. 39). The transceiver module 3950 (and/or other components of the base station 105-*d*) may also be configured to communicate bi-directionally with one or more networks. In some cases, the base station 105-*d* may communicate with the core network 130-*a* and/or controller 3920 through network communications module 3975. Base station 105-*d* may be an example of an eNodeB base station, a Home eNodeB base station, a NodeB base station, and/or a Home NodeB base station. Controller 3920 may be integrated into base station 105-*d* in some cases, such as with an eNodeB base station.

Base station 105-*d* may also communicate with other base stations 105, such as base station 3905-*a*-1 and base station 3905-*a*-2. Each of the base stations 105-*d*, 3905-*a*-1, 3905-*a*-2 may communicate with one or more UEs using different wireless communications technologies, such as different Radio Access Technologies. In some cases, base station 105-*d* may communicate with other base stations such as 3905-*a*-1 and/or 3905-*a*-2 utilizing base station communication module 3965. In some examples, base station communication module 3965 may provide an X2 interface within an LTE wireless communication technology to provide communication between some of the base stations 105-*d*, 3905-*a*-1, 3905-*a*-2. In some examples, base station 105-*d* may communicate with other base stations through controller 3920 and/or core network 130-*b*.

The memory 3980 may include random access memory (RAM) and read-only memory (ROM). The memory 3980 may also store computer-readable, computer-executable software (SW) code 3985 containing instructions that are configured to, when executed, cause the processor module 3970 to perform various functions described herein (e.g., call processing, database management, message routing, etc.). Alternatively, the software code 3985 may not be directly executable by the processor module 3970 but may be configured to cause the computer, e.g., when compiled and executed, to perform functions described herein.

The processor module 3970 may include an intelligent hardware device, e.g., a central processing unit (CPU), a microcontroller, an ASIC, etc. The transceiver module 3950 may include a modem configured to modulate packets and provide the modulated packets to the antenna(s) 3945 for transmission, and to demodulate packets received from the antenna(s) 3945. While some examples of the base station 105-*d* may include a single antenna 3945, other examples of the base station 105-*d* include multiple antennas 3945 for multiple links which may support carrier aggregation. For example, one or more links may be used to support macro communications with UEs 115.

According to the architecture of FIG. 39, the base station 105-*d* may further include a communications management module 3960. The communications management module 3960 may manage communications with other base stations 105. By way of example, the communications management module 3960 may be a component of the base station 105-*d* in communication with some or all of the other components of the base station 105-*d* via a bus. Alternatively, functionality of the communications management module 3960 may be implemented as a component of the transceiver module 3950, as a computer program product, and/or as one or more controller elements of the processor module 3970.

The base station 105-*d* in FIG. 39 also includes a controller module 3910, which may be an example of and/or implement some or all of the functionality of the controller modules 410, 510 described above with reference to FIGS. 4 and 5, including the sub-modules 505, 515, 520, 525, 530, 550 described with reference to FIG. 5.

Figure 40:
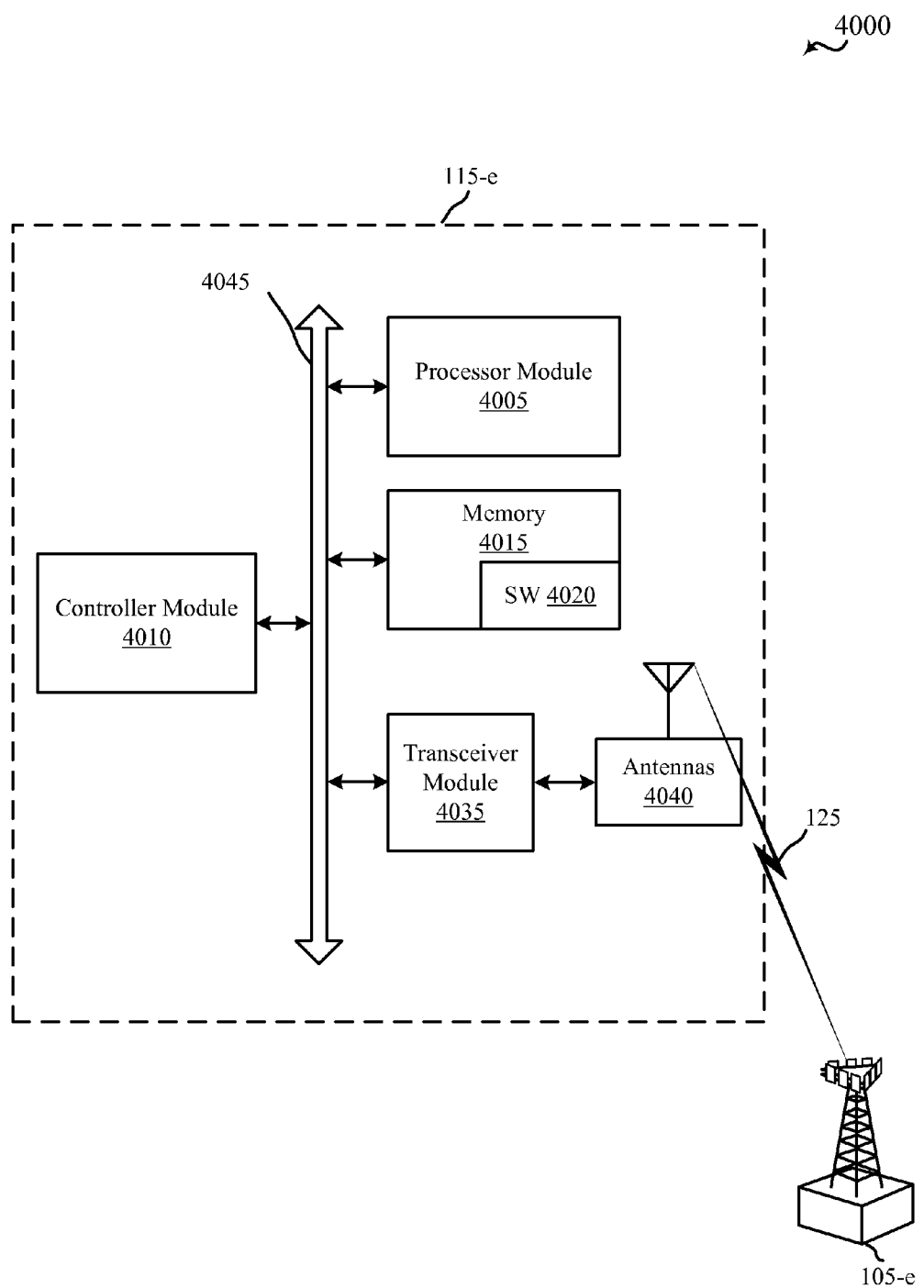
FIG. 40 shows a diagram of a system for use in wireless communications in accordance with various aspects of the present disclosure.

FIG. 40 shows a diagram of a system 4000 for use in wireless communications in accordance with various aspects of the present disclosure. System 4000 includes UE 115-*e* which may be an example of the UEs 115 described above. System 4000 also includes a base station 105-*e*, which may be an example of the base stations 105 described above.

The UE 115-*e* shown in FIG. 40 includes antenna(s) 4040, a transceiver module 4035, a processor module 4005, and memory 4015 (including software (SW) 4020), which each may communicate, directly or indirectly, with each other (e.g., via one or more buses 4045). The transceiver module 4035 may be configured to communicate bi-directionally, via the antenna(s) 4040 and/or one or more wireless communication links, with one or more base stations 105-*e*, one or more WLAN access points, or other nodes, as described above. The transceiver module 4035 may include a modem configured to modulate packets and provide the modulated packets to the antenna(s) 4040 for transmission, and to demodulate packets received from the antenna(s) 4040. While the UE 115-*e* may include a single antenna 4040 in some examples, the UE 115-*e* may alternatively have multiple antennas 4040 capable of concurrently transmitting and/or receiving multiple wireless transmissions. The transceiver module 4035 may thus be capable of concurrently communicating with one or more base stations 105-*e* and/or one or more other access points.

The memory 4015 may include RAM and/or ROM. The memory 4015 may store computer-readable, computer-executable software/firmware code 4020 containing instructions that are configured to, when executed, cause the processor module 4005 to perform various functions described herein (e.g., make and/or execute offloading determinations). Alternatively, the software/firmware code 4020 may not be directly executable by the processor module 4005 but be configured to cause a computer (e.g., when compiled and executed) to perform functions described herein. The processor module 4005 may include an intelligent hardware device, e.g., a CPU, a microcontroller, an ASIC, etc. may include RAM and ROM.

The UE 115-*e* also includes a controller module 4010, which may be an example of and/or implement some or all of the functionality of the controller modules 610, 710 described above with reference to FIGS. 6 and 7, including the sub-modules 705, 715, 720, 725, 730, 735, 740, 745, 750 described with reference to FIG. 7.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disc ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication, comprising:
generating a system information block comprising a plurality of parameters related to a base station, wherein the plurality of parameters comprise at least one listen-before-talk (LBT) parameter and at least one access parameter;
performing a plurality of clear channel assessments (CCAs) for a component carrier of an unlicensed radio frequency spectrum band at a plurality of subframes corresponding to intervals associated with opportunistic system information block transmissions; and
transmitting the system information block during at least a subframe of the plurality of subframes over the component carrier of the unlicensed radio frequency spectrum band for which the corresponding CCA of the plurality of CCAs is successful.

2. The method of claim 1, wherein the system information block is further transmitted over the unlicensed radio frequency spectrum band during a clear channel assessment (CCA)-exempt transmission (CET) subframe associated with the base station.

3. The method of claim 2, wherein the CET subframe is periodic and transmitting the system information block comprises:
transmitting the system information block at each instance of the CET.

4. The method of claim 2, further comprising:
dynamically modifying the at least one LBT parameter; and
transmitting an updated version of the system information block at a next CET subframe.

5. The method of claim 1, further comprising:
transmitting different redundancy versions of the system information block at different time intervals.

6. The method of claim 1, wherein the at least one access parameter is selected from the group consisting of:
a physical cell identifier (PID), an operator identifier, and a cell global identifier (CGI).

7. The method of claim 1, wherein the at least one LBT parameter is selected from the group consisting of:
an extended CCA (ECCA) counter parameter, a CCA energy threshold, and a guard period for base station resynchronization.

8. The method of claim 7, wherein an ECCA procedure at the base station is identical for unicast and broadcast transmissions.

9. The method of claim 1, wherein the at least one access parameter comprises a system frame number (SFN).

10. The method of claim 1, wherein the system information block spans an entire bandwidth of the component carrier associated with the unlicensed radio frequency spectrum band.

11. A method for wireless communication, comprising:
receiving a system information block during at least a subframe of a plurality of subframes corresponding to intervals associated with opportunistic system information block transmissions over a component carrier of an unlicensed radio frequency spectrum band;
wherein the system information block comprises a plurality of parameters related to a base station, wherein the plurality of parameters comprise at least one listen-before-talk (LBT) parameter and at least one access parameter.

12. The method of claim 11, wherein the system information block is received over the unlicensed radio frequency spectrum band during a clear channel assessment (CCA)-exempt transmission (CET) subframe associated with the base station.

13. The method of claim 12, further comprising:
adjusting an LBT operation based on the at least one LBT parameter received in the system information block.

14. The method of claim 13, further comprising:
receiving different redundancy versions of the system information block at different time intervals.

15. The method of claim 11, wherein the at least one access parameter is selected from the group consisting of:
a physical cell identifier (PID), an operator identifier, and a cell global identifier (CGI).

16. The method of claim 11, wherein the at least one LBT parameter is selected from the group consisting of:
an extended CCA (ECCA) counter parameter, a CCA energy threshold, and a guard period for base station resynchronization.

17. The method of claim 11, wherein the at least one access parameter comprises a system frame number (SFN).

18. The method of claim 11, wherein the system information block spans an entire bandwidth of the component carrier associated with the unlicensed radio frequency spectrum band.

19. An apparatus for wireless communication, comprising:

a processor; and memory coupled with the processor, wherein the processor is configured to:

generate a system information block comprising a plurality of parameters related to a base station, wherein the plurality of parameters comprise at least one listen-before-talk (LBT) parameter and at least one access parameter;

performing a plurality of clear channel assessments (CCAs) for a component carrier of an unlicensed radio frequency spectrum band at a plurality of subframes corresponding to intervals associated with opportunistic system information block transmissions; and transmit the system information block during at least a subframe of the plurality of subframes over the component carrier of the unlicensed radio frequency spectrum band for which the corresponding CCA of the plurality of CCAs is successful.

20. The apparatus of claim 19, wherein the system information block is further transmitted over the unlicensed radio frequency spectrum band during a clear channel assessment (CCA)-exempt transmission (CET) subframe associated with the base station.

21. The apparatus of claim 20, wherein the CET subframe is periodic and the processor configured to transmit the system information block comprises the processor configured to:

transmit the system information block at each instance of the CET.

22. The apparatus of claim 20, wherein the processor is configured to:

dynamically modify the at least one LBT parameter; and transmit an updated version of the system information block at a next CET subframe.

23. The apparatus of claim 19, wherein the at least one access parameter is selected from the group consisting of: a physical cell identifier (PID), an operator identifier, and a cell global identity (CGI).

24. The apparatus of claim 19, wherein the at least one LBT parameter is selected from the group consisting of:

an extended clear channel assessment (ECCA) counter parameter, a CCA energy threshold, and a guard period for base station resynchronization.

25. An apparatus for wireless communication, comprising:

a processor;

memory coupled with the processor, wherein the processor is configured to:

receive a system information block during at least a subframe of a plurality of subframes corresponding to intervals associated with opportunistic system information block transmissions over a component carrier of an unlicensed radio frequency spectrum band; and wherein the system information block comprises a plurality of parameters related to a base station, wherein the plurality of parameters comprise at least one listen-before-talk (LBT) parameter and at least one access parameter.

26. The apparatus of claim 25, wherein the system information block is received over the unlicensed radio frequency spectrum band during a clear channel assessment (CCA)-exempt transmission (CET) subframe associated with the base station.

27. The apparatus of claim 26, wherein the processor is configured to:

adjust an LBT operation based on the at least one LBT parameter received in the system information block.

28. The apparatus of claim 27, wherein the processor is configured to:

receive different redundancy versions of the system information block at different time intervals.

* * * * *